(12) United States Patent
Sone et al.

(10) Patent No.: US 9,001,374 B2
(45) Date of Patent: Apr. 7, 2015

(54) IMAGE FORMING APPARATUS AND DISPLAY CONTROL DEVICE

(75) Inventors: Masaki Sone, Osaka (JP); Hiroyuki Takaishi, Osaka (JP)

(73) Assignee: Kyocera Mita Corporation (JP)

( * ) Notice: Subject to any disclaimer, the term of this patent is extended or adjusted under 35 U.S.C. 154(b) by 1160 days.

(21) Appl. No.: 12/482,650

(22) Filed: Jun. 11, 2009

(65) Prior Publication Data

US 2009/0310183 A1 Dec. 17, 2009

(30) Foreign Application Priority Data

| Jun. 13, 2008 | (JP) | 2008-155272 |
| Jun. 13, 2008 | (JP) | 2008-155273 |
| Jun. 13, 2008 | (JP) | 2008-155274 |
| Jun. 13, 2008 | (JP) | 2008-155275 |
| Jun. 13, 2008 | (JP) | 2008-155276 |
| Jun. 13, 2008 | (JP) | 2008-155277 |

(51) Int. Cl.
*G06K 15/00* (2006.01)
*G06F 3/12* (2006.01)
*H04N 1/00* (2006.01)
*G06F 9/455* (2006.01)
*G03G 15/00* (2006.01)

(52) U.S. Cl.
CPC ........ *H04N 1/00204* (2013.01); *G06F 9/45512* (2013.01); *H04N 1/00244* (2013.01); *H04N 1/00344* (2013.01); *H04N 1/00411* (2013.01); *H04N 1/00427* (2013.01); *H04N 1/00464* (2013.01); *H04N 1/00503* (2013.01); *H04N 1/00514* (2013.01); *H04N 1/00965* (2013.01); *H04N 1/00973* (2013.01); *H04N 2201/0039* (2013.01); *H04N 2201/0094* (2013.01); *G03G 15/502* (2013.01); *G03G 2215/00109* (2013.01); *G03G 15/5087* (2013.01)

(58) Field of Classification Search
None
See application file for complete search history.

(56) References Cited

U.S. PATENT DOCUMENTS

| 5,481,353 | A * | 1/1996 | Hicks et al. | 399/382 |
| 2002/0171863 | A1 * | 11/2002 | Sesek | 358/1.15 |
| 2004/0190025 | A1 * | 9/2004 | Nomura et al. | 358/1.9 |
| 2005/0039126 | A1 * | 2/2005 | Katano | 715/700 |
| 2005/0237588 | A1 * | 10/2005 | Gohara et al. | 358/538 |
| 2006/0095433 | A1 * | 5/2006 | Kano | 707/10 |
| 2006/0101343 | A1 | 5/2006 | Machida | |
| 2006/0123341 | A1 * | 6/2006 | Smirnov | 715/708 |
| 2007/0050050 | A1 | 3/2007 | Tanida | |
| 2007/0094103 | A1 * | 4/2007 | Hyakutake et al. | 705/28 |
| 2007/0198845 | A1 * | 8/2007 | Morikawa | 713/182 |
| 2008/0016450 | A1 * | 1/2008 | Aono | 715/747 |
| 2008/0250494 | A1 * | 10/2008 | Nagata | 726/19 |
| 2008/0267654 | A1 | 10/2008 | Kawai | |
| 2008/0297829 | A1 * | 12/2008 | Paek | 358/1.15 |
| 2009/0128844 | A1 * | 5/2009 | Kondo et al. | 358/1.15 |
| 2012/0243029 | A1 * | 9/2012 | St. Jacques et al. | 358/1.15 |

FOREIGN PATENT DOCUMENTS

| JP | 2001306204 | 11/2001 |
| JP | 2003150971 | 5/2003 |

(Continued)

*Primary Examiner* — Thomas Lett
(74) *Attorney, Agent, or Firm* — Gerald E. Hespos; Michael J. Porco; Matthew T. Hespos

(57) ABSTRACT

A PC includes a part designation receiving section which receives a designation of a display object part to be displayed in a display screen image, a layout instruction receiving section which receives a layout instruction of the display object part, an action setting section which sets an action associated with the display object part, and a creating section which creates screen image data of the display screen image.

3 Claims, 37 Drawing Sheets

(56) References Cited

FOREIGN PATENT DOCUMENTS

| JP | 2004104335 | 4/2004 |
| JP | 2006127181 | 5/2006 |
| JP | 2006211374 | 8/2006 |
| JP | 2006277005 | 10/2006 |
| JP | 2007-232908 | 9/2007 |
| JP | 2008131188 | 6/2008 |
| JP | 200915726 | 1/2009 |

* cited by examiner

FIG.18
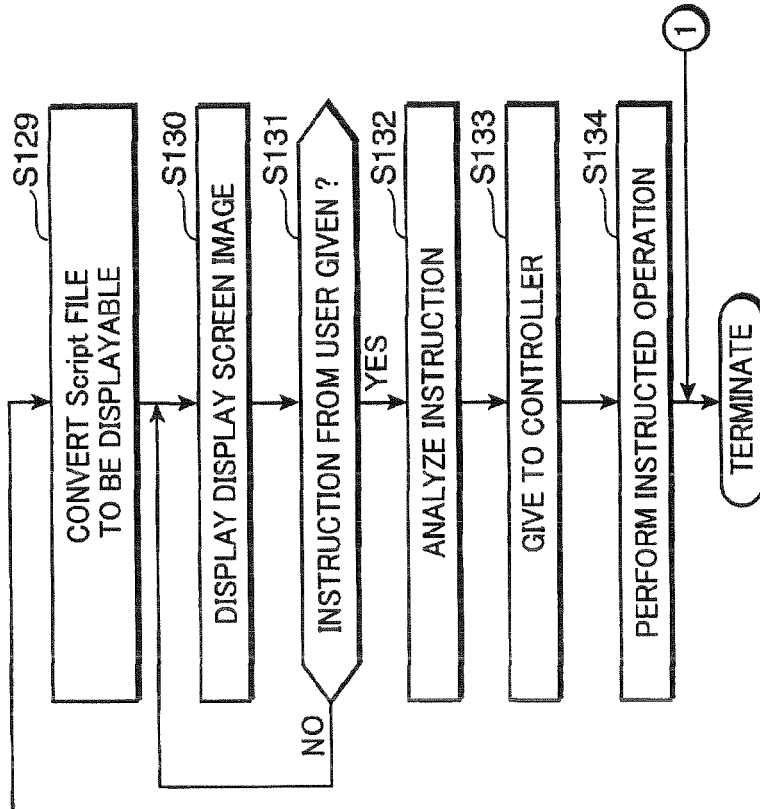
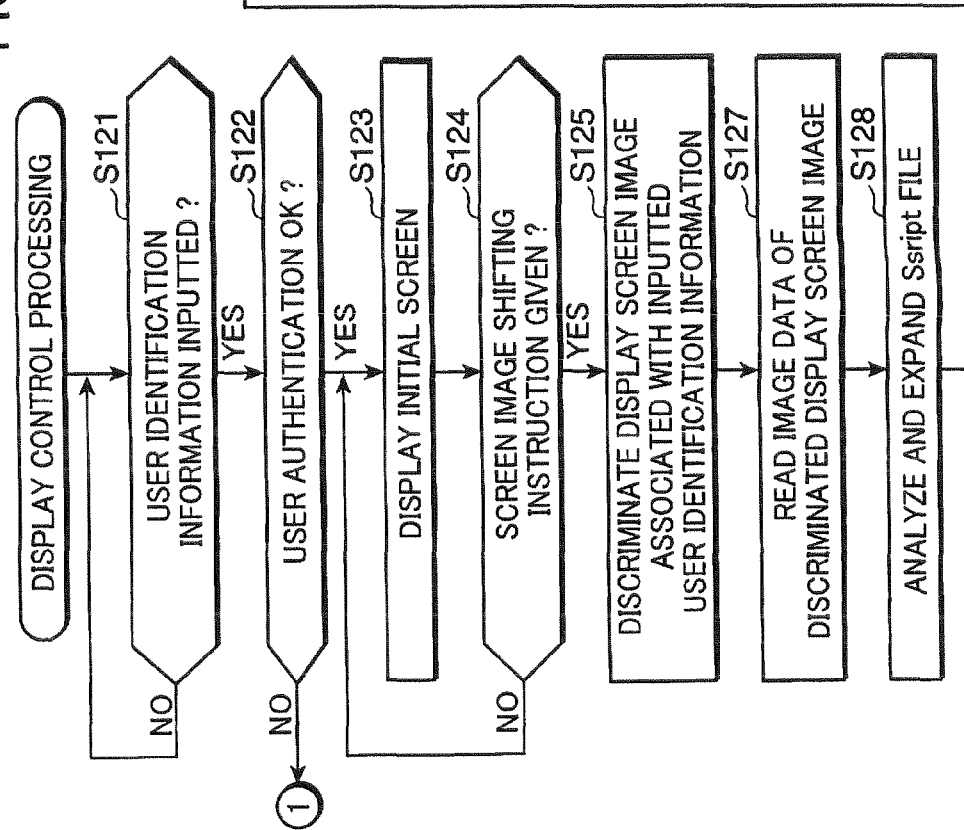

IMAGE FORMING APPARATUS AND DISPLAY CONTROL DEVICE

BACKGROUND OF THE INVENTION

1. Field of the Invention

The present invention relates to a technology of displaying a display screen image, which is created in accordance with contents of an instruction from a user, in an electric equipment such as an image forming apparatus.

2. Description of the Related Art

Conventionally, in electric equipments such as an image forming apparatus which receives an instruction from a user and performs an operation indicated by the instruction, there has been adopted a technology of providing a display section constituted by an LCD (Liquid Crystal Display) or the like in an operation panel on a front side of an apparatus and using a touch panel function provided in the display section to receive operation execution instructions corresponding respectively to operation buttons in the display screen image displayed by the display section (refer to Japanese Patent Unexamined Publication No. 2007-232908).

However, the image forming apparatus could not allow the display section to display a display screen image having operation buttons and the like arranged in a manner desired by a user, and what a user could do is only to input operation execution instructions by following display screen images and operation buttons displayed by the display section of the image forming apparatus.

SUMMARY OF THE INVENTION

The present invention was made by further improving the conventional technology.

In summary, according to an aspect of the present invention, a display screen image creating apparatus includes: a part designation receiving section which receives from a user a designation of a display object part to be displayed in a display screen image on a display section of an electric equipment; a layout instruction receiving section which receives from a user a layout instruction for instructing an arrangement of the designated display object part in the display screen image; an action setting section which associates the designated display object part with an action corresponding to the display object part; and a creating section which creates screen image data of the display screen image in accordance with contents set by the designation of the display object part, the layout instruction, and the action setting.

These and other objects, features and advantages of the present invention will become more apparent upon reading of the following detailed description along with the accompanied drawings.

BRIEF DESCRIPTION OF THE DRAWINGS

FIG. 18 is a flowchart showing a first example of a display control processing for controlling the display section to display the display screen image created by the PC and a receiving processing for receiving an operation execution instruction from a user, in an image forming system in accordance with the third embodiment.

DETAILED DESCRIPTION OF THE PREFERRED EMBODIMENTS

Hereinafter, a display screen image creating apparatus, an image forming apparatus, an image forming system, a display control device, and a computer-readable recording medium storing a display screen image creating program, a display screen image analyzing program, and a display control program in accordance with embodiments of the present invention will be described with reference to the drawings.

Figure 1:
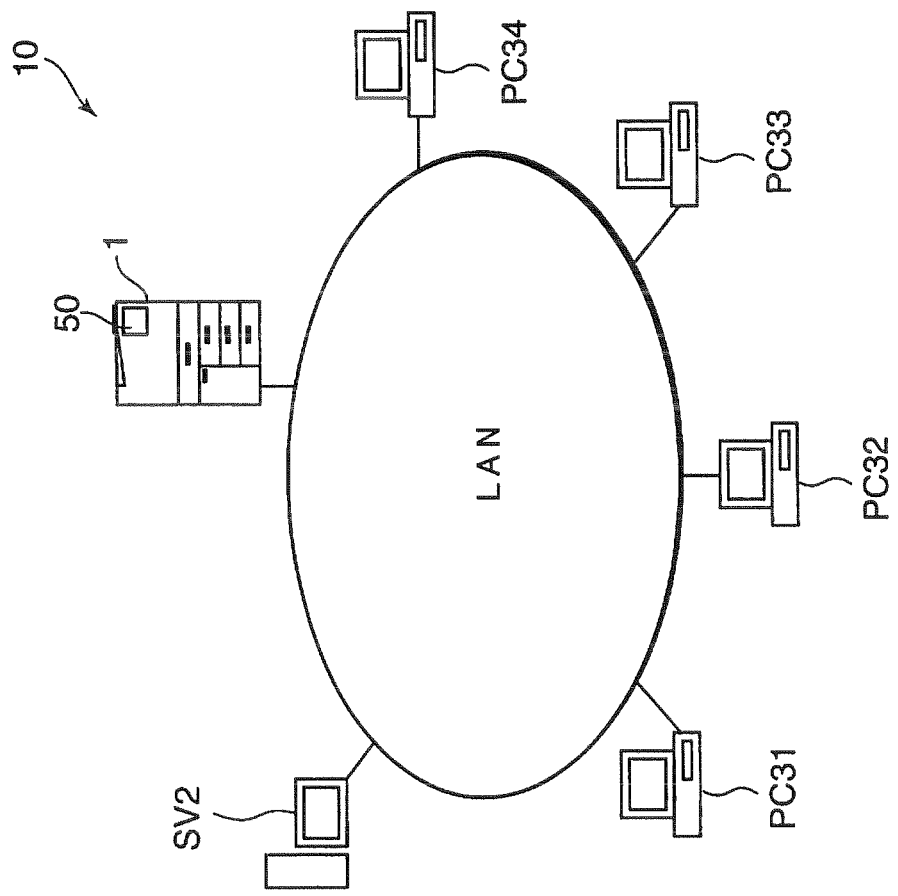
FIG. 1 shows a network configuration as an example of an image forming system in accordance with an embodiment of the present invention.

FIG. 1 shows a network configuration as an example of an image forming system in accordance with an embodiment of the present invention. The image forming system 10 includes at least one complex machine 1 and at least one personal computer (a server computer SV2 and at least one of PCs 31-34).

The complex machine 1 as an example of the image forming apparatus has functions such as a copying function, a facsimile function, a printer function, a scanner function, and the like. Further, the complex machine 1 has a document management function of storing document data of a document read by a scanner section into an internal storage device of the complex machine 1, the server computer SV2 connected to the complex machine 1 via a network such as a LAN (local area network), respective storage sections of the personal computers (hereinafter, referred to as "PC") 31-34, and the like, reading and printing print data stored in the internal storage device of the complex machine 1, the server computer SV2, and the respective storage sections of the PCs 31-34.

Further, the complex machine 1 is provided with a display section 50 constituted by an LCD (Liquid Crystal Display). Moreover, the server computer SV2 or at least one of the PCs 31-34 is capable of creating screen image data of a display screen image (hereinafter referred to as "display screen image data") displayed by the display section 50 of the complex machine 1. The complex machine 1 receives screen image data from the server computer SV2 or the PCs 31-34, which are capable of creating the display screen image data, to allow the display section 50 to display a display screen image and allows the display section 50 to display the display screen image. The display screen image creating processing executed by the server computer SV2 or the PCs 31-34 and a configuration and a processing in the complex machine 1 to display the display screen image will be described later.

Figure 2:
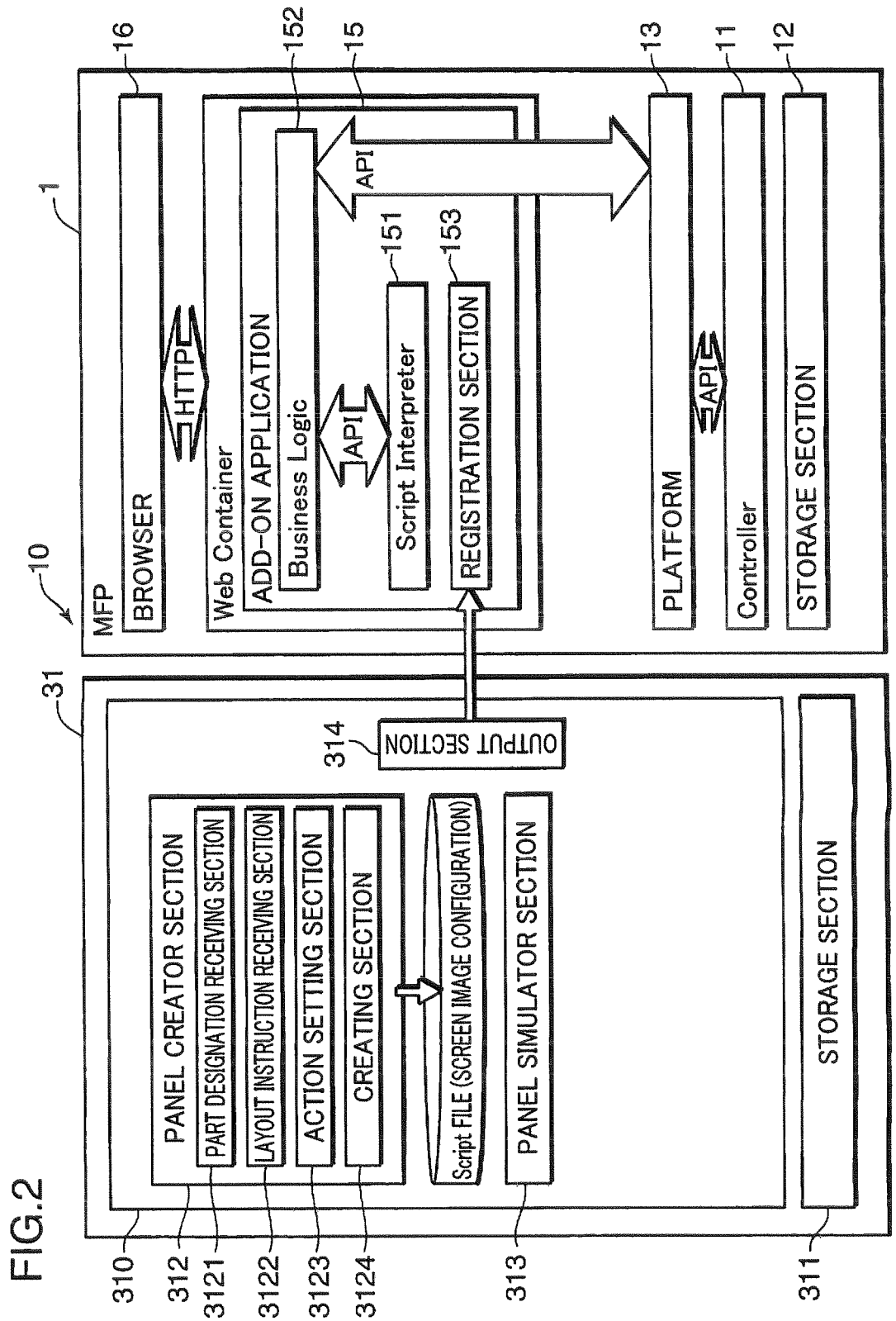
FIG. 2 shows a first embodiment of configurations of a PC and a complex machine necessary for executing a display screen image creating processing and a display screen image displaying processing.

Next, a first embodiment of configurations corresponding to internal configurations of the server computer SV2, the PCs 31-34, and the complex machine 1 and being necessary for a display screen image data creating processing and a display screen image data display processing will be described. FIG. 2 shows a first embodiment of configurations of the PC and the complex machine 1 necessary for executing the display screen image data creating processing and the display screen image data display processing. Since the server computer SV2 and the PCs 31-34 have the same configuration necessary for executing the display screen image creating processing, only a configuration of the PC 31 is shown in FIG. 2.

The PC (an example of a display screen image creating apparatus) 31 includes a controller 310 and a storage section 311. The storage section 311 is constituted by an HDD or the like and stores a display screen image creating program. The controller 310 is constituted by a CPU or the like. The controller 310 performs an overall operation control with respect to the PC 31 and operates in accordance with the display screen image creating program stored in the storage section 311 to serve as a panel creator section 312, a panel simulator section 313, and an output section 314.

The panel creator section 312 is a tool for creating display screen image data to be displayed by the display section 50 of the complex machine 1. For example, the panel creator section 312 creates a Script file in an XML (Extensible Markup Language) data format. The panel creator section 312 serves as a part designation receiving section 3121, a layout instruction receiving section 3122, an action setting section 3123, and a creating section 3124.

The part designation receiving section 3121 receives from a user designation of display object parts such as operation buttons, icons, character strings, and the like to be displayed in the display screen image through an unillustrated operating section (a mouse, a keyboard, or the like) provided on the PC 31. The part designation receiving section 3121 stores in advance image data of a plurality of display object parts which can be designated by a user. For example, if a user inputs a display screen image creation start instruction to the operating section, the part designation receiving section 3121 displays the stored display object parts on a display such as an LCD provided in the PC 31. If a user designates desired display object parts from the display object parts on the display by operating the operating section, the part designation receiving section 3121 receives the designation of the designated display object parts.

The layout instruction receiving section 3122 receives a layout instruction, which instructs an arrangement in the display screen image as to the display object parts designated at the part designation receiving section 3121, from a user. For example, the layout instruction receiving section 3122 causes the display provided in the PC 31 to display a simulated background image of the display screen image. If a portion in the background image is designated by a user through the operating section, the layout instruction receiving section receives the designated portion as a portion where the designated display object part is to be arranged.

The action setting section 3123 associates the display object parts designated at the part designation receiving section 3121 with actions corresponding to the display object parts. In other words, a kind of a display object part to be arranged in the display screen image is designated by a user at the part designation receiving section 3121, and the action setting section 3123 associates the designated display object part with an operation corresponding to the display object part in the complex machine 1. For example, if a display object part named "document size A3 button" is designated by a user, the action setting section 3123 associates "operation of receiving an instruction of feeding a recording sheet from a sheet-feeding cassette storing a recording sheet having a document size A3" with the "document size A3 button," as an action associated in advance with the "document size A3 button."

The creating section 3124 executes processing of creating screen image data of a display screen image (hereinafter, referred to as "display screen image data") in accordance with contents set by the display object part designation at the part designation receiving section 3121, the layout instruction at the layout instruction receiving section 3122, and the action setting at the action setting section 3123. In other words, if a user performs the display object part designation at the part designation receiving section 3121, the layout instruction at the layout instruction receiving section 3122, and the action setting at the action setting section 3123, a display screen image to be displayed by the display section 50 of the complex machine 1 can be customized and created in a desirable manner by the display screen image creating processing executed by the creating section 3124. In the present embodiment, the creating section 3124 exports the display screen image data to a Script file.

The panel simulator section 313 is a tool which reads display screen image data constituted by the Script file exported by the panel creator section 312 in the PC 31, analyzes the contents, converts the display screen image data into an HTML format to enable the display provided in the PC 31 to display the display screen image, and displays the display screen image file in the HTML format on a browser in the PC 31.

The output section 314 outputs the display screen image of the Script file created by the creating section 3124 to a complex machine designated by a user (complex machine 1 in the present embodiment).

The output section 314 may output the display screen image data to the complex machine 1 by methods of, for example, (1) outputting the display screen image data to the complex machine 1 through the LAN, (2) outputting the display screen image data to the complex machine 1 through a local port, (3) outputting the display screen image data through a public line including a phone line, (4) outputting the display screen image data from an external memory slot provided in the PC 31 to an external memory mounted to the slot (reading the display screen image data from the external memory in the complex machine 1), and (5) outputting the display screen image data to the complex machine 1 in an electronic mail format through the LAN. In the present embodiment, the PC 31 has all the functions of (1)-(5), and outputs the display screen image data to the complex machine 1 by an output method selected by an instruction given by a user. However, in the display screen image creating apparatus in accordance with the embodiment of the present invention, it will be sufficient if the PC 31 has a configuration capable of outputting the display screen image data in at least one of the methods (1)-(5).

On the other hand, the complex machine 1 includes a controller 1, a storage section 12, a platform 13, an add-on application 15, and a browser 16. The controller 11 executes an overall operation control with respect to the complex machine 1. The controller 11 is provided as a firmware and executes basic functions of the complex machine 1 such as scanned data transmission, printing, data access, system setting, network communication, JOB control, and data registration.

The platform 13 is a base for operation of an API (Application Program Interface) and the add-on application 15. The platform 13 is also responsible for relaying the controller 11 and the API.

The API is an interface for executing, by means of other than the firmware, the basic functions of the complex machine 1 executed by the controller 11. The API accesses the controller 11 in the firmware through the platform 13 to execute the basic function of the complex machine 1. It should be noted that the add-on application 15 calls up a scanner function API to execute, for example, the scanner function of the complex machine 1.

The add-on application 15 is not a firmware which is installed in the complex machine 1 as a default, but it is an application which can be installed as an add-on. The add-on application 15 is configured mainly by a Script Interpreter 151, a Business Logic 152, and a registration section 153.

The registration section 153 registers the display screen image data of the Script file which is outputted from the output section 314 of the PC 31 (or read from an external memory) as display data to be displayed by the display section 50 and allows the storage section 12 to store the same. In the present embodiment, a Script file in an XML format is used as a data file of a display screen image. However, as a system configuration, a mark-up language other than the XML format may be used.

The Script Interpreter 151 reads a file of a Script file as the display screen image data registered to the storage section 12 by the registration section 153 and analyzes contents of the same. The Script Interpreter 151 executes HTML conversion processing for allowing the display section 50 to display the display screen image and expansion processing to the Business Logic 152 to execute actions associated with display object parts such as operation buttons arranged in the display screen image. The Script Interpreter 151 gives the data applied with the HTML conversion processing for display to the browser 16 through the API.

The Business Logic 152 controls actions (operations of the complex machine 1) based on information expanded by the Script Interpreter 151 by analyzing the Script file and given by the Script Interpreter 151 (information indicating actions associated with the display object parts). In other words, if a user operates a display object part such as an operation button displayed in the display screen image displayed by the browser 16 on the display section 50, the Business Logic 152 analyzes an action associated with the operated display object part based on the information given by the Script Interpreter 151 and calls out a scanner transmission API to execute the analyzed function, for example, the scanner function.

The storage section 12 is constituted by an HDD or the like and stores an operation control program for operation as the controller 11, a program of the add-on application 15, a program of the browser 16, and the like. A CPU as a central controller of the complex machine 1 operates in accordance with the programs stored in the storage section 12 to serve as the controller 11, the add-on application 15, the browser 16, and the like. Further, the storage section 12 stores the file of the Script file as the registered display screen image data.

The browser 16 is a web browser which allows the display section 50 to display the Script file applied with the HTML conversion processing by the Script Interpreter 151 (the display screen image data transmitted from the PC 31). In the present embodiment, the browser 16 serves as an interface for allowing the display section 50 to display a display screen image in conformity with a screen configuration indicated by a file which is converted by the add-on application 15 and applied with the HTML conversion processing, and also receiving an instruction input operation from a user through a touch panel function of the display section 50 while the display screen image is displayed.

Figure 3:
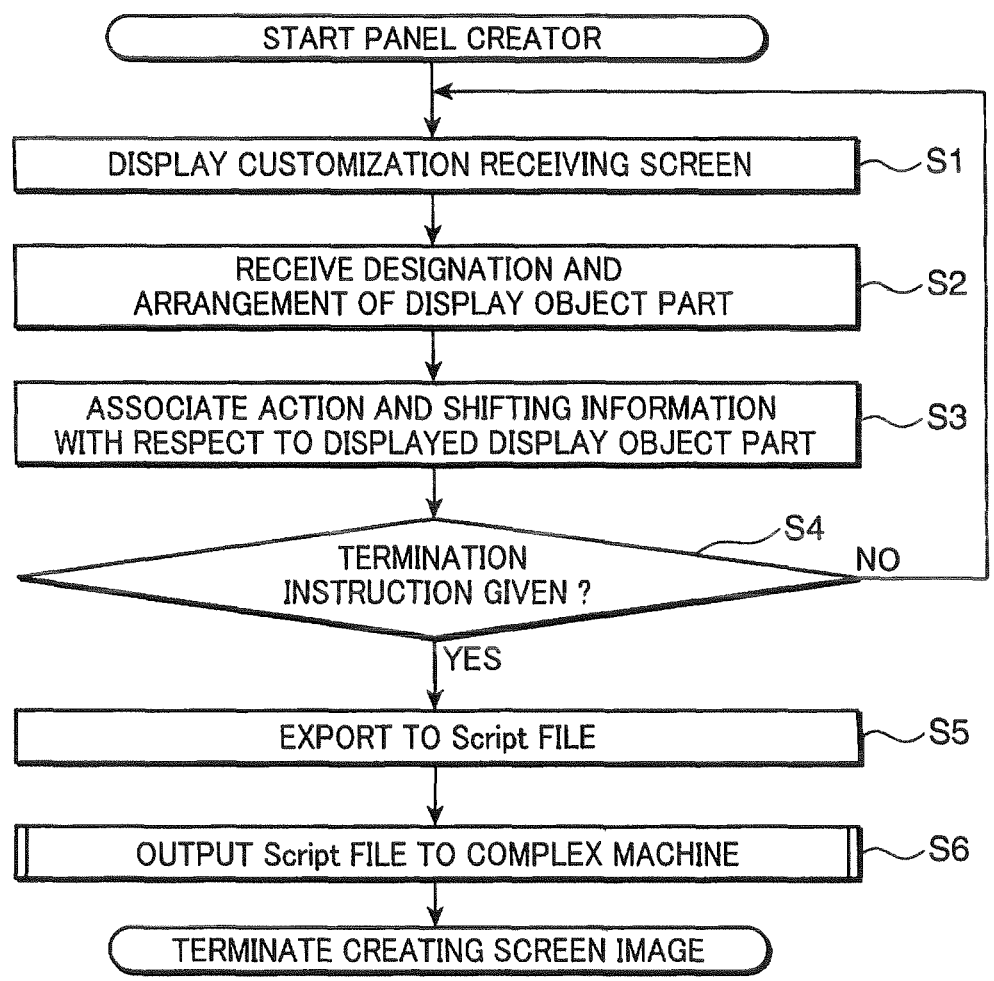
FIG. 3 is a flowchart showing a display screen image creating processing executed by a panel creator section and an output processing with respect to the complex machine.
Figure 4A:
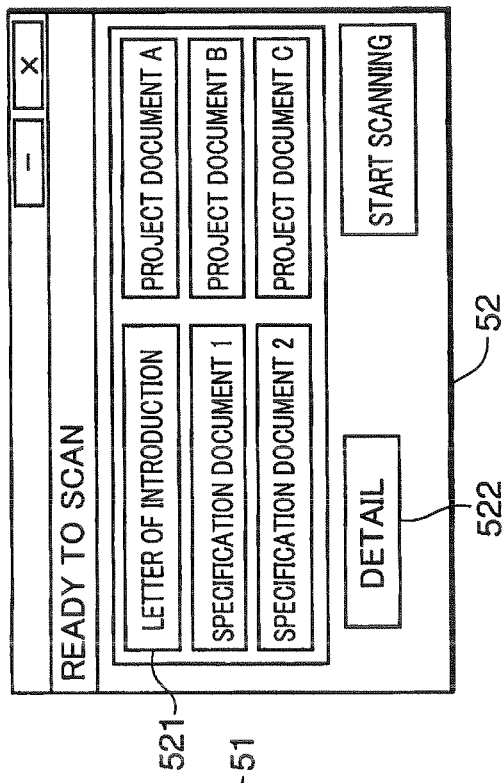
FIGS. 4A and 4B show examples of the display screen image to be displayed by the display section.
Figure 4C:
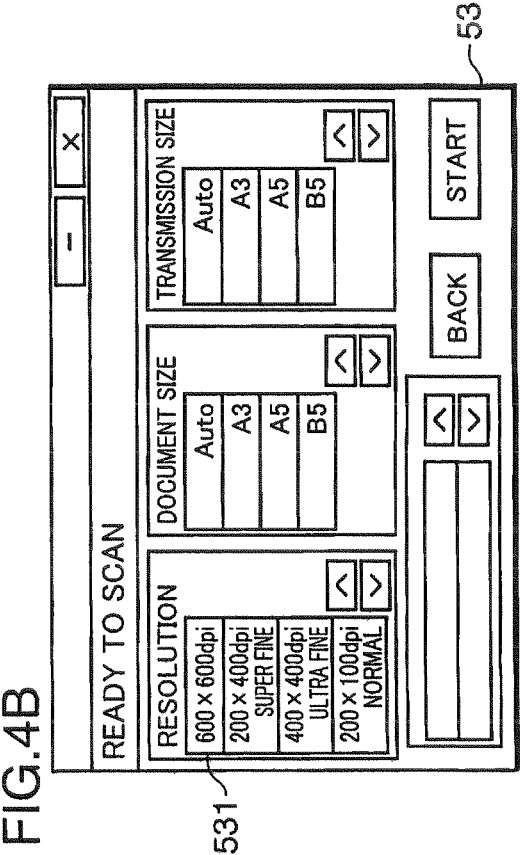
FIG. 4C shows an example of the display screen image created by the creating processing executed by the panel creator section.
Figure 4B:
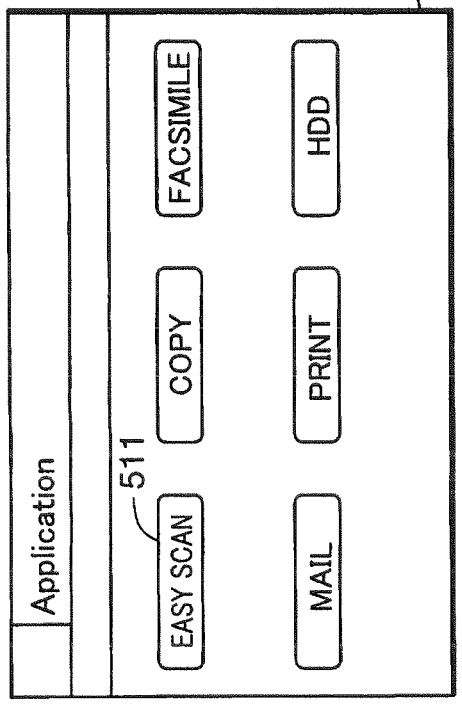
Figure 5:
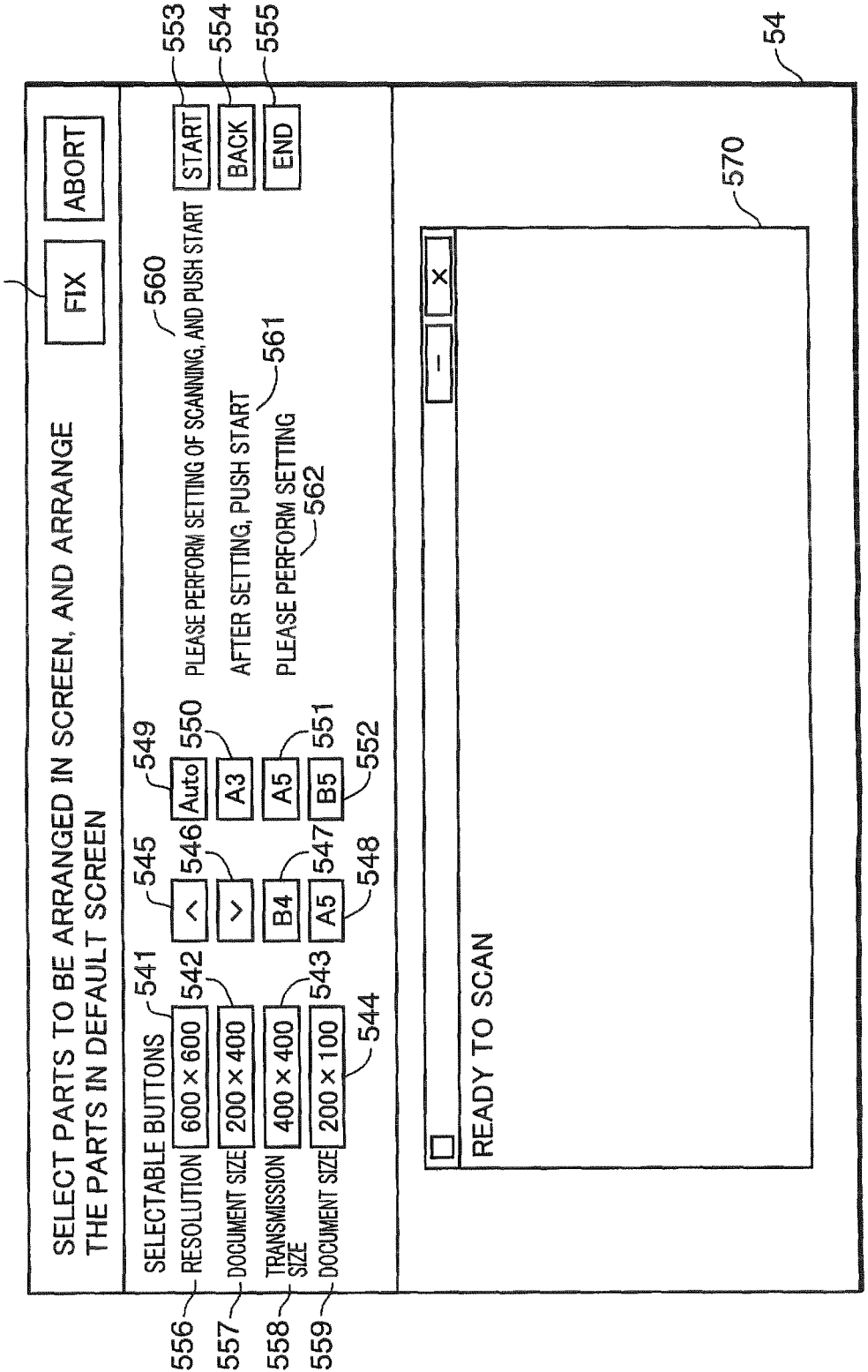
FIG. 5 shows an example of a customization receiving screen.

Next, processing executed by the panel creator section 312 to created a display screen image and output the display screen image to the complex machine 1 will be described. FIG. 3 is a flowchart showing a display screen image creating processing executed by the panel creator section 312 and an output processing with respect to the complex machine 1. FIGS. 4A and 4B show examples of the display screen image to be displayed by the display section 50, and FIG. 4C shows an example of a display screen image created by the creating processing executed by the panel creator section 312. FIG. 5 shows an example of a customization receiving screen.

For example, as shown in FIG. 4A, the display section 50 of the complex machine 1 displays a first display screen image 51 under a control executed by the controller 11 when the power of the complex machine 1 is turned on or when a user pushes an unillustrated application key (for example, a hard key) on an operation panel. If a user pushes, for example, "EASY SCAN" button 511 in the first display screen image 51, the controller 11 starts up the add-on application 15. The Business Logic 152 of the add-on application 15 shifts the display of the display section 50 to, for example, a workflow selection screen 52 shown in FIG. 4B. In the workflow selection screen 52, if a user selects a "LETTER OF INTRODUCTION" button 521 and pushes a "detail" button 522, the Business Logic 152 shifts the display of the display section 50 to a detail setting screen 53 for setting a workflow corresponding to the "LETTER OF INTRODUCTION" button 521. For example, the add-on application 15 (Script Interpreter 151 or the like) has a plurality of screen templates, button templates, and character strings data for the display screen image as shown in FIG. 4C, and analyzes the Script file customized by a user. In accordance with the number of keys to be displayed in the screen image indicated by the Script file, the add-on application 15 uses its own data of screen templates and the like to add character strings to the screen image and buttons and display the same, as shown in the detail setting screen 53 shown in FIG. 4C.

The panel creator section 312 of the PC 31 receives, for example, customization of display object parts such as apparatus buttons constituting the detail set screen 53 from a user and executes processing of creating a display screen image.

In a case of executing the display screen image creating processing, a user operates, for example, an operating section (not illustrated) of the PC 31 to allow the panel creator section 312 to start up. In accordance with the start-up of the panel creator section 312, the controller 310 of the PC 31 controls the display to display a customization receiving screen 54 as shown in FIG. 5 (S1).

In the customization receiving screen 54, if a user operates an operation instruction input section such as a mouse to select and designate desired operation buttons or messages by pushing desired operation buttons or messages among a plurality of operation buttons 541-555 and messages 556-562 displayed as selectable display object parts, the part designation receiving section 3121 receives the selected operation buttons or messages as display object parts to be displayed in the display screen image (in other words, the display screen image to be displayed by the display section 50 of the complex machine 1). Further, if a user performs a drag-and-drop operation of the mouse to drag the selected operation buttons and messages to a desired position in a default screen 570 displayed in the customization receiving section 54, a layout instruction of arranging the selected operation buttons and the like at the desired position is received by the layout instruction receiving section 3122 (S2).

Next, the action setting section 3123 reads actions corresponding to the display object parts, which are instructed to be designated and arranged in the aforementioned manner (in other words, execution instructions as to the operations executed by the complex machine 1 are received), from an internally provided memory area and associates the actions with the selected display object parts (S3). For example, if a user designates "600*600 dpi" button 541 as to resolution, the action setting section 3123 allocates to "600*600 dpi" button 541 an action of inputting an execution instruction as to operation of allowing the scanner section to read a document at resolution of 600*600 dpi at the time when a scanning operation is performed. If a "BACK" button 554 is designated, input of an instruction of shifting display of the display section 50 to the workflow selection screen 52 of FIG. 4B is allocated. As described above, actions corresponding to the display object parts are stored in advance, and the action setting section 3123 allocates corresponding actions.

The processing of S2 and S3 are executed for each display object until a user designates and arranges the display object buttons to be displayed in the default screen 570, clicks a fix button 58 in the customization receiving screen 54 with the mouse, and inputs an instruction of terminating the designation and arrangement (S4).

If the designation and arrangement of the display object parts by a user is terminated (YES in S4), the creating section 3124 creates the display screen image data in a form of Script file in accordance with contents set by the display object part designation, the layout instruction, and the action setting (S5). At this time, the panel simulator section 313 reads data of the Script file exported by the panel creator section 312, analyzes contents of the data, and executes conversion to HTML format data so that the data can be displayed by the display of the PC 31.

After that, the output section 314 outputs (transmits) the display screen image data of the Script file created by the panel creator section 312 to the complex machine 1 in a communication method through the LAN and the like (S6).

Figure 6:
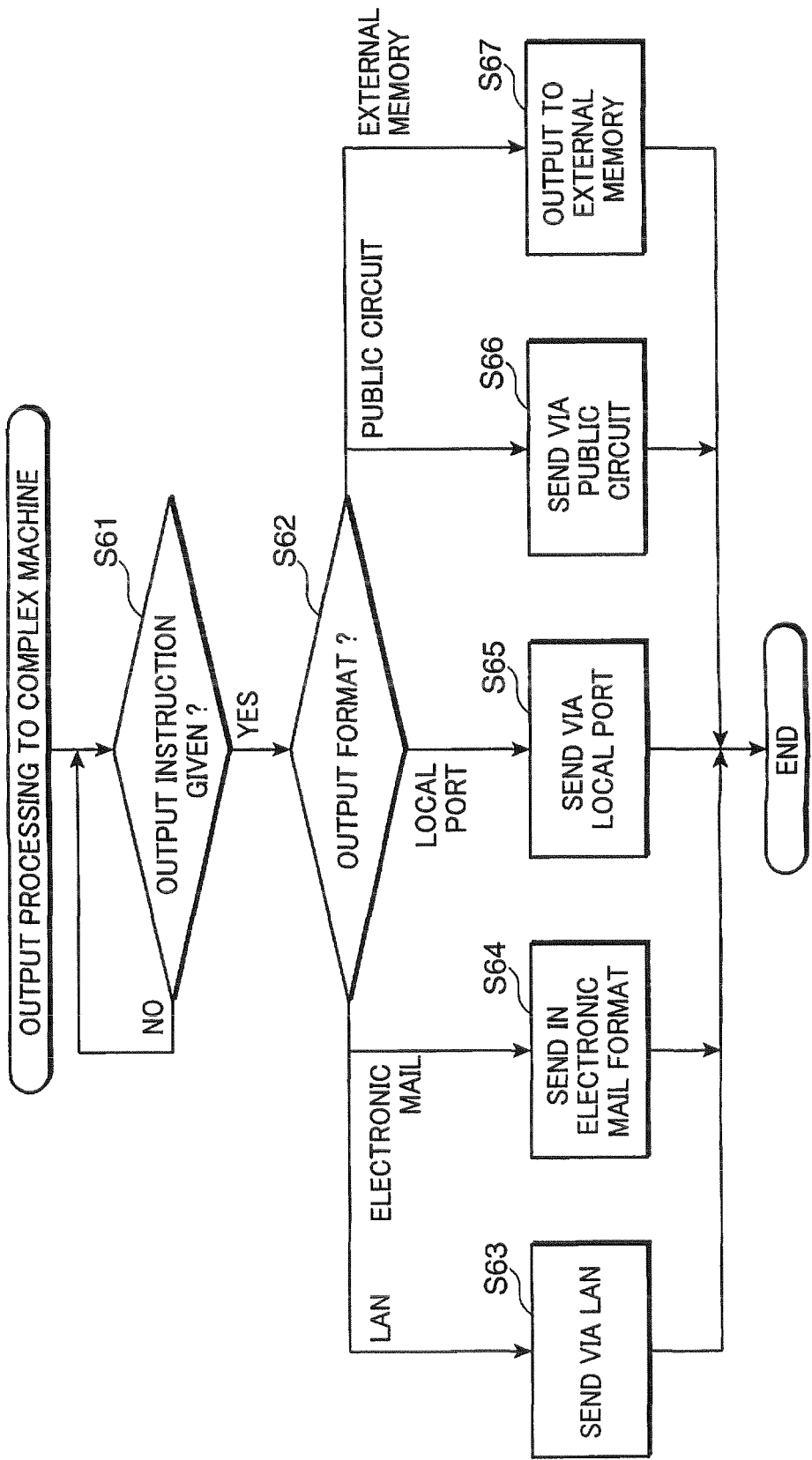
FIG. 6 is a flowchart showing a data output processing executed by the panel creator section to output the display screen image to the complex machine.
Figure 7:
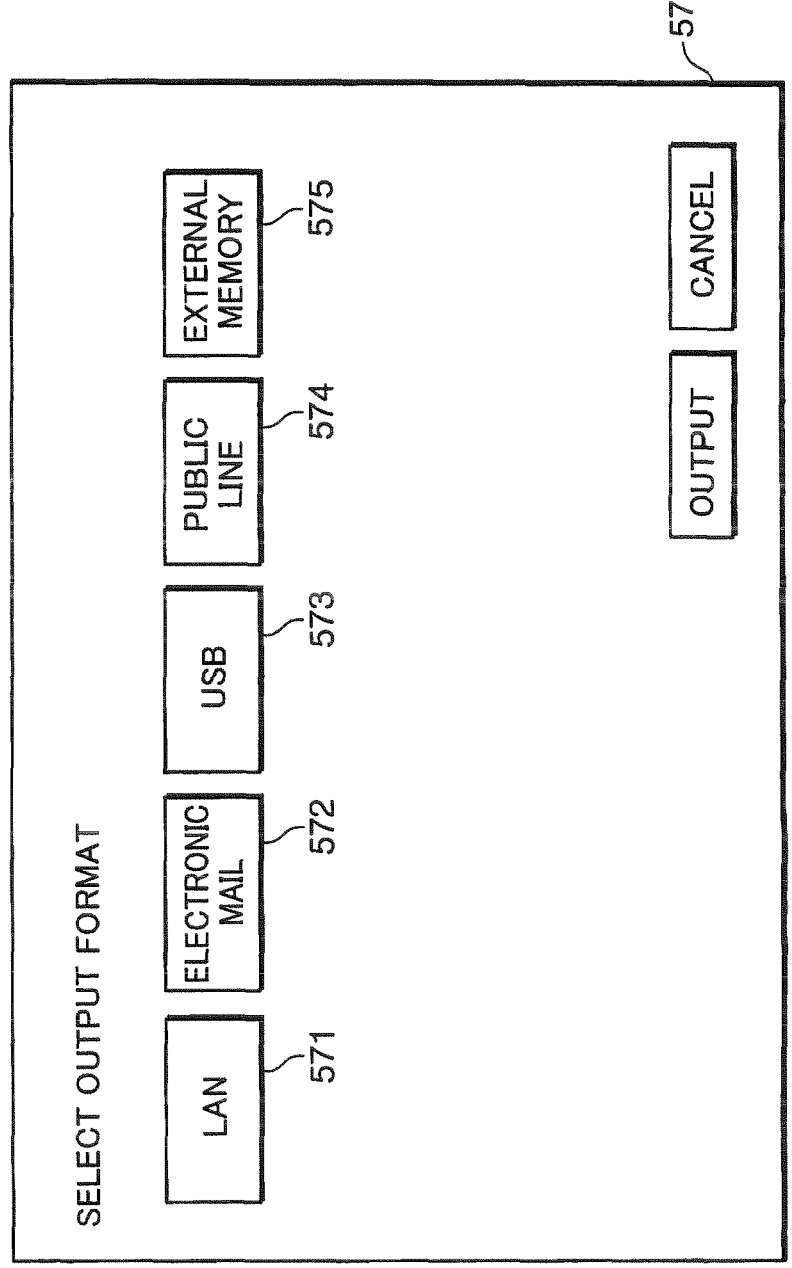
FIG. 7 shows an example of an output format selection screen.

Next, the output processing executed by the panel creator section 312 to output the display screen image data to the complex machine 1 will be described more in detail. FIG. 6 is a flowchart showing the output processing executed by the panel creator section 312 to output the display screen image data to the complex machine 1. FIG. 7 shows an example of an output format selection screen.

After the creating section 3124 of the panel creator section 312 exports the display screen image data to the Script file (in other words, after creating the display screen image data), the output section 314 allows the display of the PC 31 to display an output format selection screen 57 as shown in FIG. 7. This display control may be handled by a display controller which is not illustrated. When the output format selection screen 57 is displayed, and if a user operates the operation instruction input section such as a mouse to push any one of a "LAN" button 571, an "ELECTRONIC MAIL" button 572, a "USB" button 573, a "PUBLIC LINE" button 574, and an "EXTERNAL MEMORY" button 575 to input an output format and an output instruction (YES in S61), the output section 314 outputs the display screen image data exported to the Script file with respect to the complex machine 1 in an instructed output format (S63-S67). In other words, according to the present embodiment, the PC 31 has a configuration which enables connection with complex machine 1 by means of a LAN connection, a local port connection, and a public line connection, and an external memory mounting slot. However, if the PC 31 as a display screen image creating apparatus in accordance with an embodiment of the present invention is capable of executing output operation only in any one of the aforementioned methods (1)-(5), it is sufficient if the PC 31 has a configuration of any one of (1)-(5) capable of executing the output operation and is capable of selecting an output format from the configuration.

In the present embodiment, an example in which the image forming system 10 has one complex machine 1 is shown. Therefore, the output section 314 outputs the display screen image data to the complex machine 1. However, for example, if the image forming system 10 includes a plurality of complex machines, the output section 314 may be provided with an output destination selection button at the output format selection screen 57. If a user operates a mouse or the like to push a button corresponding to a complex machine to which s/he would like to output the display screen image data, the output section 314 may receive an output destination of the display screen image data and output the display screen image data to the complex machine corresponding to the received output destination.

In S62, if a user pushes the "LAN" button 571 to designate output through the LAN as an output format of the display screen image data ("LAN" in S62), the output section 314 outputs the display screen image data exported to the Script file to the complex machine 1, for example, in accordance with an IP address allocated to the complex machine 1 (S63).

In S62, if a user pushes the "ELECTRONIC MAIL" button 572 to designate output through an electronic mail via the LAN as an output format of the display screen image data ("ELECTRONIC MAIL" in S62), the output section 314 outputs the display screen image data exported to the Script file to the complex machine 1, for example, by using a mail address allocated to the complex machine 1 (S64).

In S62, if a user pushes the "USB" button 573 to designate output through a USB port as a local port as an output format of the display screen image data with respect to the complex machine 1 connected to the PC 31 by a USB cable ("LOCAL PORT" in S62), the output section 314 outputs display screen image data exported to the Script file to the complex machine 1 connected to the PC 31 in USB connection (S65). It should be noted that the output may be the one using a parallel port as a local port.

In S62, if a user pushes the "PUBLIC LINE" button 574 to designate output using a public line as an output format of the display screen image data with respect to the complex machine 1 connected to the PC 31 by the public line ("PUBLIC LINE" in S62), the output section 314 outputs display screen image data exported to the Script file to the complex machine 1 through a public line (S66).

In S62, if a user pushes the "EXTERNAL MEMORY" button 575 to designate the method of using an external memory as an output format of the display screen image data ("EXTERNAL MEMORY" in S62), the output section 314 outputs the display screen image data exported to the Script file to an external memory such as a USB memory, a CF (Compact Flash), an SD memory card (Secure Digital memory card), or the like mounted to the external memory slot (S67).

Figure 8:
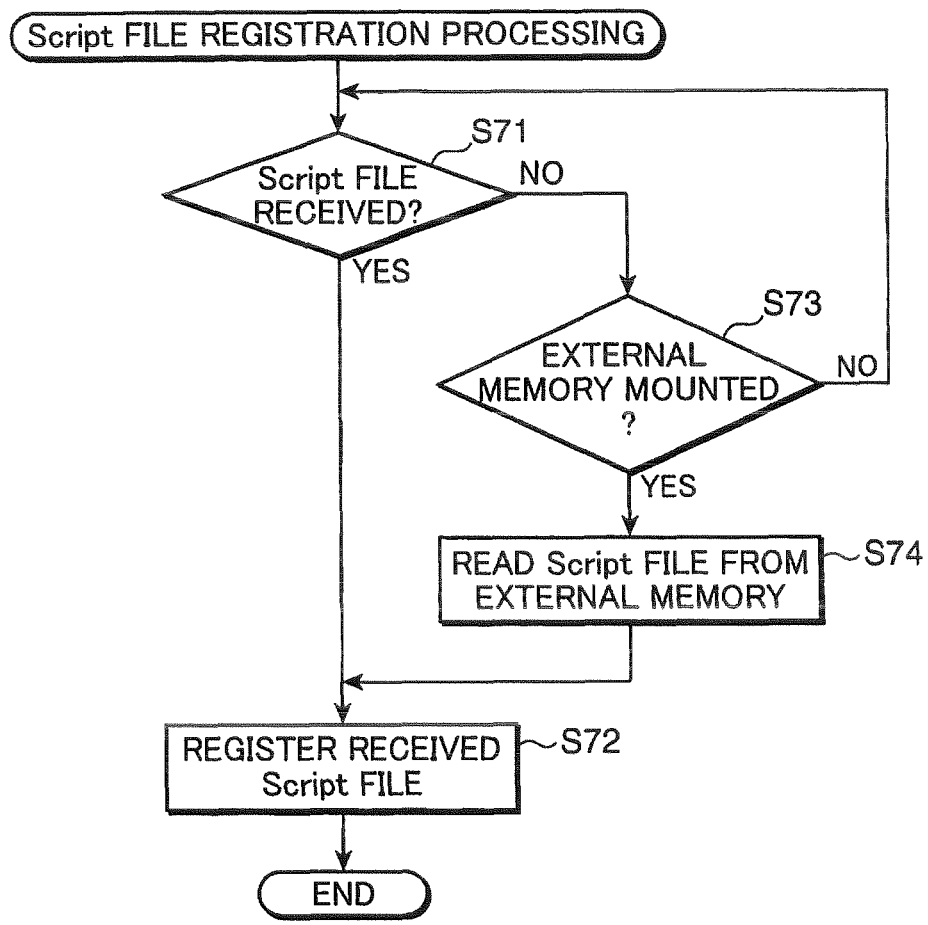
FIG. 8 is a flowchart showing a registration processing for registering the display screen image data in the complex machine.

Next, a registration processing for registering the display screen image data in the complex machine 1 will be described. FIG. 8 is a flowchart showing a registration processing for registering the display screen image data in the complex machine 1.

The registration section 153 of the complex machine 1 determines whether the display screen image data exported to the Script file is transmitted from the PC 31 (S71). Here, for example, if the registration section 153 receives the display screen image data (A) via the LAN, (B) in a form of a electronic mail via the LAN, (C) with use of a local port via a USB cable and the like, or (D) via the public line (YES in S71), it registers the received display screen image data as display data for the display section 50 and allows the storage section 12 to store the data (S72).

If the display screen image data is not received in any of the aforementioned methods (NO in S71), the registration section 153 determines whether the external memory is mounted to the external memory slot or the USB slot provided in the complex machine 1 (S73).

Here, if the registration section 153 determines that the external memory is mounted to the external memory slot or the USB slot (YES in S73), it reads the display screen image data exported to the Script file from the mounted external memory (S74) and registers the read display screen image data as display data for the display section 50 and allows the storage section 12 to store the data (S72). If the registration section 153 determines that the external memory is not mounted (NO in S73), it repeats the processing of S71.

Figure 9:
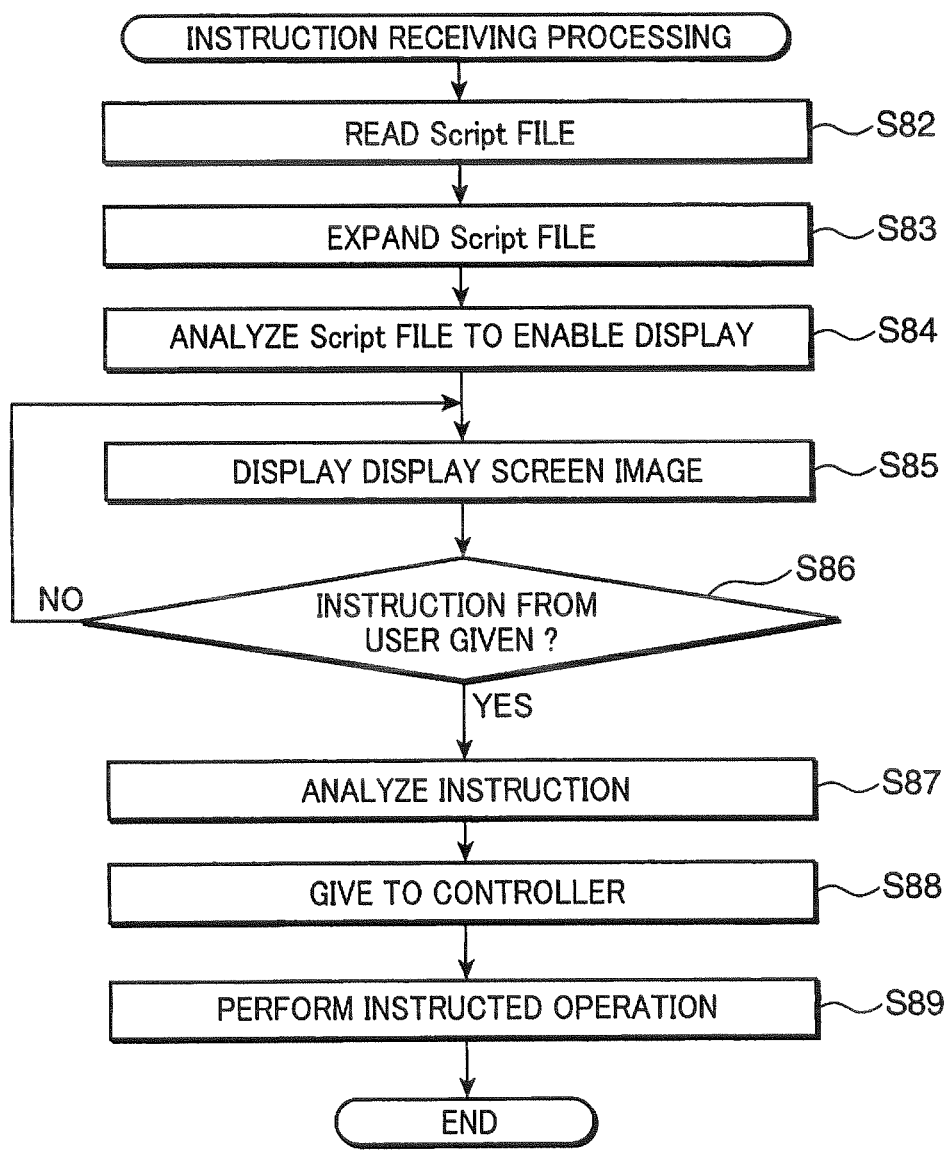
FIG. 9 is a flowchart showing a display processing for allowing the display section to display the display screen image created in the PC, and a receiving processing for receiving an operation execution instruction from a user, in the complex machine.

Next, display processing executed by the display section 50 to display the display screen image created in the PC 31 and receiving processing for receiving an operation execution instruction from a user in the complex machine 1 will be described. FIG. 9 is a flowchart showing a display processing for allowing the display section 50 to display the display screen image created in the PC 31 and a receiving processing for receiving an operation execution instruction from a user, in the complex machine 1.

For example, if a user pushes the "DETAIL" button 522 of the workflow selection screen 52 shown in FIG. 4B to input an instruction of shifting the display screen image to the next layer, the Script Interpreter 151 reads the Script file as the display screen image data from the storage section 12 (S82). If a plurality of files of the Script file as the display screen image data are present in the storage section 12, the Script Interpreter 151 reads a file of the Script file registered as a screen of a destination shifted from a previously displayed screen image. Then, the Script Interpreter 151 executes HTML conversion processing for enabling the display section 50 to display the display screen image and expansion processing to the Business Logic 152 for execution of an action associated with display object part such as an operation button arranged in the display screen image (S83).

Next, the Business Logic 152 analyzes the data obtained from the Script Interpreter 151 and applied with the HTML conversion processing so as to enable the display section 50 to display the data and gives the data to the browser 16 (S84).

The browser 16 allows the display section 50 to display the display data received from the Business Logic 152 (S85). This allows display section 50 to display the display screen image created by the panel creator section 312 of the PC 31 (for example, the display screen image 53 shown in FIG. 4C) In this regard, the Script Interpreter 151, the Business Logic 152, the browser 16, and the controller 11 serves as a display controller in claims.

During when the display screen image is displayed by the browser 16, if a user performs operation using the touch panel function, for example, by pushing any of display buttons in the detail setting screen 53 shown in FIG. 4C to input an operation execution instruction (YES in S86), the Business Logic 152 analyzes an action associated with the operated display button based on information given by the Script Interpreter 151 (S87). For example, if a user pushes the "600*600 dpi" button 541 of the detail setting screen 53, the Business Logic 152 analyzes, based on information given by the Script Interpreter 151, that a function operation corresponding to the "600*600 dpi" button 541 is an input of an execution instruction as to an operation of allowing the scanner section to read a document at resolution of 600*600 dpi at the time of performing the scanning operation.

Next, to execute the analyzed function, the Business Logic 152 calls out the API corresponding to the function and allows the controller 11 to execute the analyzed function (S88). For example, if a user pushes the "600*600 dpi" button 541 during when the detail setting screen 53 is displayed, the Business Logic 152 analyzes, based on information given by the Script Interpreter 151, that a function operation corresponding to the "600*600 dpi" button 541 is an input of an execution instruction as to an operation of allowing the scanner section to read a document at resolution of 600*600 dpi at the time of performing the scanning operation and receives the "input of an execution instruction as to an operation of allowing the scanner section to read a document at resolution of 600*600 dpi." Then, to execute the "operation of allowing the scanner section to read a document at resolution of 600*600 dpi," the Business Logic 152 calls out the API corresponding to the "operation of allowing the scanner section to read a document at resolution of 600*600 dpi."

In accordance with the API, the controller 11 executes the instructed operation (S89). For example, the controller 11 executes the "operation of allowing the scanner section to read a document at resolution of 600*600 dpi." In other words, the Business Logic 152 performs setting with respect to the controller 11 via the API to allow the scanner section to read a document at resolution of 600*600 dpi.

Figure 10:
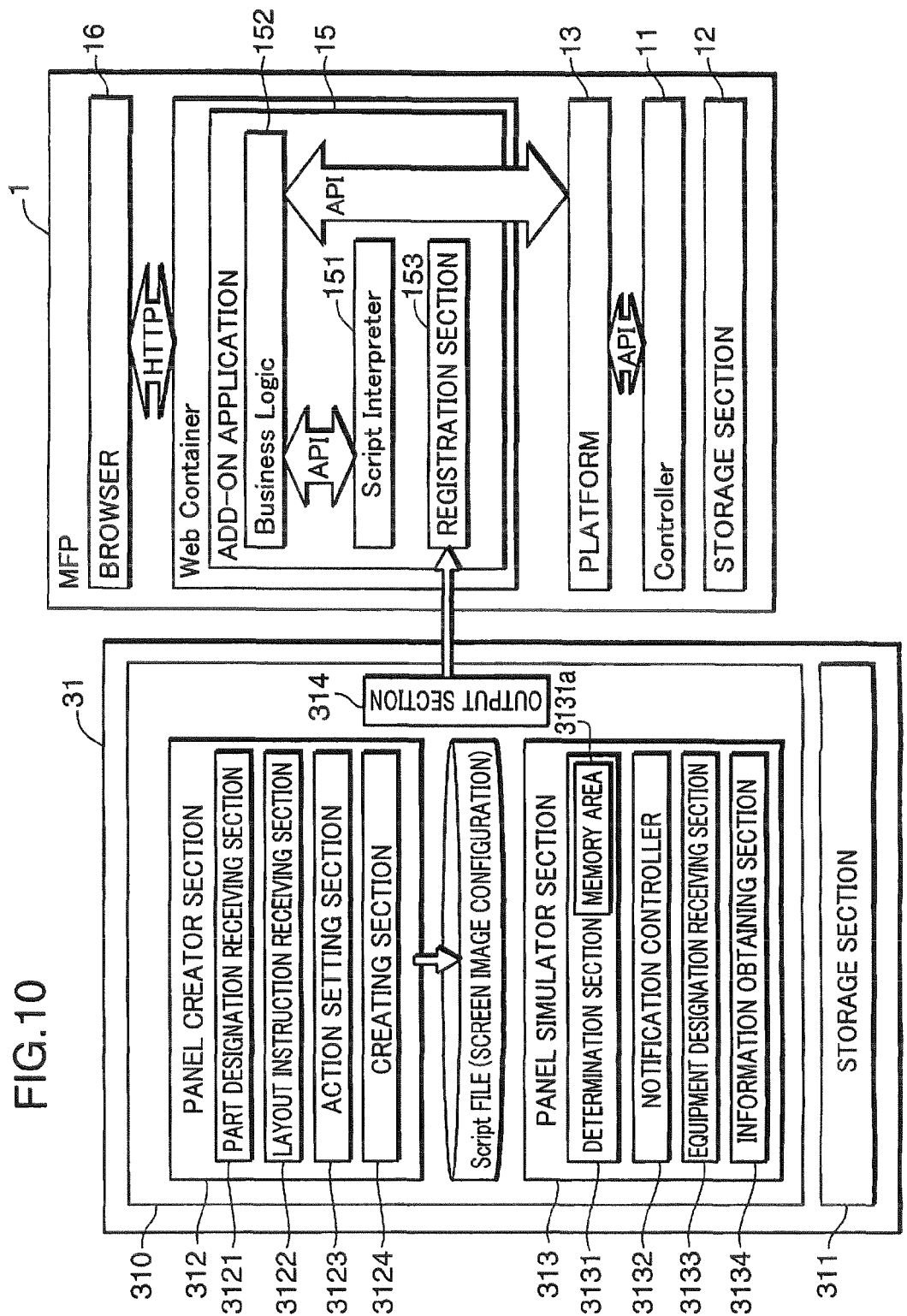
FIG. 10 shows a second embodiment of configurations of the PC and the complex machine for executing a display screen image creating processing and a display screen image displaying processing.

Next, a second embodiment of internal configurations of the server computer SV2, the PCs 31-34, and the complex machine 1 will be described, which are necessary for executing display screen image data creating processing and display screen image data display processing. FIG. 10 shows a second embodiment of the configurations of the PC and the complex machine 1 for executing the display screen image creating processing and the display screen image display processing. Description as to the configuration and the processing which are the same as the first embodiment will be omitted. Similarly to the first embodiment, since the configurations necessary for the server computer SV2 and the PCs 31-34 to execute the display screen image creating processing are the same, FIG. 10 shows a configuration of the PC 31.

In the second embodiment, the panel simulator section 313 serves as a determination section 3131, a notification controller 3132, an equipment designation receiving section 3133, and an information obtaining section 3134.

The determination section 3131 determines whether a configuration of a display object part displayed in the display screen image created by the panel creator section 312 conforms to a function of the complex machine which displays the display screen image by means of the display section 50. For example, the determination section 3131 stores predetermined basic functions (a copying function, a scanner function, a density setting function, a sheet size setting function, a resolution setting function, and the like) to be executed by the complex machine 1 and predetermined basic rules (for example, a prohibition rule defining that only one "start button," which is a display object part for receiving a scanning operation execution instruction, is arranged in a display screen image) as to the display screen image to be displayed by means of the display section 50 of the complex machine 1 in a memory area 3131a which is internally provided, and determines whether the configuration of the display object parts arranged in the display screen image created by the panel creator section 312 conforms to the basic functions and basic rules of the complex machine 1. The basic functions and basic rules of the complex machine 1 are examples of functions of the electric equipment in claims.

If the determination section 3131 determines that the configuration of the display object part does not conform to the function of the complex machine 1, the notification controller 3132 performs controls of notifying the contents in nonconformity by means of the display section of the PC 31 or by means of sound with an unillustrated speaker.

The equipment designation receiving section 3133 receives a designation of the complex machine 1 whose display section 50 displays the created display screen image.

The information obtaining section (serving as a function information obtaining section and an equipment status information obtaining section) 3134 obtains, from the complex machine 1 and the like which is connected to the PC 31, function information which can be executed by the complex machine 1 or equipment status information indicating functions.

The output section 314 outputs the display screen image data of the Script file created by the creating section 3124 to the complex machine 1 via the LAN. The output section 314 outputs display screen image data, which is determined by the determination section 3131 of the panel simulator section 313 a configuration of the display object part conforms to the function of the complex machine 1, to the complex machine 1.

Figure 11:
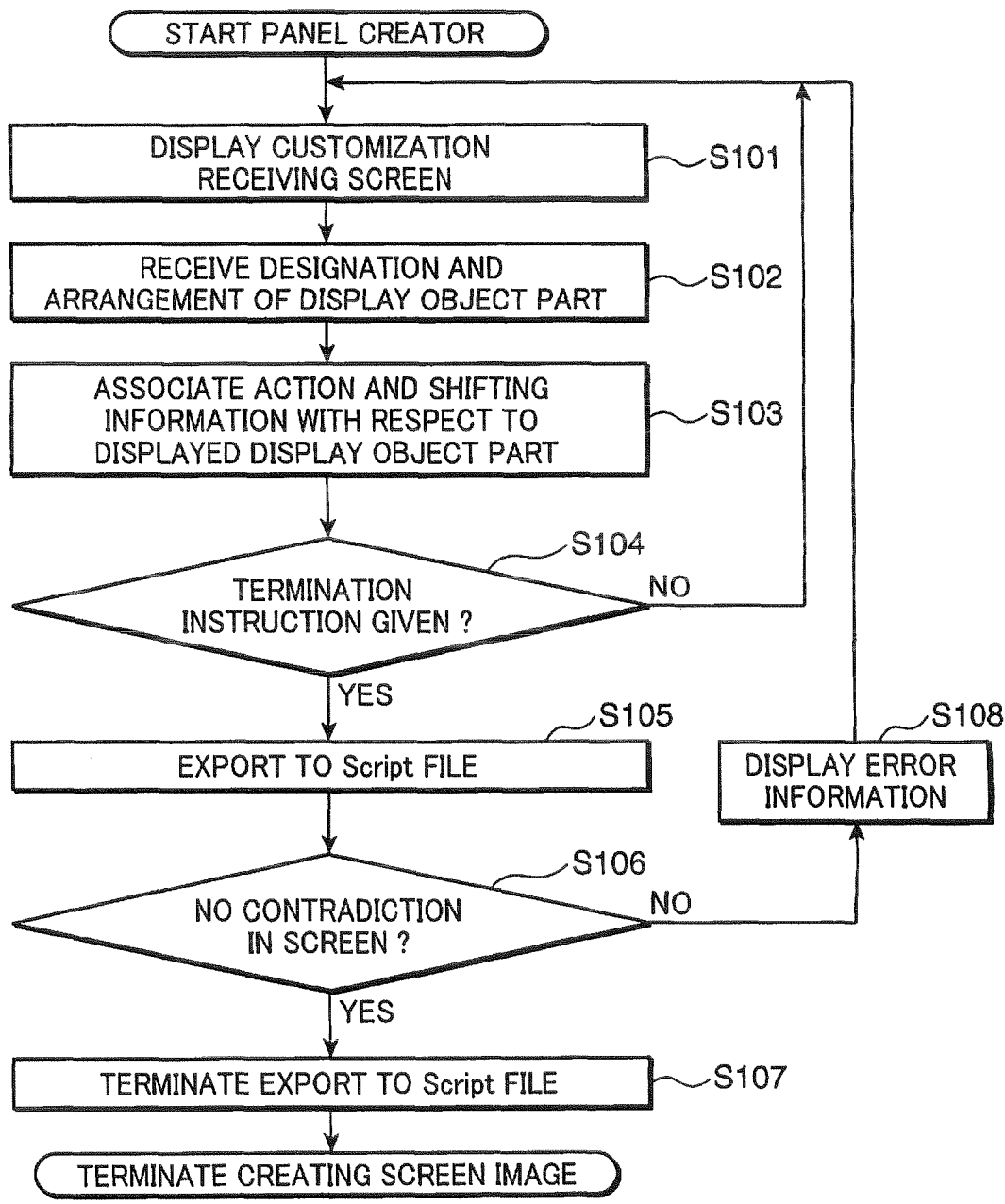
FIG. 11 is a flowchart showing a first example of a display screen image creating processing executed by a panel creator section and a panel simulator section in accordance with the second embodiment.

Next, a first example of the display screen image creating processing executed by the panel creator section 312 and the panel simulator section 313 in accordance with the second embodiment will be described. FIG. 11 is a flowchart showing a first example of the display screen image creating processing executed by the panel creator section 312 and the panel simulator section 313 in accordance with the second embodiment. Description regarding the processing which is the same as the first embodiment will be omitted.

Similarly to the first embodiment, after a user completes designation and arrangement of the display object parts (YES in S104), and the creating section 3124 creates the display screen image data in a Script file in accordance with contents of the display object part designation, the layout instruction, and the action setting (S105), the panel simulator section 313 reads the Script file exported by the panel creator section 312, analyzes its content, and converts the data into HTML format data to enable the data to be displayed by the display of the PC 31. Thereafter, the determination section 3131 determines whether the configuration of the display object parts arranged in the display screen image conforms to the functions of the complex machine 1 which displays the display screen image by means of the display section 50 (S106).

For example, the determination section 3131 stores basic rules (for example, a prohibition rule defining that only one "start button" 553 which is a display object part for receiving a scanning operation execution instruction, is arranged in a display screen image) as to the display screen image to be displayed by means of the display section 50 of the complex machine 1 and determines whether the configuration of the display object parts arranged in the created display screen image conforms to the basic rules of the complex machine 1 (S106).

If the determination section 3131 determines that the configuration of the display object parts arranged in the display screen image does not conform to the basic rules of the complex machine 1 and contradicts the basic rules of the complex machine 1 (NO in S106), the notification controller 3132 performs controls of notifying the contents in non-conformity (for example, the "start" button 553 is not present in the display screen image, or two "start" buttons 553 are arranged) by means of the display of the PC 31 or by means of sound with an unillustrated speaker (S108). In this manner, the PC 31 encourages a user to change or edit the screen again. After S108, the processing goes back to S101.

If the determination section 3131 determines that the configuration of the display object parts arranged in the display screen image conforms to the basic functions and basic rules of the complex machine 1 (YES in S106), the creating section 3124 terminates the exporting of the screen image data of the display screen image (display screen image data) (S107), thereby terminating the display screen image creating processing. The processing of outputting the screen image data of the display screen image to the complex machine 1 is performed in a manner similar to the first embodiment.

Figure 12:
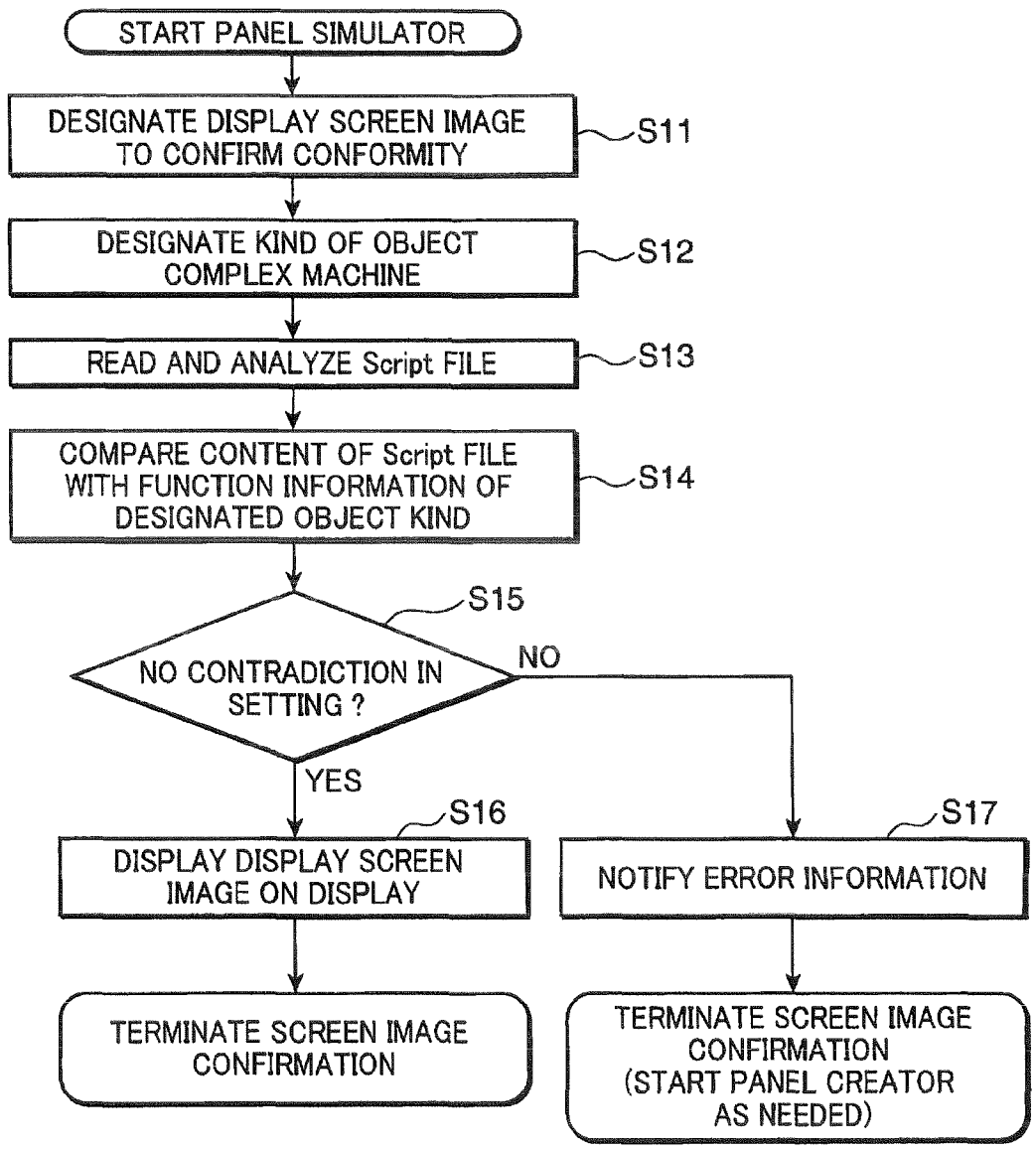
FIG. 12 is a flowchart showing a second example of the display screen image creating processing executed by the panel creator section and the panel simulator section in accordance with the second embodiment.

Next, a second example of the display screen image creating processing executed by the panel creator section 312 and the panel simulator section 313 in accordance with the second embodiment will be described. FIG. 12 is a flowchart showing a second example of the display screen image creating processing executed by the panel creator section 312 and the panel simulator section 313 in accordance with the second embodiment. Description regarding the processing which is the same as the first example will be omitted.

In the second example, it is presumed that the image forming system 10 includes a plurality of kinds of complex machines 1.

In the second example, it is determined whether the display object parts arranged in the created display screen image conform to functions corresponding to a respective kind of complex machine 1, for example, whether operation buttons as to functions which are not provided in the designated kind of complex machine 1 are designated, and then the result is notified to a user.

The processing of the second example shown in FIG. 12 is started after the processing in S107 of FIG. 11 is terminated, or when a user designates a display screen image about which the user would like to confirm conformity thereof.

For example, if a user operates the operating section of the PC 31 to designate the display screen image about which s/he would like to confirm conformity (S11), and operates the operating section to allow the equipment designation receiving section 3133 to receive designation of the complex machine 1 whose display section 50 should display the display screen image (S12), the determination section 3131 reads the Script file of the display screen image designated in S11 and analyzes selected display object parts and actions which are associated with the display object parts (S13).

Then, the determination section 3131 reads function information corresponding to the kind of complex machine 1 designated in the S12 from the memory area 3131a internally provided in the determination section 3131, and determines, based on the read function information, whether the designated complex machine 1 has functions for executing actions set in the display object parts arranged in the created display screen image (S14). The memory area 3131a function information indicating basic functions (a copying function, a scanner function, a density setting function, a sheet size setting function, a resolution setting function, and the like) which can be executed in respective kinds of machines, for each kind of complex machine.

If the determination section 3131 determines that the complex machine 1 designated in the S12 does not have a function to execute the action set in the display object part arranged in the display screen image, in other words, the configuration of the display object parts of the display screen image contradicts with the function of the complex machine 1 designated in the S12 (NO in S15), the notification controller 3132 executes a control of notifying contents in non-conformity (for example, notifying that a "facsimile start button" for receiving an execution instruction of a facsimile function is arranged in the display screen image even though the designated complex machine 1 does not have a facsimile function) by means of the display of the PC 31 or by means of sound from an unillustrated speaker (S17).

After the S17, since it is necessary to change the configuration of the display object parts in the display screen image, the panel creator section 312 may start the processing for creating the display screen image.

Further, if the determination section 3131 determines that the configuration of the display object parts of the display screen image does not contradict the function of the complex machine 1 designated in the S12 (YES in S15), the controller 310 controls the display of the PC 31 to display a display screen image indicating conformity with the function of the complex machine 1 (S16). The transmission of display screen image data to the complex machine by the output section 314 shown in the first example may be performed after it is determined that no contradiction is found in S15 or after the display in S16.

Figure 13:
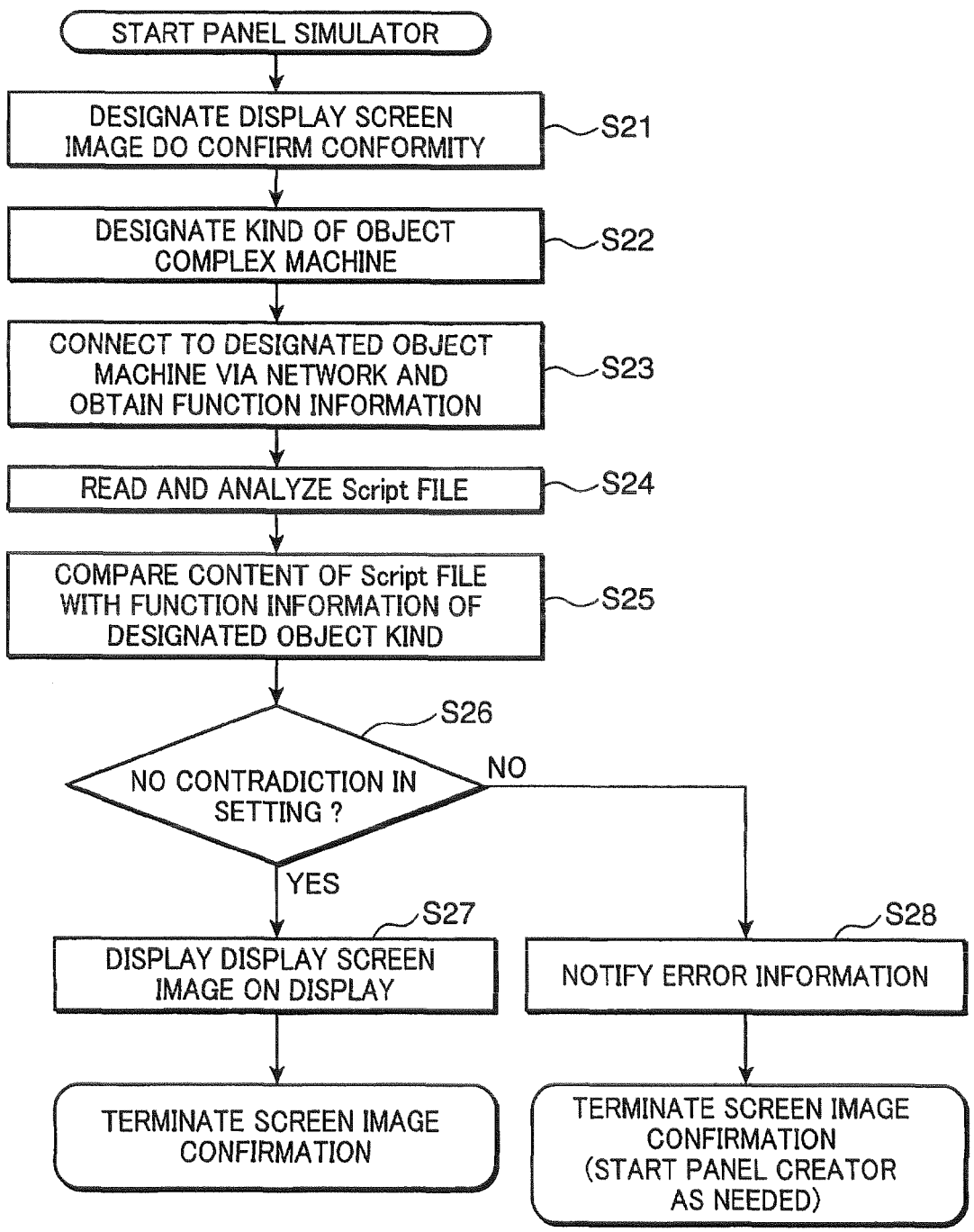
FIG. 13 is a flowchart showing a third example of the display screen image creating processing executed by the panel creator section and the panel simulator section in accordance with the second embodiment.

Next, a third example of the display screen image creating processing executed by the panel creator section 312 and the panel simulator section 313 in accordance with the second embodiment will be described. FIG. 13 is a flowchart showing the third example of the display screen image creating processing executed by the panel creator section 312 and the panel simulator section 313. The processing which is the same as the first and second examples will be omitted.

In the third example, the information obtaining section 3134 of the panel simulator section 313 actually accesses the complex machine 1, which is connected via network to the PC 31 having created the display screen image and allows the display section 50 to display the created display screen image, to obtain function information of the complex machine 1 from the complex machine 1. The determination section 3131 determines whether each display object part arranged in the created display screen image and an action associated with the display object part conform to a respective function which is indicated by the function information and can be executed by the complex machine 1, in other words, whether the display object part and action as to the function not provided in the designated kind of complex machine 1 are set.

For example, if a user operates the operating section to designate a display screen image about which s/he would like to confirm the conformity (S21) and further operates the operating section to allow the equipment designation receiving section 3133 to search the complex machine 1 connected as a printer to the PC 31 via network and designates a host name and an IP address indicating the complex machine 1 to the equipment designation receiving section 3133 so that the equipment designation receiving section 3133 receives a designation of the complex machine 1 whose display section 50 displays display screen image (S22), the information obtaining section 3134 of the panel simulator section 313, in accordance with the IP address of the complex machine 1 obtained by the search or from the user, connects via network to the complex machine 1 as a designated equipment and obtains function information from the complex machine 1 (S23). In the complex machine 1, for example, the controller 11 has the function information, and the controller 11 transmits the function information via network to the PC 31.

Next, the determination section 3131 reads the Script file of the display screen image designated in S21 and analyzes the selected display object part and actions associated with the display object part (S24).

Then, the determination section 3131, in accordance with the function information obtained from the complex machine 1, determines whether the configuration of the display object part in the display screen image contradicts the function of the complex machine 1 obtained in the S23 (S25). The processing subsequent to the determination are the same as the second example.

Figure 14:
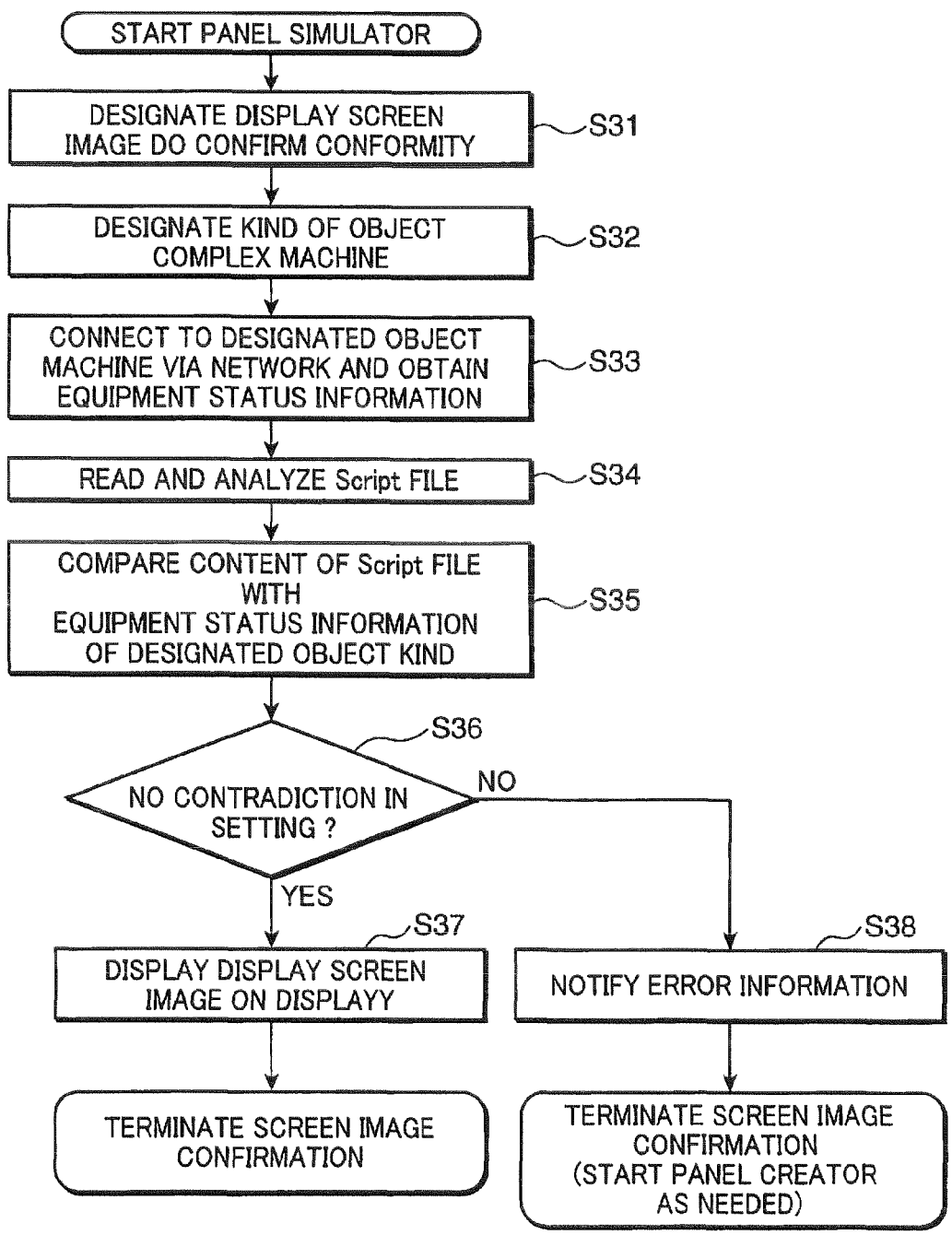
FIG. 14 is a flowchart showing a fourth embodiment of a display screen image customizing processing executed by the panel creator section and the panel simulator section in accordance with the second embodiment.

Next, a fourth example of display screen image customizing processing executed by the panel creator section 312 and the panel simulator section 313 in accordance with the second embodiment will be described. FIG. 14 is a flowchart showing the fourth example of the display screen image customizing processing executed by the panel creator section 312 and the panel simulator section 313 in accordance with the second embodiment. Description about the processing which are the same as the first through third examples will be omitted.

In the fourth example, similarly to the third example, the complex machine 1 allows the display section 50 to display the created display screen image, and the information obtaining section 3134 of the panel simulator section 313 receives function information from the complex machine 1 designated by a user. At the time of obtaining the function information, the information obtaining section 3134 obtains equipment status information indicating specification set up in the complex machine 1 during the communication from the complex machine 1 (S33 (at this time, the information obtaining section 3134 serves as an equipment status information obtaining section)). For example, the information obtaining section 3134 obtains equipment status information from the complex machine 1, where the equipment status information indicates specification of the complex machine 1, such as the number of sheet-feeding cassettes set in the complex machine 1 and whether a post-processing mechanism for performing sheet post-processing is set, at the time of the communication. In the complex machine 1, for example, the equipment status information is stored in the memory area of the controller 11, and the controller 11 transmits the equipment status information to the PC 31 via network.

Next, the determination section 3131 reads the Script file of the display screen image designated in S31 and analyzes display object parts and actions associated with the display object part (S34).

Then, the determination section 3131, based on the equipment status information obtained from the complex machine 1, determines whether the configuration of the display object parts of the display screen image contradict the equipment status of the complex machine 1 obtained in S33 (S35) and executes the processing subsequent to S36 in a manner similar to the third example.

In the second embodiment, the PC 31 has display screen image creating function according to the configuration shown in FIG. 10, and the display screen image data created by the PC 31 is transmitted to the complex machine 1, and the display section 50 of the complex machine 1 displays the display screen image data. However, the complex machine 1 may have the display screen image creating apparatus having the display screen image creating function shown in FIG. 10, and the display section 50 may display the display screen image data, which is created by the display screen image creating apparatus, by means of the add-on application 15 and the browser 16 of the complex machine 1.

Figure 15:
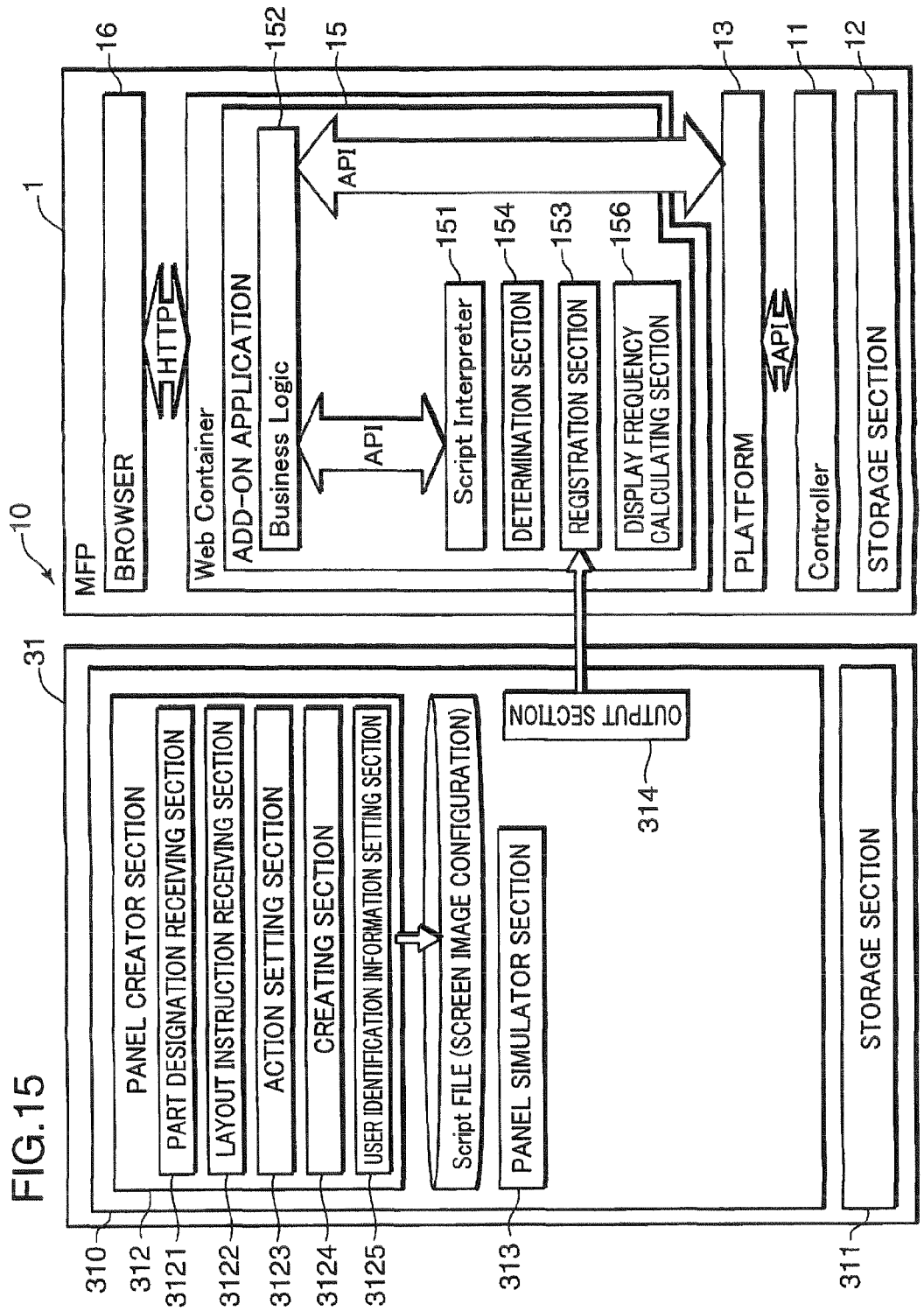
FIG. 15 shows a third embodiment of configurations of the PC and the complex machine which are necessary for executing the display screen image creating processing and the display screen image displaying processing.

Next, a third embodiment of configurations corresponding to internal configurations of the server computer SV2, the PCs 31-34, and the complex machine 1 and being necessary for the display screen image data creating processing and display screen image data display processing will be described. FIG. 15 shows the third embodiment of the configurations of the personal computer and complex machine 1 which are necessary for executing the display screen image creating processing and the display screen image display processing. Description as to the configuration and processing which are the same as the first and second embodiments will be omitted. Similarly to the first or second embodiment, since the configuration necessary for the display screen image creating processing are the same in the server computer SV2 and the PCs 31-34, the configuration of the PC 31 will be shown in FIG. 15.

In the third embodiment, the panel creator section 312 of the PC 31 further includes a user identification information setting section 3125 in addition to the configurations of the first and second embodiments. The user identification information setting section 3125 associates user identification information inputted by a user through the operating section and the like of the PC 31 with the display screen image created by the part designation receiving section 3121, the layout instruction receiving section 3122, and the action setting section 3123. The configuration of the panel simulator section 313 is the same as the first embodiment.

Further, the creating section 3124 executes the processing of creating the display screen image by using contents determined by the display object part designation at the part designation receiving section 3121, the layout instruction at the layout instruction receiving section 3122, and the action setting at the action setting section 3123, and the user identification information set at the user identification information setting section 3125. In other words, if a user performs the display object part designation at the part designation receiving section 3121, the layout instruction at the layout instruction receiving section 3122, the action setting at the action setting section 3123, and the input of the user identification information for setting at the user identification information setting section 3125, the creating section 3124 executes the display screen image creating processing to create the display screen image to be displayed by the display section 50 of the complex machine 1 in a desirably customized manner.

The output section 314 outputs the display screen image data created by the creating section 3124 and including the user identification information to the complex machine 1.

In the third embodiment, the add-on application 15 of the complex machine 1 mainly includes the Script Interpreter 151, the Business Logic 152, the registration section 153, the discriminating section 154, and a display frequency calculating section 156.

The registration section 153 registers the display screen image data of the display screen image including the user identification information outputted from the output section 314 of the PC 31 (a display screen image constituted by the Script file and customized by a user) to the storage section 12 and allows the storage section 12 to store the data.

The discriminating section 154, based on the user identification information inputted by a user through an unillustrated operation section and the like of the complex machine 1, discriminates the display screen image data including the user identification information from display screen image data registered by the registration section 153. The Script Interpreter 151, the Business Logic 152, the browser 16, and the controller 11 allows the display section 50 to display the display data discriminated by the discriminating section 154.

The display frequency calculating section 156 calculates a display frequency of the display screen image data, which is obtained by the registration section 153 and registered, on the display section 50 based on the user identification information for each user.

A CPU as a central controller of the complex machine 1 operates in accordance with an operation control program, a display control program, and the like stored in the storage section 12 to thereby serve as the controller 11, the add-on application 15, the browser 16, and the like which perform the display control processing necessary in the third embodiment.

Figure 16:
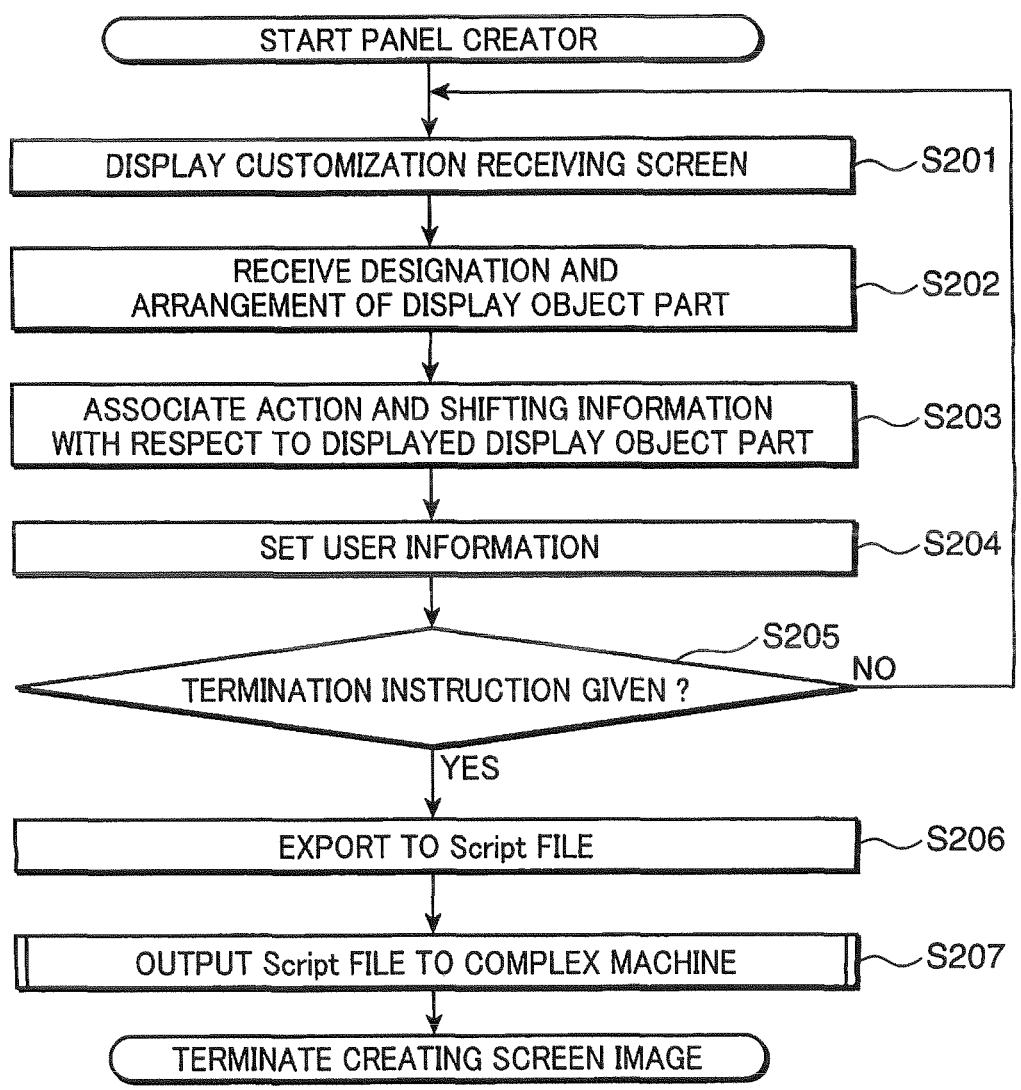
FIG. 16 is a flowchart showing a display screen image creating processing executed by the panel creator section and an output processing with respect to the complex machine.

Next, the display screen image creating processing and the output processing to the complex machine 1 which are executed by the panel creator section 312 in accordance with the third embodiment will be described. FIG. 16 is a flowchart showing the display screen image creating processing executed by the panel creator section 312 and the output processing with respect to the complex machine 1, which are executed by the panel creator section 312. Description as to the processing which are the same as the display screen image creating processing and the output processing in accordance with the first or second embodiment will be omitted.

After the action setting section 3123 reads an action corresponding to each display object part, as to which an instruction of designation and arrangement is given by a user in the aforementioned manner, from the memory area and associates the action with the selected display object part (S203), the user identification information setting section 3125 associates the user identification information inputted by a user from the operating section and the like of the PC 31 with the display screen image created in S201-S203 (S204).

The processing in S201-S204 are executed with respect to each display object part until a user designates and arranges a display object part button which s/he desires to display in the default screen 570, clicks the fix button 58 in the customization receiving screen 54 by means of a mouse or the like, and inputs an instruction of terminating the designation and arrangement (S205).

If the designation and arrangement of the display object part is terminated (YES in S205), the creating section 3124 creates the display screen image data in Script file data in accordance with contents of the display object part designation, the layout instruction, the action setting, and the setting of user identification information (S206).

Figure 17:
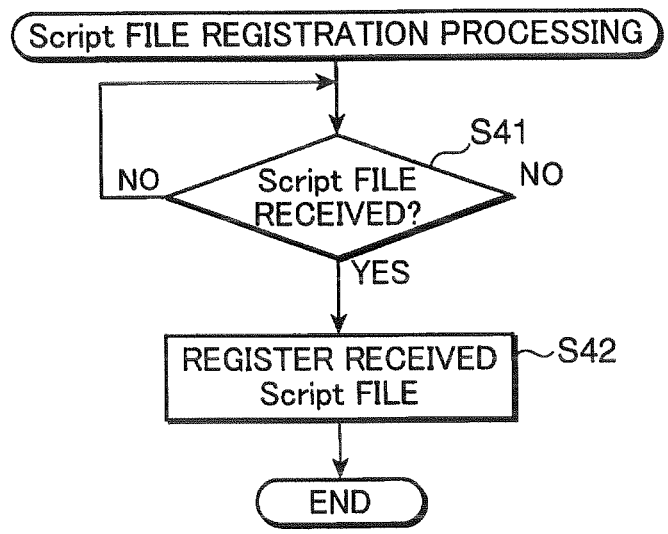
FIG. 17 is a flowchart showing a display screen image data registration processing executed by the complex machine in accordance with the third embodiment.
Figure 19:
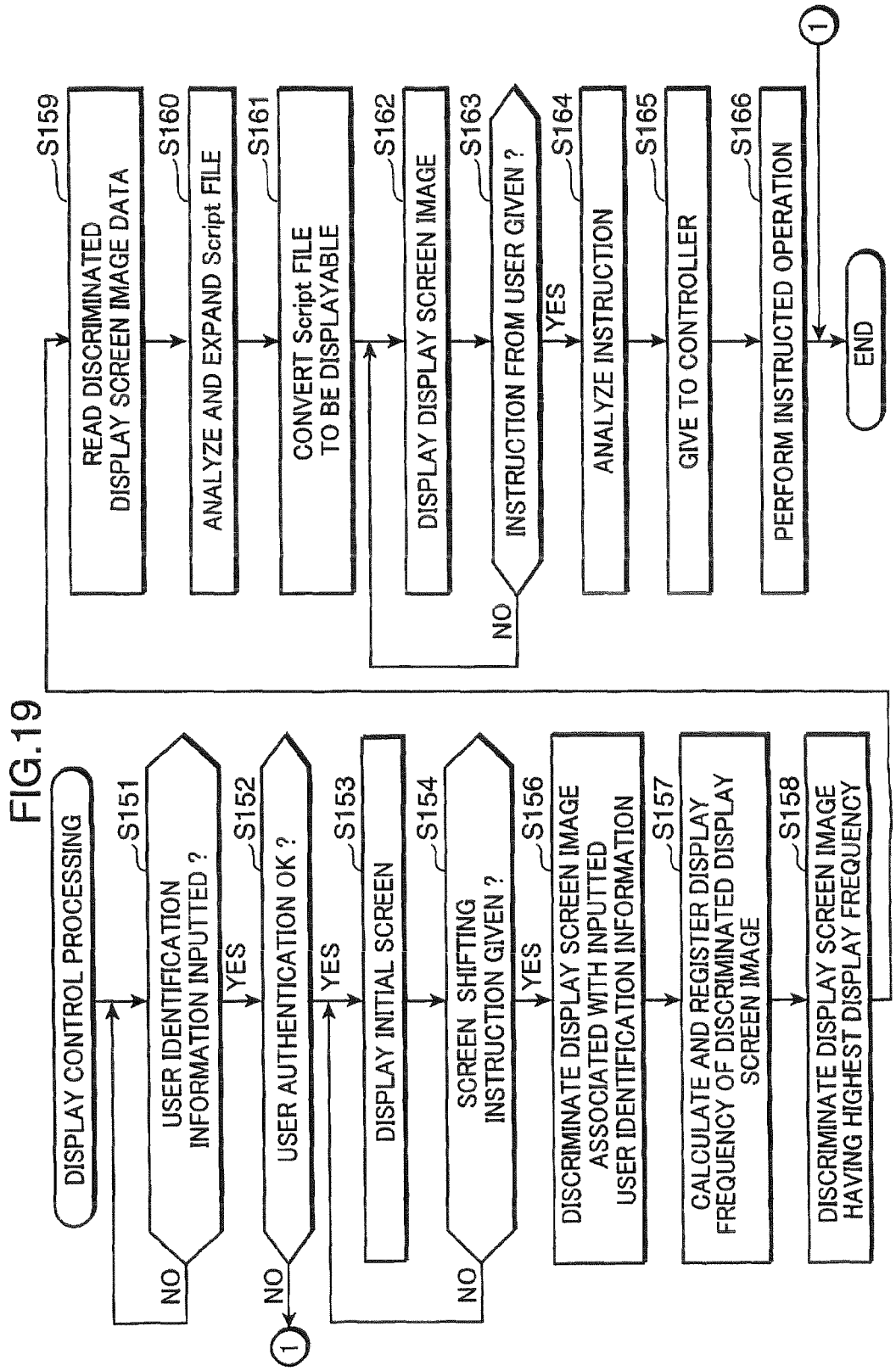
FIG. 19 is a flowchart showing a second example of the display control processing for controlling the display section to display the display screen image created by the PC and the receiving processing for receiving an operation execution instruction from a user, in an image forming system in accordance with the third embodiment.

Next, a first example of the display screen image data registration processing executed by the complex machine 1 in accordance with the third embodiment will be described. FIG. 17 is a flowchart showing the first example of a display screen image data registration processing executed by the complex machine 1 in accordance with the third embodiment.

The registration section 153 of the complex machine 1 determines whether the display screen image data exported to the Script file and including the user identification information is transmitted from the PC 31 (S41). Here, if the registration section 153 receives the display screen image data via the LAN or the like (YES in S41), the registration section 153 registers the received display screen image data as display data to be displayed by the display section 50 and allows the storage section 12 to store the data (S42).

Next, a first example of display control processing for controlling the display section 50 to display the display screen image created by the PC 31 and receiving processing for receiving an operation execution instruction from a user in an image forming system 10 in accordance with the third embodiment will be described. FIG. 18 is a flowchart showing a first example of the display control processing for controlling the display section 50 to display the display screen image created by the PC 31 and the receiving processing for receiving an operation execution instruction from a user in the image forming system 10 in accordance with the third embodiment.

When the power is turned on to start up the complex machine 1, the controller 11 determines whether a user operated an unillustrated operating section to input user identification information (S121).

If a user inputs the user identification information (YES in S121), and the inputted user identification information matches with the registered user identification information so that the controller 11 identifies that the user is allowed to perform an operation of changing operation of the complex machine 1 (YES in S122), the controller 11 allows the display section 50 to display the first display screen image 51, and the Business Logic 152 allows the display section 50 to display, for example, the workflow selection screen 52 as an initial screen based on an instruction from a user (S123).

Then, when the Business Logic 152 allows the display section 50 to display the workflow selection screen 52 (S123), if a user pushes, for example, the "LETTER OF INTRODUCTION" button 521 so that a screen image shifting instruction to shift the screen image to the next layer is received (YES in S124), the discriminating section 154 discriminates display screen image data, which includes user identification information of a user who is authenticated in S122, as a display screen image shifted from the display screen image previously displayed by the display section 50 from display screen image data registered by the registration section 153 (S125).

The Script Interpreter 151 reads the Script file of the discriminated display screen image from the storage section 12 (S127), analyzes the Script file, and executes the HTML conversion processing for enabling the display section 50 to display the display screen image and expansion processing to the Business Logic 152 to execute the action associated with the display object part such as the operation button arranged in the display screen image (S128). The Business Logic 152 executes the processing of enabling the data, which is obtained from the Script Interpreter 151 and applied with the HTML conversion processing, to be displayed by the display section 50 and make it be display data (S129). The browser 16 allows the display section 50 to display the display data (S130).

According to the first example, the display section 50 displays the display screen image which is created by the panel creator section 312 of the PC 31 (for example, the detail setting screen 53 shown in FIG. 4C) and associated with a user who uses the complex machine 1 at this point of time. In this regard, the Script Interpreter 151, the Business Logic 152, the browser 16, and the controller 11 serve as a display controller of claims. The processing subsequent to S131 are executed in the same manner as the first embodiment.

Accordingly, in a case where a plurality of users register respective display screen images, which are customized in desirable manners respectively, to the complex machine 1, a desired display screen image associated with a respective user is selected adequately and displayed by the display section 50.

Next, a second example of the display control processing for controlling the display section 50 to display the display screen image created by the PC 31 and the receiving processing for receiving an operation execution instruction from a user in the image forming system 10 in accordance with the third embodiment will be described. FIG. 18 is a flowchart showing the second example of display control processing for controlling the display section 50 to display the display screen image created by the PC 31 and the receiving processing for receiving an operation execution instruction from a user in the image forming system 10 in accordance with the third embodiment. Description as to the processing which are the same as the first example will be omitted.

In the second example, if the discriminating section 154 discriminates the display screen image data associated with the user identification information (S156), the display frequency calculating section 156 counts up the number of displayed times of the specified display screen image, calculates the number of displayed times in a predetermined time period (for example, one week) as a display frequency and registers the same (S157). The calculated display frequency is stored by the display frequency calculating section 156.

After that, the discriminating section 154 discriminates display screen image data which is constituted by the Script file, customized by the authenticated user (display screen image data including the identification information of the authenticated user), and having a highest display frequency calculated by the display frequency calculating section 156 (S158). Then, the Script Interpreter 151 reads the Script file of the discriminated display screen image data from the storage section 12 or the like (S159), and the processing subsequent to the S160 are executed in a manner which is the same as the first example.

According to the second example, even in a case where one user registers a plurality of display screen images as the shifted display screen images to the complex machine 1 by using the same user identification information, a display screen image which is so estimated that the user would like to use the most among the display screen images associated with the user is selected adequately and displayed by the display section 50.

Figure 20:
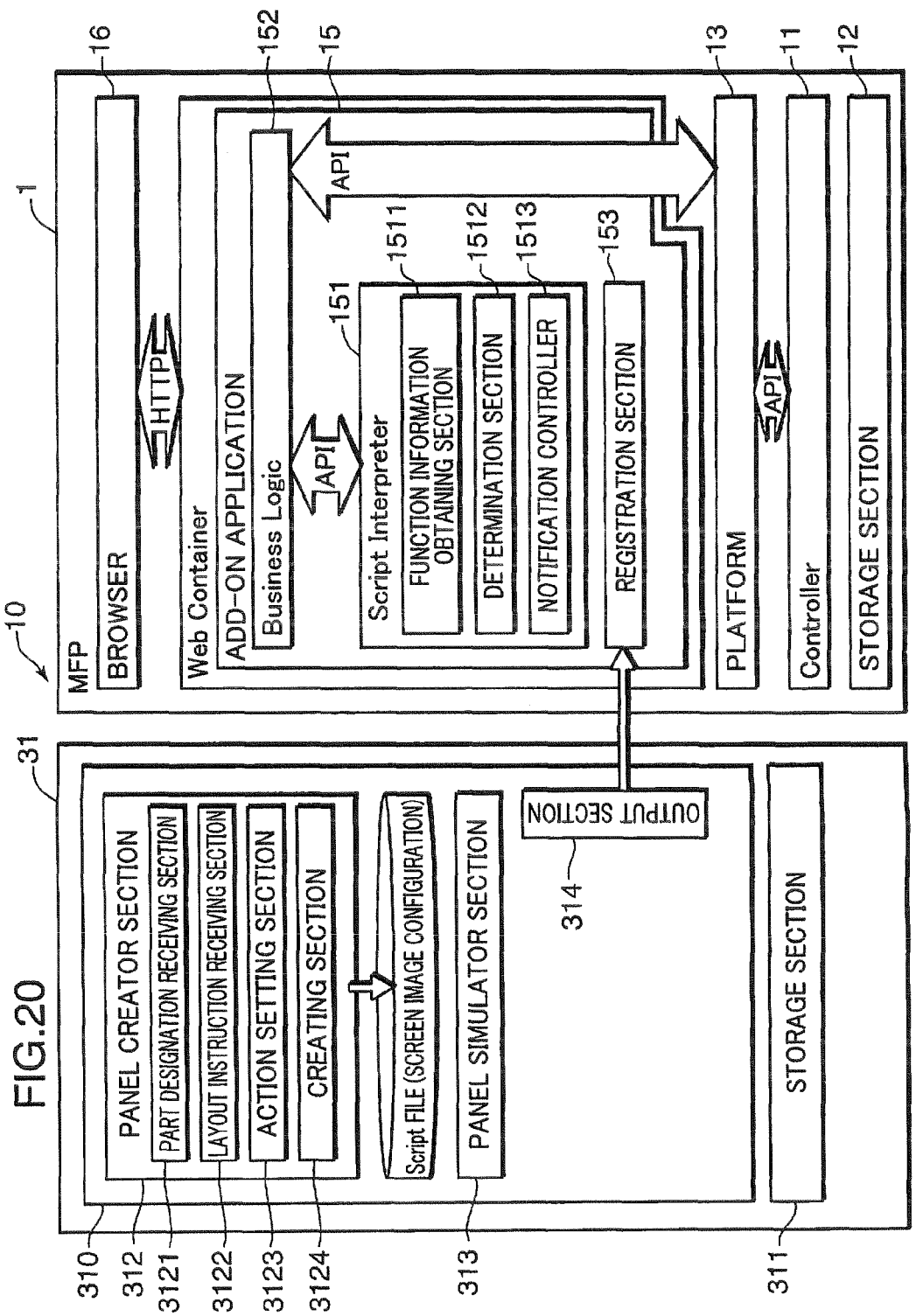
FIG. 20 shows a fourth embodiment of configurations of the PC and the complex machine which are necessary for executing the display screen image creating processing and the display screen image displaying processing.

Next, a fourth embodiment of configurations corresponding to internal configurations of the server computer SV2, the PCs 31-34, and the complex machine 1 and being necessary for the display screen image creating processing and display screen image display processing will be described. FIG. 20 shows the fourth embodiment of configurations of the personal computer and the complex machine 1 which are necessary for executing the display screen image creating processing and the display screen image display processing. Description as to the configuration and processing which are the same as the first through third embodiments will be omitted. Similarly to the first through third embodiments, since the configuration necessary for the server computer SV2, and the PCs 31-34 to execute the display screen image creating processing are the same, FIG. 20 shows the configuration of the PC 31.

In the fourth embodiment, the configuration of the complex machine 1 includes the Script Interpreter 151 which further serves as the function information obtaining section 1511, the determination section 1512, and the notification controller 1513, in addition to the configuration of the first embodiment. The configuration of the PC 231 is the same as the first embodiment.

The function information obtaining section 1511 obtains function information of function which can be executed by the complex machine 1 from the controller 11.

The determination section 1512 determines whether the configuration of the display object part included in the display screen image registered to the storage section 12 by the registration section 153 conforms to the function indicated by the function information obtained by the function information obtaining section 1511.

In a case where the determination section 1512 determines that the configuration of the display object part does not conform to the function indicated by the function information, the notification controller 1513 notifies the non-conformity.

For example, the determination section 1512 obtains predetermined basic functions (the copying function, the scanner function, the density setting function, the sheet size setting function, the resolution setting function, and the like) executed by the complex machine 1 and the predetermined basic rules (for example, the rule that only one "start button" as a display object part for receiving a scanning operation execution instruction is arranged in a display screen image) as to the display screen image displayed by the display section 50 of the complex machine 1 from the controller 11 via the function information obtaining section 1511, and determines whether the configuration of the display object part arranged in the display screen image created by the panel creator section 312 conforms to the basic function and the basic rule of the complex machine 1. The basic function and the basic rule of the complex machine 1 are examples of the function of the electric equipment in claims.

Further, for example, the determination section 1512 obtains equipment status information indicating specification of the complex machine 1 at the time of communication, such as the number of sheet-feeding cassettes set in the complex machine 1, whether a post-processing mechanism for performing sheet post-processing is set, whether the complex machine 1 has a scanning ability of 600 dpi*600 dpi, and the like from the controller 11 via the function information obtaining section 1511, and determines whether the configuration of the display object part included in the display screen image indicated by the Script file contradicts the setting contents of the complex machine 1 indicated by the equipment status information.

The CPU as a central controller of the complex machine 1 is operated in accordance with an operation control program, a display screen image analyzing program, and the like stored in the storage section 12 to serve as the controller 11, the add-on application 15, the browser 16 and the like which execute the display screen image analyzing processing and the like which are necessary in the fourth embodiment.

The display screen image creating processing and the output processing for outputting the display screen image to the complex machine 1 executed by the panel creator section 312 in accordance with the fourth embodiment and the display screen image data outputted from the output section 314 to the complex machine 1 are the same as the first embodiment.

Figure 21:
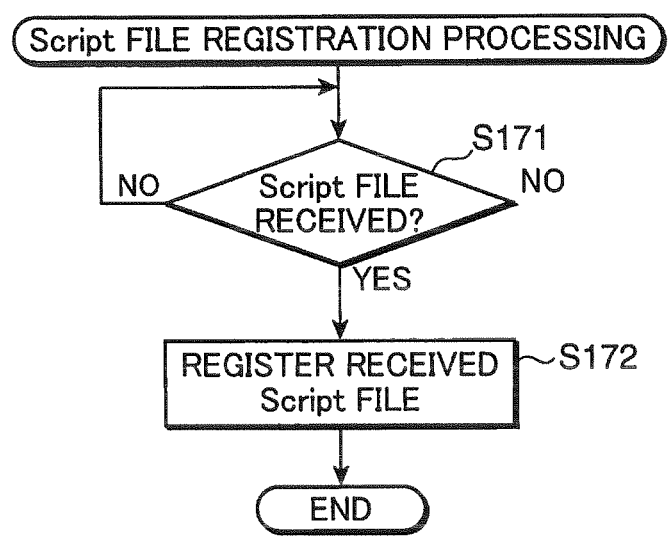
FIG. 21 is a flowchart showing a registration processing for registering the display screen image data in the complex machine in accordance with the fourth embodiment.

Next, the registration processing for registering the display screen image data in the complex machine 1 in accordance with the fourth embodiment will be described. FIG. 21 is a flowchart showing the registration processing for registering the display screen image data in the complex machine 1 in accordance with the fourth embodiment.

The registration section 153 of the complex machine 1 determines whether the display screen image data exported to the Script file is transmitted from the PC 31 (S171). Here, if the registration section 153 receives the display screen image data via the LAN or the like (YES in S171), it registers the display screen image data as display data to be displayed by the display section 50 and allows the storage section 12 to store the data (S172).

Figure 22:
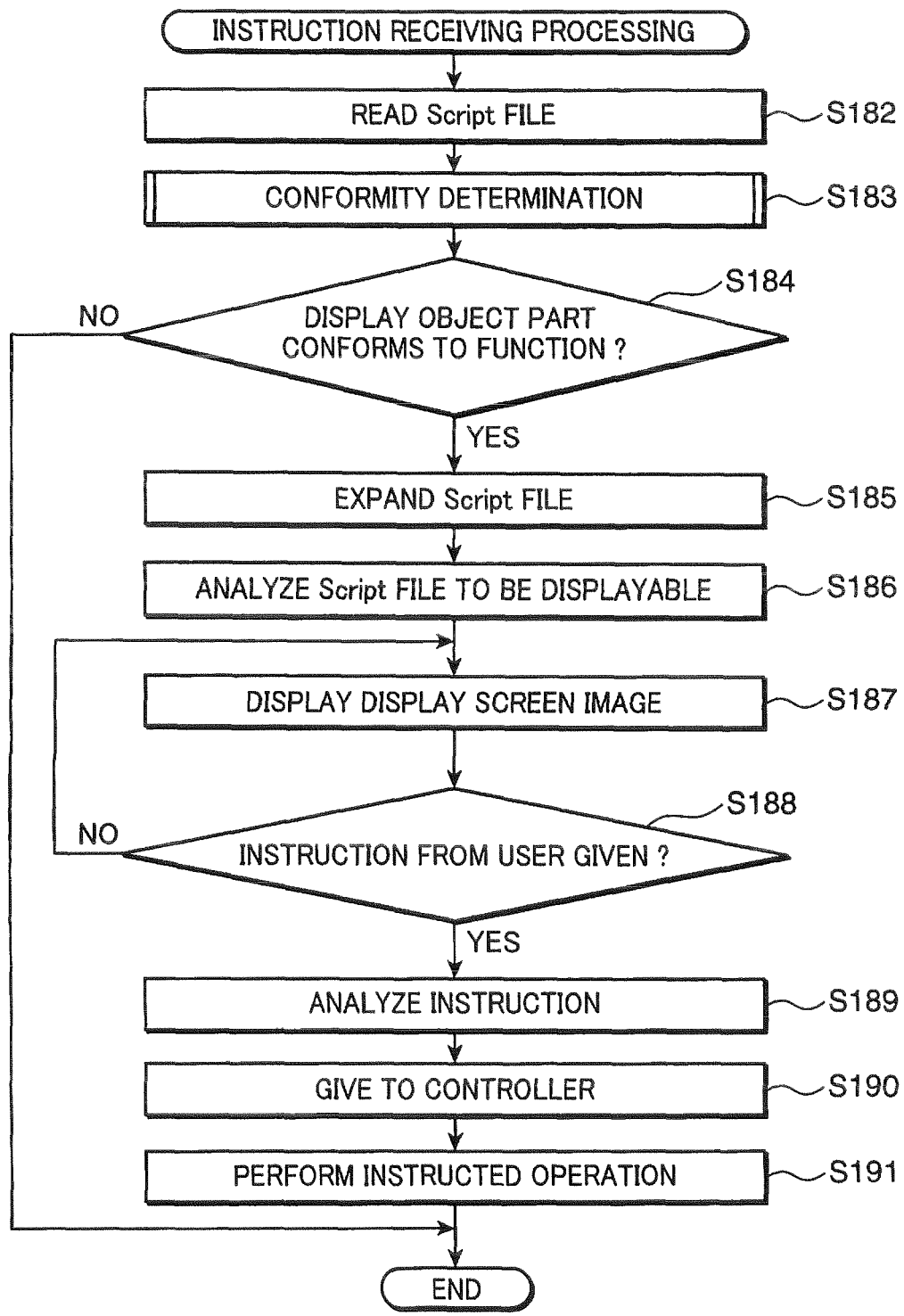
FIG. 22 is a flowchart showing a display control processing for controlling the display section to display the display screen image created by the PC and a receiving processing for receiving an operation execution instruction from a user, in the complex machine 1 in accordance with the fourth embodiment.

Next, the display control processing for controlling the display section 50 to display the display screen image created by the PC 31 and the receiving processing for receiving an operation execution from a user in the complex machine 1 in accordance with the fourth embodiment will be described. FIG. 22 is a flowchart showing the display control processing for controlling the display section 50 to display the display screen image created by the PC 31 and the receiving processing for receiving an operation execution instruction from a user in the complex machine 1 in accordance with the fourth embodiment. Description as to the processing which are the same as the display control processing and the receiving processing of the first through third embodiments will be omitted.

For example, when a user inputs an instruction of shifting a display screen image to the next layer from the workflow selection screen 52 shown in FIG. 4B, the Script Interpreter 151 reads a Script file as the display screen image data from the storage section 12 (S182). In a case where a plurality of Script files as the display screen image data are stored in the storage section 12, the Script Interpreter 151 reads a Script file which is registered as a screen image to be displayed after shifting from the previously display screen image.

Then, the Script Interpreter 151 uses the function information obtaining section 1511 and the determination section 1512 to determine whether a display object part included in a display screen image indicated by the read Script file conforms to a function of the complex machine 1 (S183).

Here, in a case where the determination section 1512 determines that the display object part included in the display screen image does not conform to the function of the complex machine 1 (NO in S184), the processing is terminated. In other words, the display screen image indicated by the Script file registered by the registration section 153 is not displayed by the display section 50.

On the other hand, in a case where the determination section 1512 determines that the display object part included in the display screen image conforms to the function of the complex machine 1 (YES in S184), the Script Interpreter 151 executes HTML conversion processing for allowing the display screen image to be displayed by the display section 50 and expansion processing to the Business Logic 152 for executing an action associated with the display object part such as an operation button arranged in the display screen image (S185).

Next, the Business Logic 152 analyzes data obtained from the Script Interpreter 151 and applied with the HTML conversion processing to enable display by the display section 50 and gives the data to the browser 16 (S186).

The browser 16 allows the display section 50 to display the display data received from the Business Logic 152 (S187). Accordingly, the display section 50 displays the display screen image (for example, the display screen image 53 shown in FIG. 4C) created by the panel creator section 312 of the PC 31. In this regard, the Script Interpreter 151, the Business Logic 152, the browser 16, and the controller 11 serve as a display controller in claims. The processing subsequent to S188 are the same as the processing subsequent to S86 of the first embodiment (FIG. 9).

Figure 23:
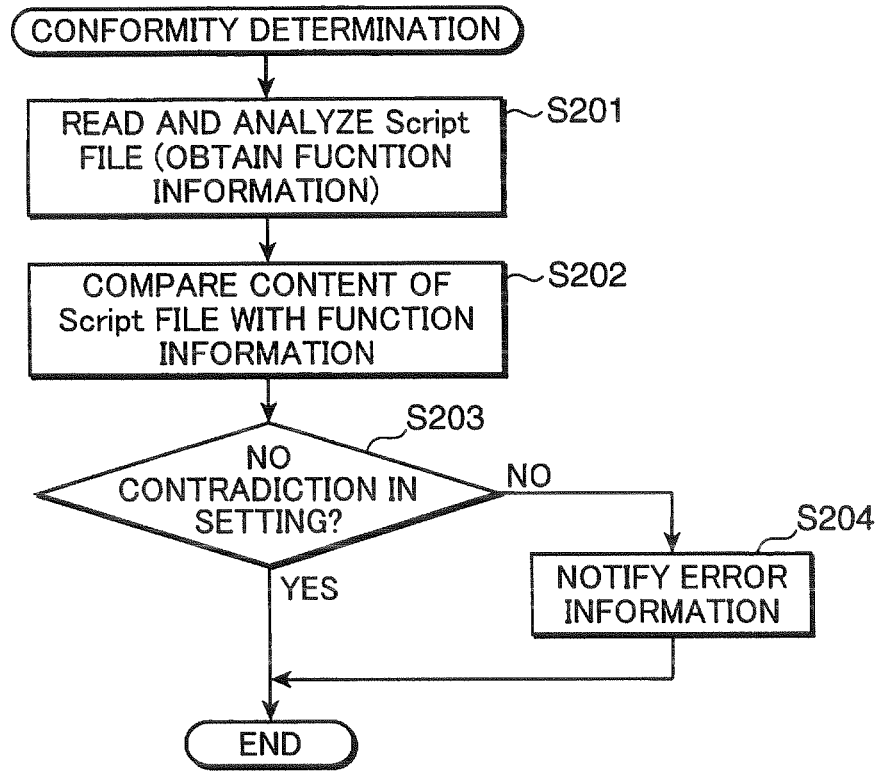
FIG. 23 is a flowchart showing a first example of a conformity determination processing executed by a Script Interpreter with respect to a display object part included in a display screen image in the fourth embodiment.

Next, a first example of conformity determination processing in the fourth embodiment executed by the Script Interpreter 151 with respect to the display object part included in the display screen image will be described in detail. FIG. 23 is a flowchart showing the first example of the conformity determination processing executed by the Script Interpreter 151 with respect to the display object part included in the display screen image in the fourth embodiment.

As described above, for example, a user inputs an instruction of shifting a display screen image to the next layer from the workflow selection screen 52 shown in FIG. 4B, and the Script Interpreter 151 reads a Script file registered as a destination screen image shifted from the display screen image (S201). At this time, the function information obtaining section 1511 of the Script Interpreter 151 obtains function information indicating function which can be executed by the complex machine 1 from the controller 11.

Next, the determination section 1512 compares contents of the analyzed Script file with the function information obtained by the function information obtaining section 1511. In other words, the determination section 1512 determines whether a configuration of a display object part included in the display screen image indicated by the Script file conforms to the function indicated by the function information obtained by the function information obtaining section 1511 (S202). For example, the function information obtaining section 1511 obtains the function information of the complex machine 1 from the controller 11, and the determination section 1512 determines whether the complex machine 1 has a function to execute the action set for the display object part arranged in the display screen image in accordance with the obtained function information.

If the determination section 1512 determines that the complex machine 1 does not have a function to execute the action set for the display object part arranged in the display screen image, in other words, the configuration of the display object part of the display screen image contradicts the function of the complex machine 1 (NO in S203), the notification controller 1513 executes a control of notifying the contents in non-conformity (for example, even though the designated complex machine 1 does not have a facsimile function, the "facsimile start button" for receiving an execution instruction to execute the facsimile function not being provided is arranged in the display screen image) by allowing the display section 50 to display or by allowing an unillustrated speaker to notify by sound (S204). In this regard, the Script Interpreter 151, the Business Logic 152, the browser 16, and the controller 11 serve as a display controller in claims. Accordingly, a user is encouraged to edit or change the display screen image again.

If the determination section 1512 determines that the configuration of the display object part of the display screen image does not contradict the function of the complex machine 1 (YES in S203), the processing of the conformity determination is terminated.

Figure 24:
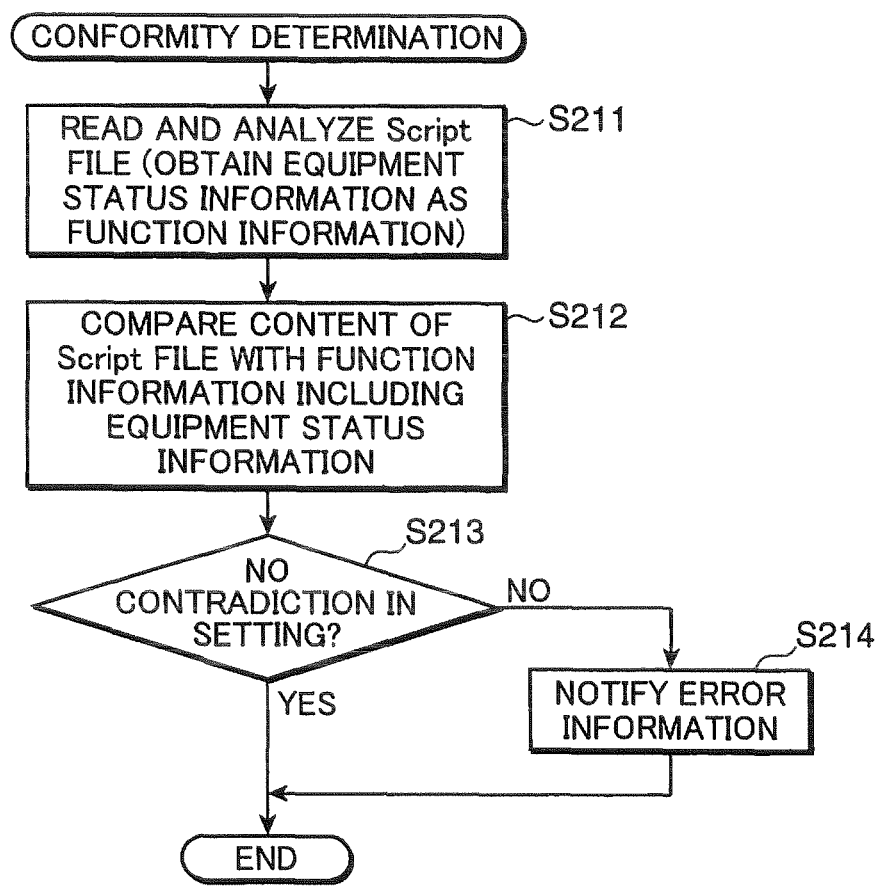
FIG. 24 is a flowchart showing a second example of the conformity determination processing executed by the Script Interpreter with respect to a display object part included in a display screen image in the fourth embodiment.

Next, a second example of the conformity determination processing in the fourth embodiment executed by the Script Interpreter 151 with respect to the display object part included in the display screen image will be described in detail. FIG. 24 is a flowchart showing the second example of the conformity determination processing executed by the Script Interpreter 151 with respect to the display object part included in the display screen image in the fourth embodiment. Detailed description as to the processing which are the same as the first example will be omitted.

In the second example, when the function information obtaining section 1511 receives the function information of the complex machine 1 from the controller 11 at the time of analyzing the Script file, the function information obtaining section 1511 obtains the function information indicating the function which can be executed by the complex machine 1, and further equipment status information indicating specification set in the complex machine 1 as the function information at this point of time (S211). For example, the information obtaining section 1511 obtains equipment status information from the complex machine 1, where the equipment status information indicates specification of the complex machine 1, such as the number of sheet-feeding cassettes set in the complex machine 1 and whether a post-processing mechanism for performing sheet post-processing is set, at the time of the communication. For example, the complex machine 1 stores the equipment status information in the memory area of the controller 11, and the controller 11 outputs the equipment status information to the function information obtaining section 1511.

Then, the determination section 1512 determines whether the configuration of the display object part included in the display screen image indicated by the Script file contradicts the function and setting of the complex machine 1 indicated by the function information including the equipment status information (S212).

If the determination section 1512 determines that the complex machine 1 does not have a configuration and setting for executing an action set in the display object part arranged in the display screen image, in other words, the configuration of the display object part of the display screen image contradicts the function and setting of the complex machine 1 (NO in S213), similarly to the first embodiment, the display object part contradicting the setting is pointed out by display of the display section 50 or notification by sound of an unillustrated speaker through the Business Logic 152 and the browser 16 (S214).

Figure 25:
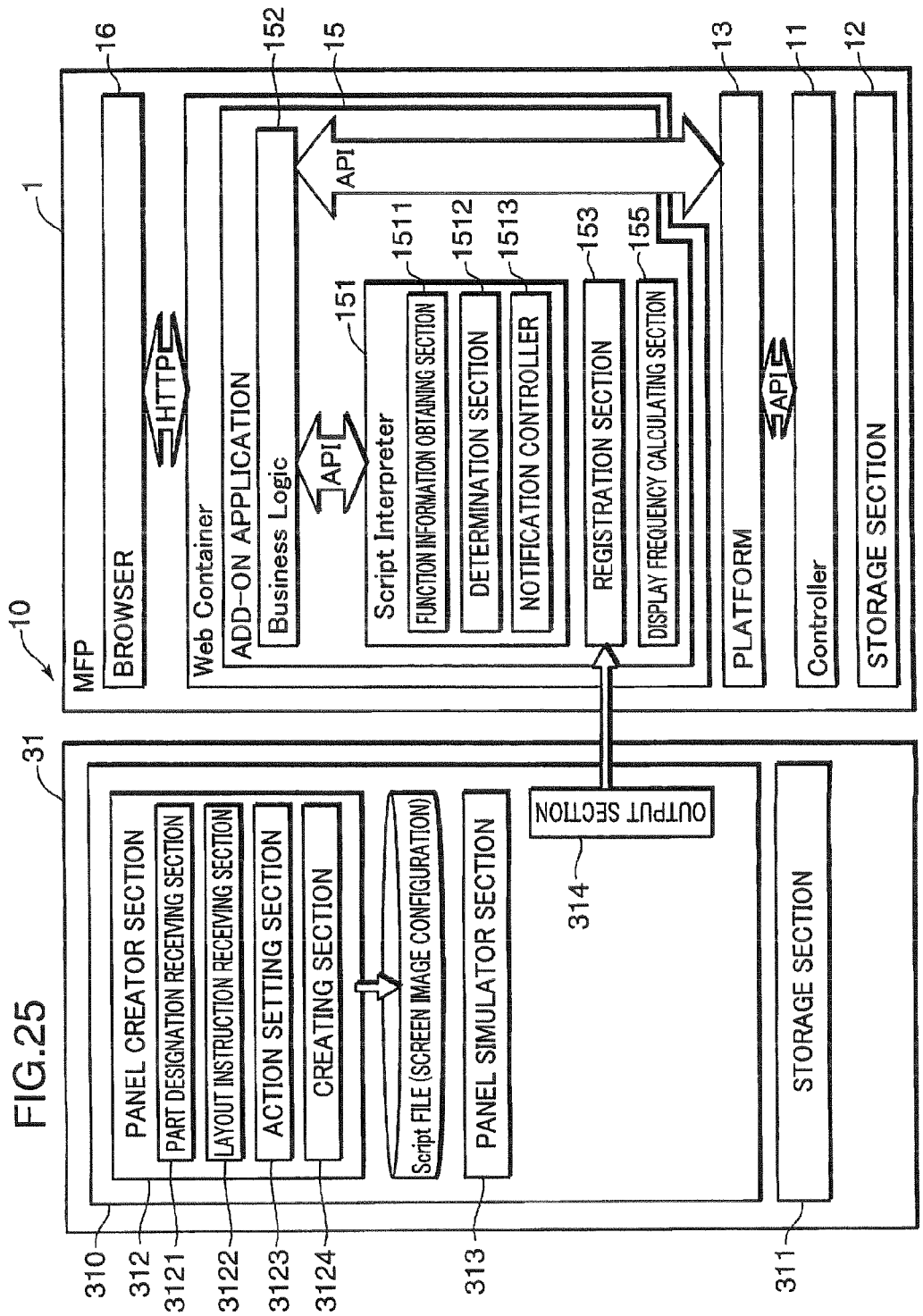
FIG. 25 shows a fifth embodiment of configurations which are necessary for the PC and the complex machine for executing a display screen image creating processing and a display screen image displaying processing.

Next a fifth embodiment of configurations, which are internal configurations of the server computer SV2, the PCs 31-34, and the complex machine 1, which are necessary for the display screen image data creating processing and the display screen image data display processing will be described. FIG. 25 shows the fifth embodiment of the configurations, as to the PC and the complex machine 1, which are necessary for the display screen image creating processing and the display screen image display processing. Description as to the configuration and processing which are the same as the first through fifth embodiments will be omitted. Similarly to the first through fourth embodiments, since the configuration necessary for the display screen image creating processing executed in the server computer SV2 and the PCs 31 through 34 are the same, FIG. 25 shows the configuration of the PC 31.

In the fifth embodiment, the add-on application 15 mainly includes the Script Interpreter 151, the Business Logic 152, the registration section 153, and the display frequency calculating section 155.

The display frequency calculating section 155 calculates a display frequency of screen image data of a display screen image (a display screen image constituted by a Script file and customized by a user), which is obtained by the registration section 153 and registered.

The display screen image creating processing and the output processing to the complex machine 1 which are executed by the panel creator section 312, and the display screen image data outputted from the output section 314 to the complex machine 1 in accordance with the fifth embodiment are the same as the first embodiment. Further, the registration processing for registering the display screen image data executed by the complex machine 1 in accordance with the fifth embodiment is the same as the fourth embodiment.

Figure 26:
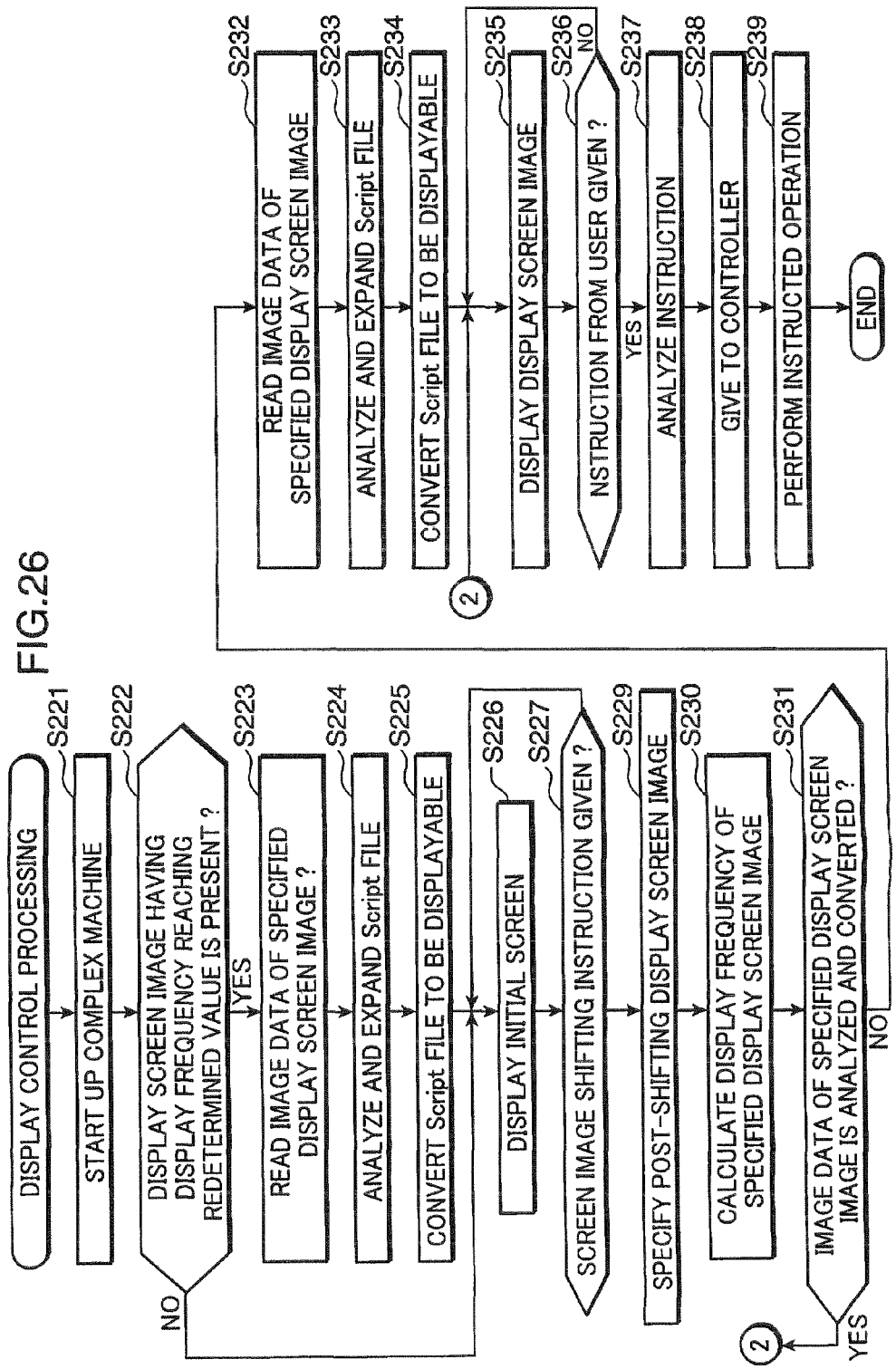
FIG. 26 is a flowchart showing a first example of the display control processing for controlling the display section to display the display screen image created by the PC and the receiving processing for receiving an operation execution instruction from a user in the complex machine in accordance with the fifth embodiment.

Next, a first example of display control processing for controlling the display section 50 to display the display screen image created by the PC 31 and receiving processing for receiving an operation execution instruction from a user in the complex machine 1 in accordance with the fifth embodiment will be described. FIG. 26 is a flowchart showing the first example of the display control processing for controlling the display section 50 to display the display screen image created by the PC 31 and the receiving processing for receiving an operation execution instruction from a user in the complex machine 1 in accordance with the fifth embodiment. Description as to the processing which are the same as the first through fourth embodiments will be omitted.

When the complex machine 1 is started up by turning the power on (S221), at the time before a display control for controlling the display section 50 to display the display screen image is started, the Script Interpreter 151 searches for a display screen image (a display screen image constituted by a Script file and customized by a user) whose display frequency calculated by the display frequency calculating section 155 reaches a predetermined threshold value (for example, ten times a week, or the like) (S222). The threshold value can be suitably changed by a user through operation to an unillustrated operating section of the complex machine 1 (operation buttons and the like included in the display screen image displayed by the display section 50). Further, the number of display screen image having a display frequency reaching the threshold value should be analyzed and converted in advance by the Script Interpreter 151 and the Business Logic 152 can be also suitably set by a user through operation to the operating section.

Then, if there is a display screen image having a display frequency reaching the threshold value (YES in S222), the Script Interpreter 151 reads a Script file of the display screen image having the display frequency reaching the threshold value from the registration section 153 or the storage section 12 (S223), analyzes the Script file, and executes the HTML conversion process for enabling the display section 50 to display the display screen image and the expansion processing to the Business Logic 152 for executing an action associated with a display object part such as an operation button arranged in the display screen image (S224).

Next, the Business Logic 152 sets the data obtained from the Script Interpreter 151 and applied with the HTML conversion processing to be display data which can be displayed by the display section 50 (S225). The display data is stored in an unillustrated memory or the like of the add-on application 15. In other words, as to a display screen image (a display screen image constituted by a Script file and customized by a user) having a high display frequency at the display section 50, the Script Interpreter 151 and the Business Logic 152 completes data reading processing and data conversion processing necessary for enabling display by the display section 50 at a timing before S226 at which a display control with respect to the display section 50 is started.

In S222, if there is no display screen image having a display frequency reaching the threshold value (NO in S222), the processing of S223 through S225 are skipped.

Then, when the Business Logic 152 allows the display section 50 to display, for example, the workflow selection screen 52 (S226), and a user pushes, for example, the "LETTER OF INTRODUCTION" button 521 so that an instruction of shifting a screen to the next layer is received (YES in S227), the Script Interpreter 151 specifies (creates) a Script file of a display screen image associated as a post-shifted display screen image with a display screen image displayed previously by the display section 50 (S229).

Then, the display frequency calculating section 155 counts up the number of displayed times of the specified display screen image, and calculates the number of displayed times in a predetermined period (for example, one week) as a display frequency (S230). The calculated display frequency is stored by the display frequency calculating section 155.

If the Script Interpreter 151 determines that the Script file of the post-shifting display screen image is already converted to a data format enabling display by the display section 50 in S223 through S225 (YES in S231), the browser 16 reads display data of the post-shifting display screen image from an unillustrated memory of the add-on application 15 and allows the display section 50 to display the display data (S235).

On the other hand, if the Script Interpreter 151 determines that the script file of the post-shifting display screen image has not yet been converted into a data format enabling display by the display section 50 (NO in S231), the Script Interpreter 151 reads the Script file of the display screen image from the registration section 153 or the storage section 12 (S232), analyzes the Script file, and executes the HTML conversion processing for enabling the display section 50 to display the display screen image and expansion processing to the Business Logic 152 to execute the action associated with the display object part such as the operation button arranged in the display screen image (S233). The Business Logic 152 executes the processing of enabling the data, which is obtained from the Script Interpreter 151 and applied with the HTML conversion processing, to be displayed by the display section 50 and make it be display data (S234). The browser 16 allows the display section 50 to display the display data (S235).

Accordingly, the display section 50 displays the display screen image which is created by the panel creator section 312 of the PC 31 (for example, the detail setting screen 53 shown in FIG. 4C). In this regard, the Script Interpreter 151, the Business Logic 152, the browser 16, and the controller 11 serve as a display controller of claims. The processing subsequent to S236 are executed in the same manner as the first embodiment (FIG. 9).

Figure 27:
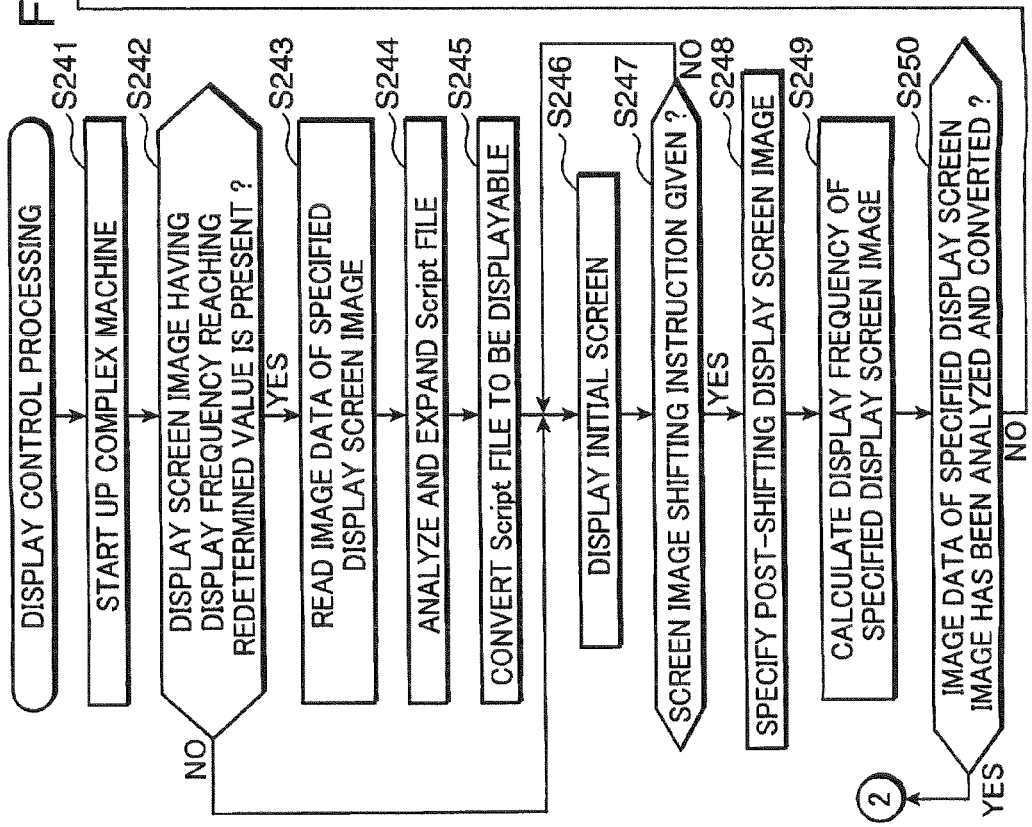
FIG. 27 is a flow chart showing a second example of the display control processing for controlling the display section to display the display screen image created by the PC and the receiving processing for receiving an operation execution instruction from a user in a the image forming system in accordance with the fifth embodiment.

Next, a second example of the display control processing for controlling the display section 50 to display the display screen image created by the PC 31 and the receiving processing for receiving an operation execution instruction from a user in the image forming system 10 in accordance with the fifth embodiment will be described. FIG. 27 is a flowchart showing the second example of the display control processing for controlling the display section 50 to display the display screen image created by the PC 31 and the receiving processing for receiving an operation execution instruction from a user in the image forming system 10 in accordance with the fifth embodiment. Description as to the processing which are the same as the first example will be omitted.

In the second example, if the Script Interpreter 151 determines that the Script file of the post-shifting display screen image has not yet been converted into a data format enabling display by the display section 50 (NO in S250), in addition to the processing executed in the first example, the Script Interpreter 151 allows the function information obtaining section 1511 and the determination section 1512 to determine, as to the display screen image data constituted by the Script file obtained and registered by the registration section 153, whether the display object part included in the display screen image indicated by the Script file conforms to the function of the complex machine 1 (S251).

Here, if the determination section 1512 determines that the display object part included in the display screen image does not conform to the function of the complex machine 1 (NO in S252), the processing is terminated. In other words, the display screen image indicated by the Script file obtained by the registration section 153 is not displayed by the display section 50.

On the other hand, if the determination section 1512 determines that the display object part included in the display screen image conforms to the function of the complex machine 1 (YES in S252), the Script Interpreter 151 and the Business Logic 152 execute the data conversion processing and the like for enabling display by the display section 50 (S253 through S255).

A Script file of the display screen image having a display frequency reaching the threshold value, having been already converted into a data format enabling display by the display section 50, and being secured with conformity to the function of the complex machine 1 is not applied with the conformity determination (YES in S250), and unnecessary processing is reduced.

The conformity determination processing executed by the Script Interpreter 151 as to the display object part included in the display screen image in accordance with the fifth embodiment is executed in the same manner as the first and second examples of the fourth embodiment.

Figure 28:
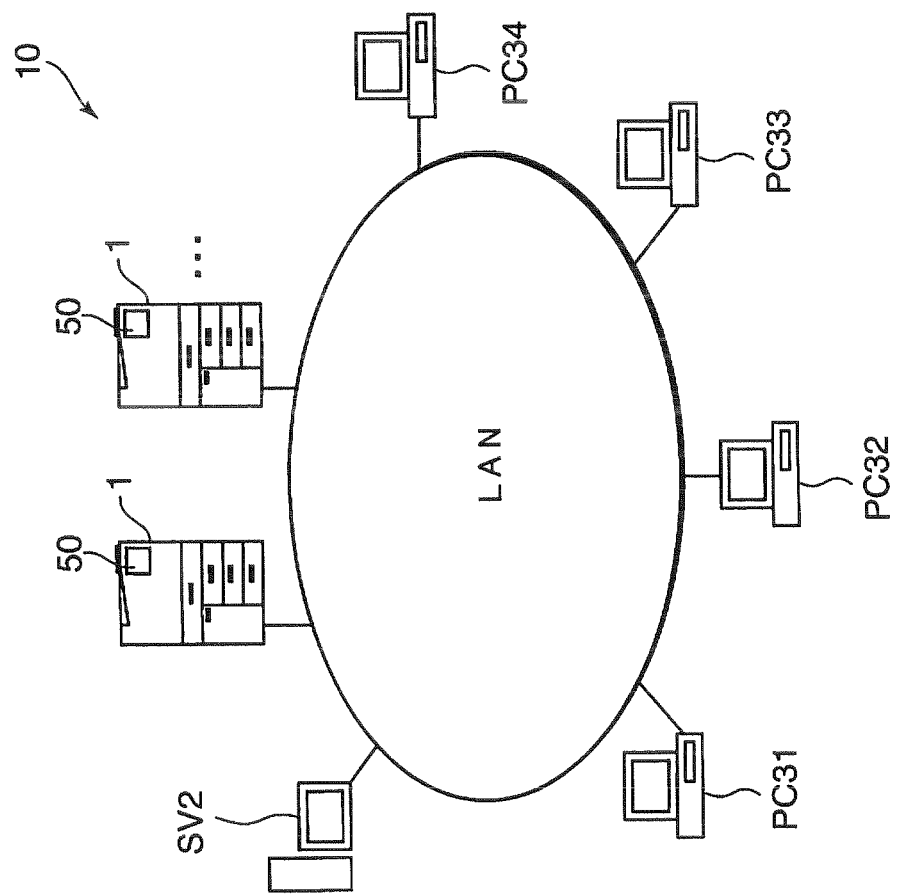
FIG. 28 shows an example of an image forming system in accordance with a sixth embodiment.

Hereinafter, an image forming system 10 in accordance with a sixth embodiment will be described. FIG. 28 shows an example of the image forming system in accordance with the sixth embodiment. The image forming system 10 in accordance with the sixth embodiment includes a plurality of complex machines 1, a server computer SV2, and personal computers (hereinafter, referred to as "PC") 31-34. However, the number of complex machines, server computer, and PC provided in the image forming system 10 is not limited to this. A display control device having respective parts for display control in the complex machine 1 is an example of the display control device.

For the purpose of allowing the display section 50 to display a display screen image, the complex machine 1 receives screen image data from the server computer SV2 and allows the display section 50 to display a display screen image.

Figure 29:
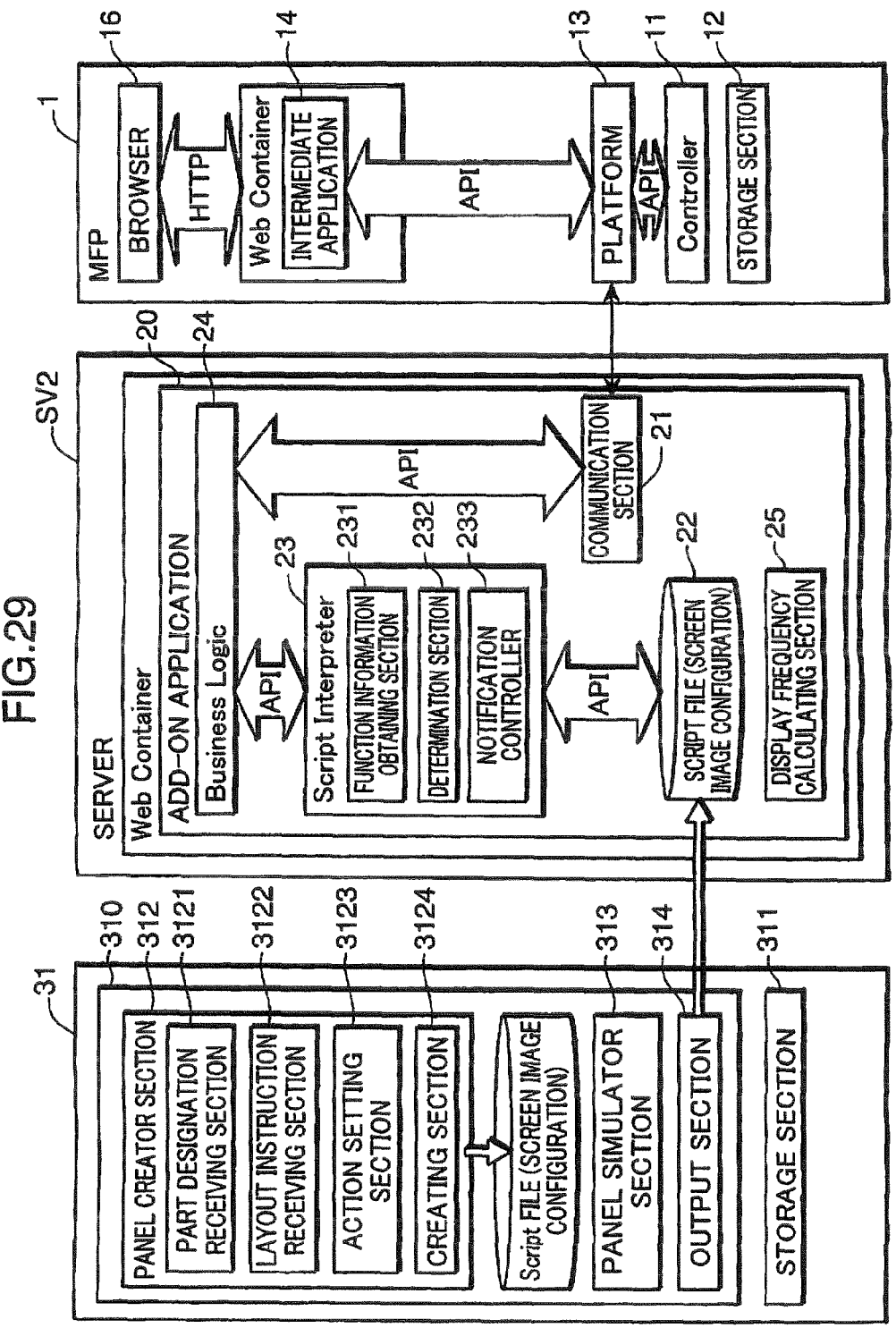
FIG. 29 shows configurations which are necessary for a PC, a server, and a complex machine in the image forming system for executing a display screen image creating processing and a display screen image displaying processing in accordance with the sixth embodiment.

Next, configurations corresponding to internal configurations of the server computer SV2, the PCs 31-34, and the complex machine 1 of the image forming system 10 in accordance with the present embodiment and being necessary for the display screen image data creating processing and the display screen image data display processing will be described. FIG. 29 shows configurations of the PC 31, the server computer SV2, and the complex machine 1 of the image forming system 10 necessary for executing display screen image creating processing and display screen image display processing. Description as to the configuration and processing which are the same as the first through fifth embodiments will be omitted. Similarly to the first through fifth embodiments, since the configuration necessary for executing the display screen image creating processing in the PCs 31-34 are the same, FIG. 29 shows the configuration of the PC 31.

In the image forming system 10, in accordance with the present embodiment, the PC 31 has the same configuration as the first embodiment. However, the output section 314 outputs display screen image data of the Script file created by the creating section 3124 to the server computer SV2 via the LAN or the like.

The server computer (an example of an information processing apparatus) SV2 has an add-on application 20 as a configuration necessary for the present embodiment. The add-on application 20 mainly includes a communication section 21, a storage section 22, a Script Interpreter 23, a Business Logic 24, and a display frequency calculating section 25.

The add-on application 20 is an application which can be installed as an add-on to the server computer SV2.

The communication section 21 (an example of a receiving section and an output section) receives display screen image data created by the PC 31 or the like from the PC 31 via a LAN, and outputs display screen image data created by the PC 31 and stored in the storage section 22 to the complex machine 1.

The storage section 22 stores display screen image data created by the PC 31 and received by the communication section 21. The storage section 22 receives display screen image data created respectively by the PCs 31-34 through the communication section 21 and stores the data. The storage section 22 is constituted by an HDD or the like and stores an operation control program for totally controlling the server computer SV2, a program of the add-on application 20, and the like. A CPU as a central controller of the server computer SV2 is operated in accordance with each programs stored in the storage section 22 to thereby sever as a controller, the add-on application 15, and the like. Further, the storage section 22 stores a Script file as the display screen image data.

The Script Interpreter (data conversion section) 23 analyzes the display screen image data obtained by the communication section 21 from the PC 31 and converts the same into a data format enabling display on the display section 50 by the browser 16 of the complex machine 1.

Further, the Script Interpreter 23 also serves as a function information obtaining section 231, a determination section 232, and a notification controller 233. The function information obtaining section 231 obtains function information of a function which can be executed by the complex machine 1 from the controller 11 of the complex machine 1 via the communication section 21 and the like. The determination section 232 determines whether the configuration of the display object part included in the display screen image stored in the storage section 22 conforms to the function indicated by the function information obtained by the function information obtaining section 231. The notification controller 233, if the determination section 232 determines that the configuration of the display object part does not conform to the function indicated by the function information, controls a display section (not illustrated) of the server computer SV2 or the display section 50 of the complex machine 1 to notify the contents of non-conformity.

For example, the determination section 232 stores predetermined basic functions (a copying function, a scanner function, a density setting function, a sheet size setting function, a resolution setting function, and the like) to be executed by the complex machine 1 and predetermined basic rules (for example, a prohibition rule defining that only one "start button," which is a display object part for receiving a scanning operation execution instruction, is arranged in a display screen image) as to the display screen image to be displayed by means of the display section 50 of the complex machine 1 from the controller 11 and determines whether the configuration of the display object parts arranged in the display screen image created by the panel creator section 312 conforms to the basic functions and basic rules of the complex machine 1.

Further, the Script Interpreter 23 executes HTML conversion processing for enabling the display section 50 to display the display screen image and expansion processing to the Business Logic 24 to execute actions associated with display object parts such as operation buttons arranged in the display screen image. The Script Interpreter 23 gives the data applied with the HTML conversion processing for display to the Business Logic 24 through the API.

The Business Logic (data conversion section) 24 transmits the data applied with the HTML conversion processing for display to the platform 13 of the complex machine 1 through the communication section 21. Further, the Business Logic 24 controls actions (operations of the complex machine 1) based on information expanded by the Script Interpreter 23 by analyzing the Script file and given by the Script Interpreter 23 (information indicating actions associated with the display object part). In other words, if a user operates a display object part such as an operation button displayed in the display screen image displayed on the display section 50 by the browser 16 of the complex machine 1, the Business Logic 24 analyzes the action associated with the operated display object part based on information given by the Script Interpreter 23 and calls up a scanner transmission API to execute, for example, the analyzed scanner function.

The display frequency calculating section 25 calculates a display frequency of each display screen image data on the display section 50. The Script Interpreter 23 and the Business Logic 24 communicates with the complex machine 1. As to screen image data of a display screen image having a high display frequency calculated by the display frequency calculating section 25, the Script Interpreter 23 and the Business Logic 24 executes and completes the data conversion for enabling display by the display section 50 at a timing before a display control for controlling the display section 50 to display the display screen image, such as at a time when the complex machine 1 is started up by turning on the power.

On the other hand, the complex machine 1 includes a controller 11, a storage section 12, a platform 13, an intermediate application 14, and a browser 16. The controller 11 performs overall operation control with respect to the complex machine 1. These parts are the same as the first embodiment unless especially described in the following.

The platform 13 obtains screen image data of a display screen image constituted by a Script file subjected to display by the display section 50 (screen image data of a display screen image as a post-shifting display screen image at the time when a screen image is shifted in the display section 50) from the server computer SV2 via the LAN.

For example, when the display section 50 displays a display screen image (for example, the workflow selection screen 52 of FIG. 4B), and a user pushes the "LETTER OF INTRODUCTION" button 521, the controller 11 queries the add-on application 20 of the server computer SV2 via the platform 13. At this time, to enable a display screen image shifting control of shifting to the workflow selection screen 52 shown in FIG. 4B in the display section 50 of the complex machine 1, the Script Interpreter 23 and the Business Logic 24 of the server computer SV2 starts analyzing and data conversion of display screen image data constituted by a Script file stored in the storage section 22.

The storage section 12 is constituted by an HDD or the like and stores an operation control program serving as the controller 11, a program of the browser 16, and the like. The CPU as a central controller of the complex machine 1 is operated in accordance with the programs stored in the storage section 12 to serve as the controller 11, the browser 16, and the like.

The intermediate application 14 executes intermediate processing for enabling the Script file received by the platform 13 from the server computer SV2 and applied with the HTML conversion processing (display screen image data) to be processed by the browser 16.

The browser 16 allows the display screen image to be displayed by the display section 50 in conformity with the screen configuration indicated by a file applied with the HTML conversion processing by the add-on application 20. Also, the browser 16 serves as an interface for receiving an instruction input operation from a user through the touch panel function of the display section 50 during when the display screen image is displayed.

Figure 30:
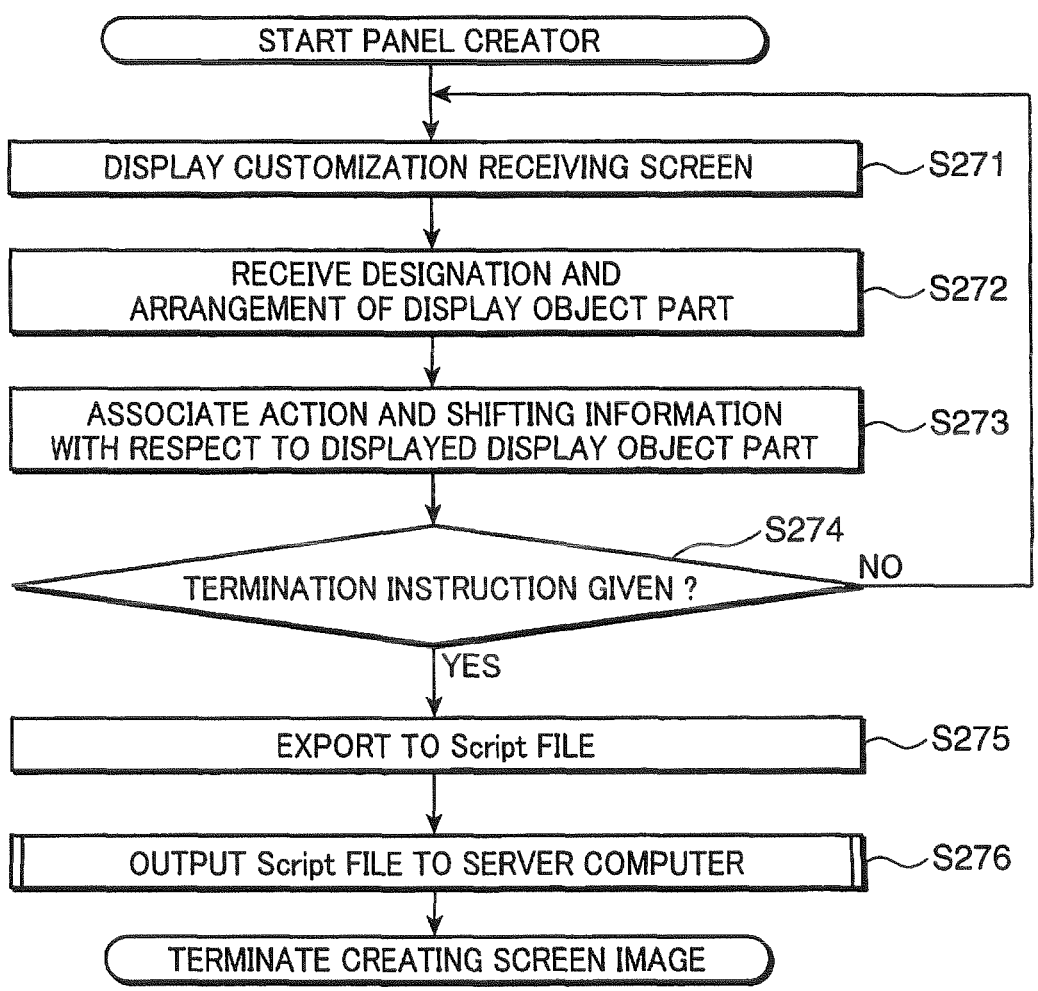
FIG. 30 is a flowchart showing a display screen image creating processing executed by the panel creator section of the PC and an output processing for outputting the display screen image to the server.

Next, the display screen image creating processing executed by the panel creator section 312 of the PC 31 and the output processing to the server computer SV2 will be described. FIG. 30 is a flowchart showing the display screen image creating processing executed by the panel creator section 312 of the PC 31 and the output processing to the server computer SV2. Description as to the processing which are the same as the display screen image creating processing executed by the panel creator section 312 of the PC 31 and the output processing in accordance with the first through fifth embodiments will be omitted.

The display screen image creating processing by the panel creator section 312 of the PC 31 is executed in a manner same as the first embodiment (S271 through S275).

After that, the output section 314 outputs display screen image data constituted by the Script file created by the panel creator section 312 to the server computer SV2 in a communication method via the LAN (S276).

Figure 31:
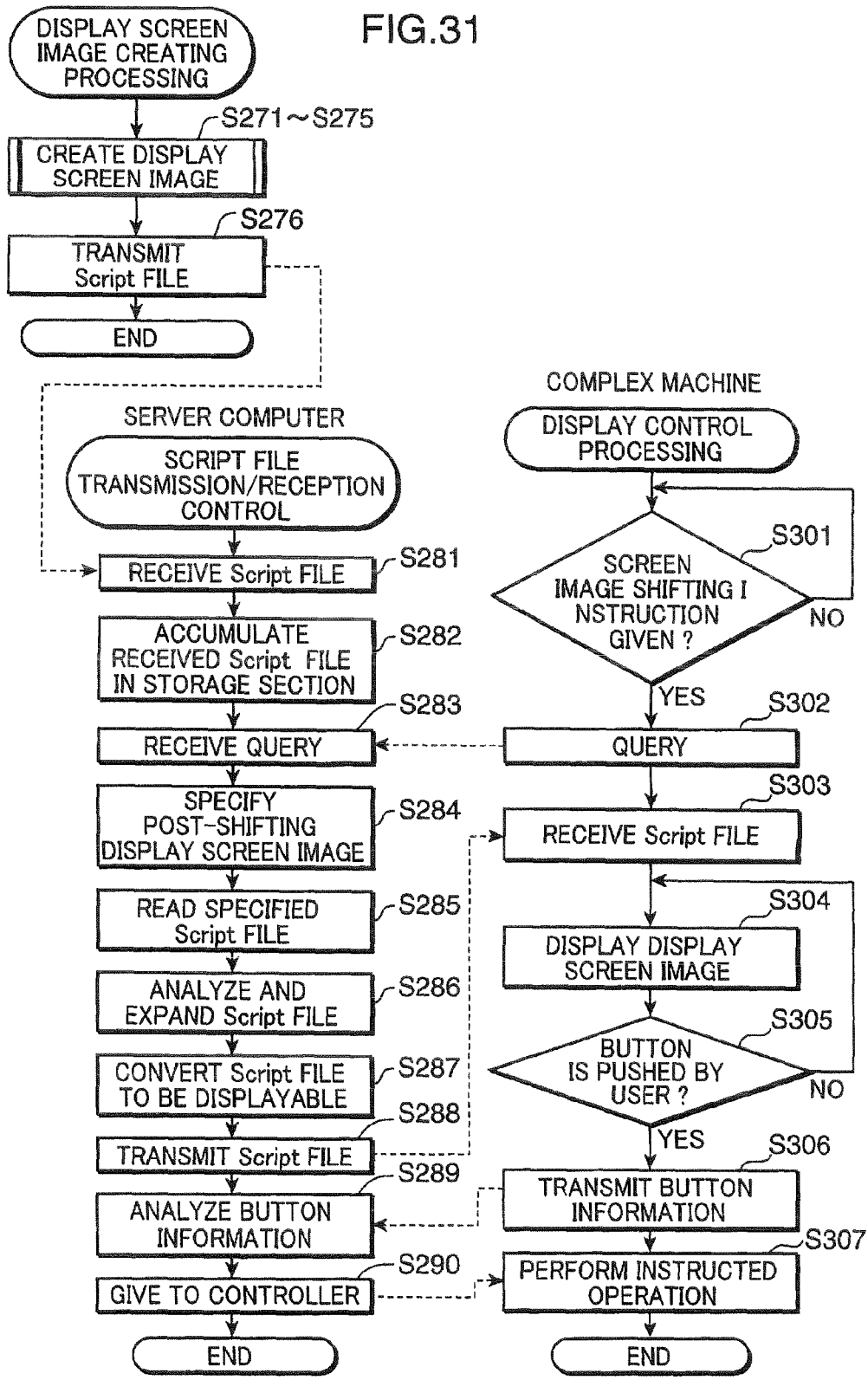
FIG. 31 is a flowchart showing a first example of the display processing for allowing the display section to display the display screen image created in the PC and a receiving processing for receiving an operation execution instruction from a user in the image forming system.

Next, a first example of display processing for allowing the display section 50 of the complex machine 1 to display the display screen image created by the PC 31 and the receiving process for receiving an operation execution instruction from a user in the image forming system 10 will be described. FIG. 31 is a flowchart showing the first example of the display processing for allowing the display section 50 to display the display screen image created by the PC 31 and the receiving processing for receiving an operation execution instruction from a user in the image forming system 10.

If the display screen image data is created by the PC 31 (S271-S275), and the output section 314 outputs the display screen image data constituted by the created Script file to the server computer SV2 (S276), the communication section 21 of the server computer SV2 receives the display screen image data constituted by the Script file (S281), and allows the received Script file to be stored in the storage section 22 (S282). In other words, the communication section 21 of the server computer SV2 receives the display screen image data constituted by the Script file created by the PC 31 (or PC 32-34) provided in the image forming system 10, and the Script file is accumulated in the storage section 22.

In the complex machine 1, when the controller 11 controls the display section 50 to display the workflow screen 52, and a user pushes, for example, the "DETAIL" button 522, the controller 11 queries the add-on application 20 of the server computer SV2 via the platform 13. In other words, if a user inputs a screen image shifting instruction to the browser 16 (YES in S301), the controller 11 queries the add-on application 20 to shift the workflow screen 52 to the detail setting screen 53 (S302). The processing subsequent to S283 in the server computer SV2 is performed at such timing of shifting the screen display.

In the server computer SV2, if the communication section 21 receives such query for shifting the screen image (S283), the Script Interpreter 23 specifies a post-shifting display screen image associated with a display screen image previously displayed by the display section 50 (S284). Then, the Script Interpreter 23 reads the specified Script file form the storage section 22 (S285), analyzes the read Script file, and executes the HTML conversion processing for enabling the display screen image to be displayed by the display section 50 and the expansion processing to the Business Logic 24 for executing the action associated with the display object part of the operation button arranged in the display screen image (S286).

Next, the Business Logic 24 sets the data obtained from the Script Interpreter 23 and applied with the HTML conversion processing as display data enabling display by the display section 50 (S287), and the communication section 21 outputs the display data to the platform 13 of the complex machine 1 (S288).

In the complex machine 1, if the platform 13 receives the display data (S303), the browser 16 allows the display section 50 to display the received display data (S304). Accordingly, the display screen image (for example, the detail setting screen 53 shown in FIG. 4C) created by the panel creator section 312 of the PC 31 is displayed by the display section 50. In this regard, the browser 16 and the controller 11 serve as the display controller in claims.

If a user performs an operation of using the touch panel function to push any display button in, for example, the detail setting screen 53 shown in FIG. 4C during when the display screen image is displayed by the browser 16 (YES in S305), information indicating the pushed display button is transmitted from the browser 16 to the server computer SV2 via the platform 13 and the communication section 21 (S306).

In the server computer SV2, based on the information given by the Script Interpreter 23 (information indicating the pushed display button), the Business Logic 24 analyzes an action associated with the operated display button (S289). For example, if a user pushes the "600*600 dpi" button 531 of the detail setting screen 53, the Business Logic 24 analyzes, based on the information given by the Script Interpreter 23, that a function operation corresponding to the "600*600 dpi" button 531 is input of an execution instruction as to an operation of allowing the scanner section to read a document at resolution of 600*600 dpi at the time of scanning.

Next, to execute the analyzed function, the Business Logic 24 calls out the API corresponding to the function and sends an instruction of instruction of allowing the controller 11 to execute the analyzed instruction through the communication section 21 and the platform 13 (S290). For example, if a user pushes the "600*600 dpi" button 531 during when the detail setting screen 53 is displayed, the Business Logic 24 analyzes, based on the information given by the Script Interpreter 23, that a function operation corresponding to the "600*600 dpi" button 531 is an input of an execution instruction as to an operation of allowing the scanner section to read a document at resolution of 600*600 at the time of performing scanning operation and receives the "input of an execution instruction as to an operation of allowing the scanner section to read a document at resolution of 600*600 dpi." Then, to execute the "operation of allowing the scanner section to read a document at resolution of 600*600 dpi," the Business Logic 24 calls out the API corresponding to the "operation of allowing the scanner section to read a document at resolution of 600*600 dpi."

In accordance with the API, the controller 11 executes the instructed operation (S307). For example, the controller 11 executes the "operation of allowing the scanner section to read a document at resolution of 600*600 dpi." In other words, the Business Logic 24 performs setting with respect to the controller 11 via the API to allow the scanner section to read a document at resolution of 600*600 dpi.

Figure 32:
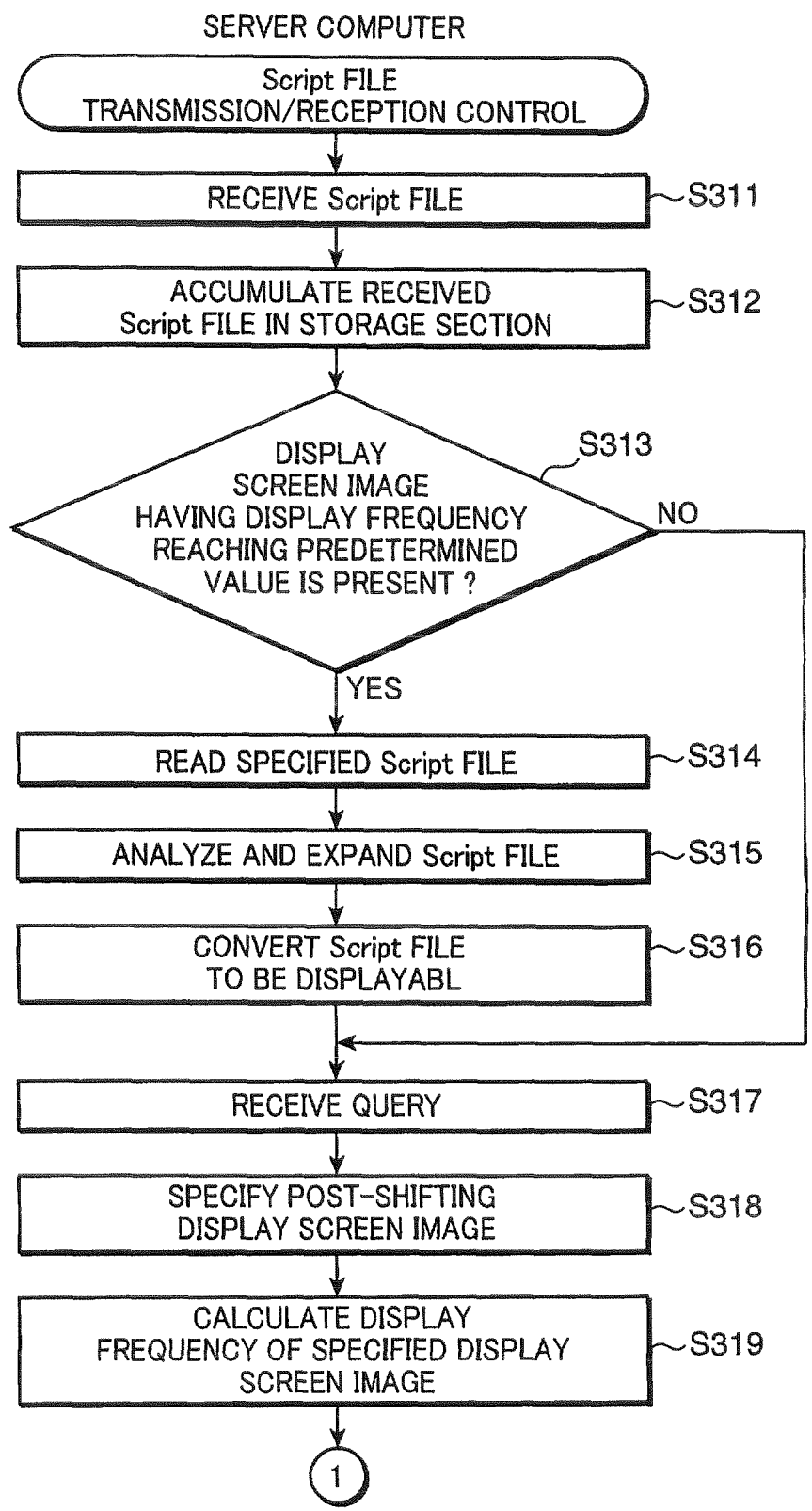
FIG. 32 is a flowchart showing a second example of the display processing for allowing the display section to display the display screen image created in the PC and the receiving processing for receiving an operation execution instruction from a user in the image forming system.
Figure 33:
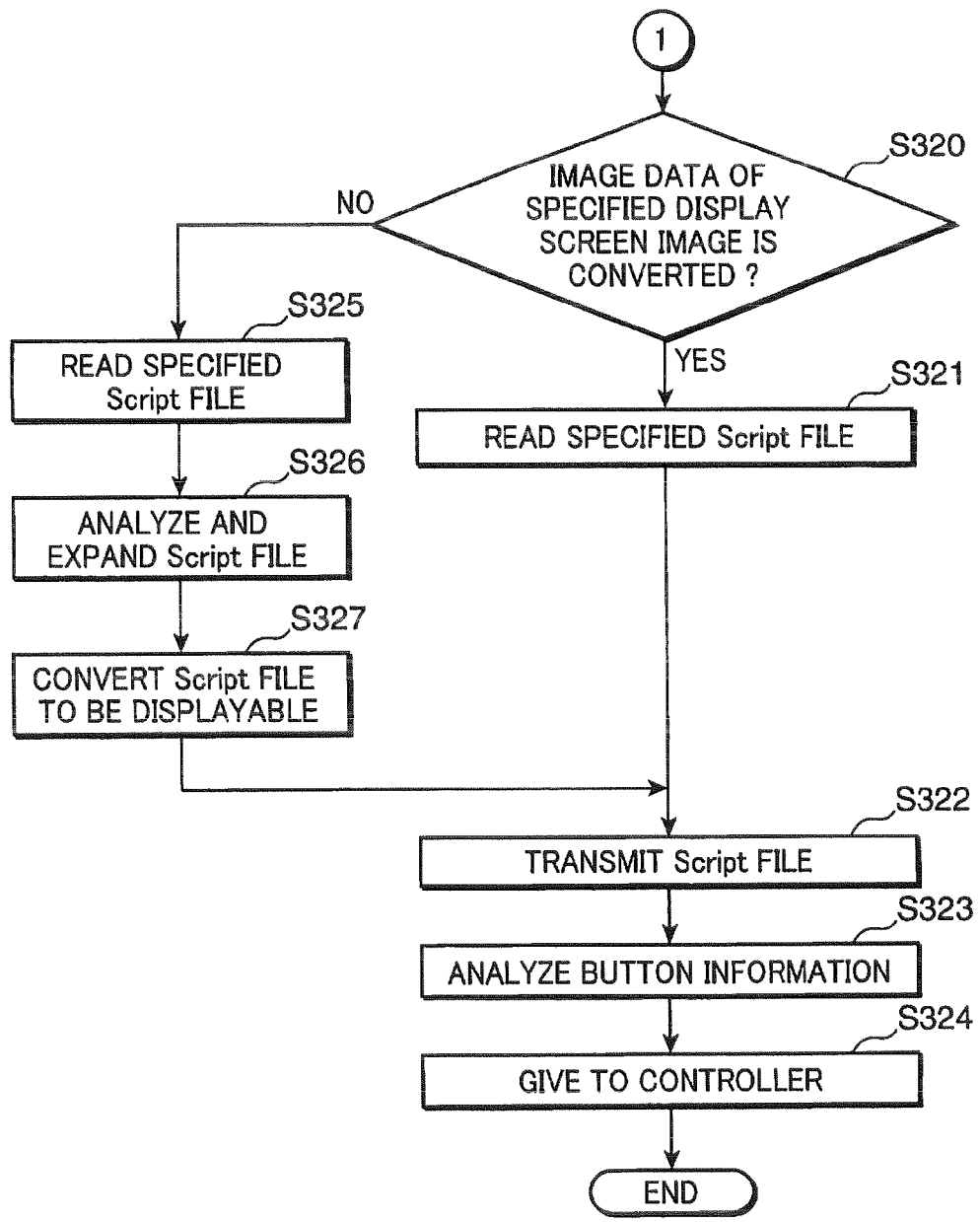
FIG. 33 is a flowchart showing the second example of the display processing for allowing the display section to display the display screen image created in the PC and the receiving processing for receiving an operation execution instruction from a user in the image forming system.

Next, a second example of display processing for allowing the display section 50 to display the display screen image created by the PC 31 and the receiving processing for receiving an operation execution instruction from a user in the image forming system 10 will be described. FIGS. 32 and 33 shows a flowchart showing the second example of the display processing for allowing the display section 50 to display the display screen image created by the PC 31 and the receiving processing for receiving an operation execution instruction from a user in the image forming system 10. Regarding description as to the processing of the server computer SV2, the processing which is the same as the first example will be omitted. Also, depiction and description as to the processing of the PC 31 and the complex machine 1 will be omitted.

In the second example, at the time before a display control for allowing the display section 50 to display a display screen image (a display screen image which can be displayed in accordance with the analyzing processing and the data conversion processing executed by the Script Interpreter 23 and the Business Logic 24), such as at the time when the power is turned on to start up the complex machine 1 (when a signal indicating startup of the complex machine 1 by turning on the power is transmitted from the controller 11 of the complex machine 1), the Script Interpreter 23 specifies a display screen image having a display frequency, which is calculated by the display frequency calculation section 25 for each display screen image data, reaching a predetermined threshold value is specified (S313). The threshold value can be suitably changed by a user through operation to an unillustrated operating section of the complex machine 1 (operation buttons and the like included in the display screen image displayed by the display section 50). Further, setting as to the number of display screen image having a display frequency reaching the threshold value to be converted can be also suitably set by a user through operation to the operating section.

Then, if there is a display screen image having a display frequency reaching the predetermined threshold value (YES in S313), the Script Interpreter 23 reads a Script file of screen image data to the display screen image having the display frequency reaching the threshold value from the storage section 22 (S314). Then, the Script Interpreter 23 analyzes the read Script file, and executes the HTML conversion processing for enabling the display section 50 to display the display screen image and the expansion processing to the Business Logic 24 for executing an action associated with a display object part such as an operation button arranged in the display screen image (S315). The Business Logic 24 sets the data obtained from the Script Interpreter 23 and applied with the HTML conversion processing to be display data which can be displayed by the display section 50 (S316).

If there is no display screen image having a display frequency reaching the predetermined threshold value (NO in S313), the processing of S314 through S316 are skipped.

After this, if a display control for controlling the display section 50 to display a display screen image is started in the complex machine 1, and a query from the controller 11 is received by the Script Interpreter 23 (S317), the Script Interpreter 23 specifies a Script file of screen image data of a display screen image having the display frequency reaching the threshold value (S318), and the display frequency calculating section 25 calculates a display frequency of the display screen image constituted by the Script file (S319). For example, in S318, at each time when a display screen image of a Script file customized by a user is specified as a post-shifting display screen image, the display frequency calculating section 25 counts up the number of displayed times of the specified display screen image, and calculates the number of displayed times in a predetermined time period (for example, one week) as a display frequency. The calculated display frequency is stored by the display frequency calculating section 25.

Then, the Script Interpreter 23 determines whether screen image data of the display screen image specified as the post-shifting display screen image in S318 has been already converted (S320). If the data has been converted (YES in S320), the Script Interpreter 23 reads screen image data of the specified display screen image (S321). The read display screen image data is transmitted to the complex machine 1 by the Business Logic 24 and the communication section 21 (S322).

On the other hand, if the screen image data of the display screen image specified as the post-shifting display screen image in S318 has not yet been converted (NO in S320), the Script Interpreter 23 and the Business Logic 24 executes data conversion as to the Script file of the specified display screen image (S325-S327). The converted display screen image data is transmitted to the complex machine 1 by the Business Logic 24 and the communication section 21 (S322).

Figure 34:
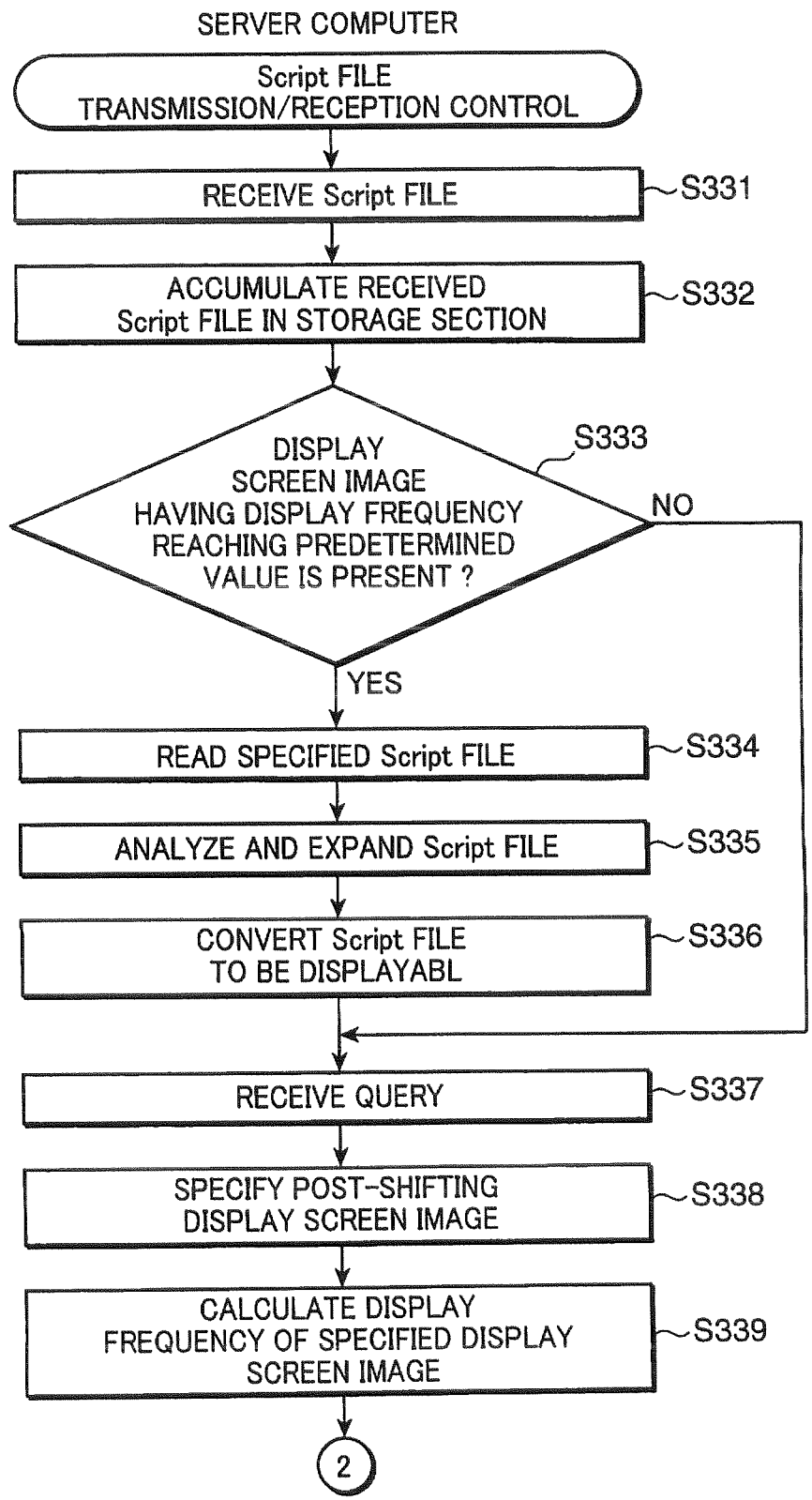
FIG. 34 is a flowchart showing a third example of the display processing for allowing the display section to display the display screen image created in the PC and the receiving processing for receiving an operation execution instruction from a user in the image forming system.
Figure 35:
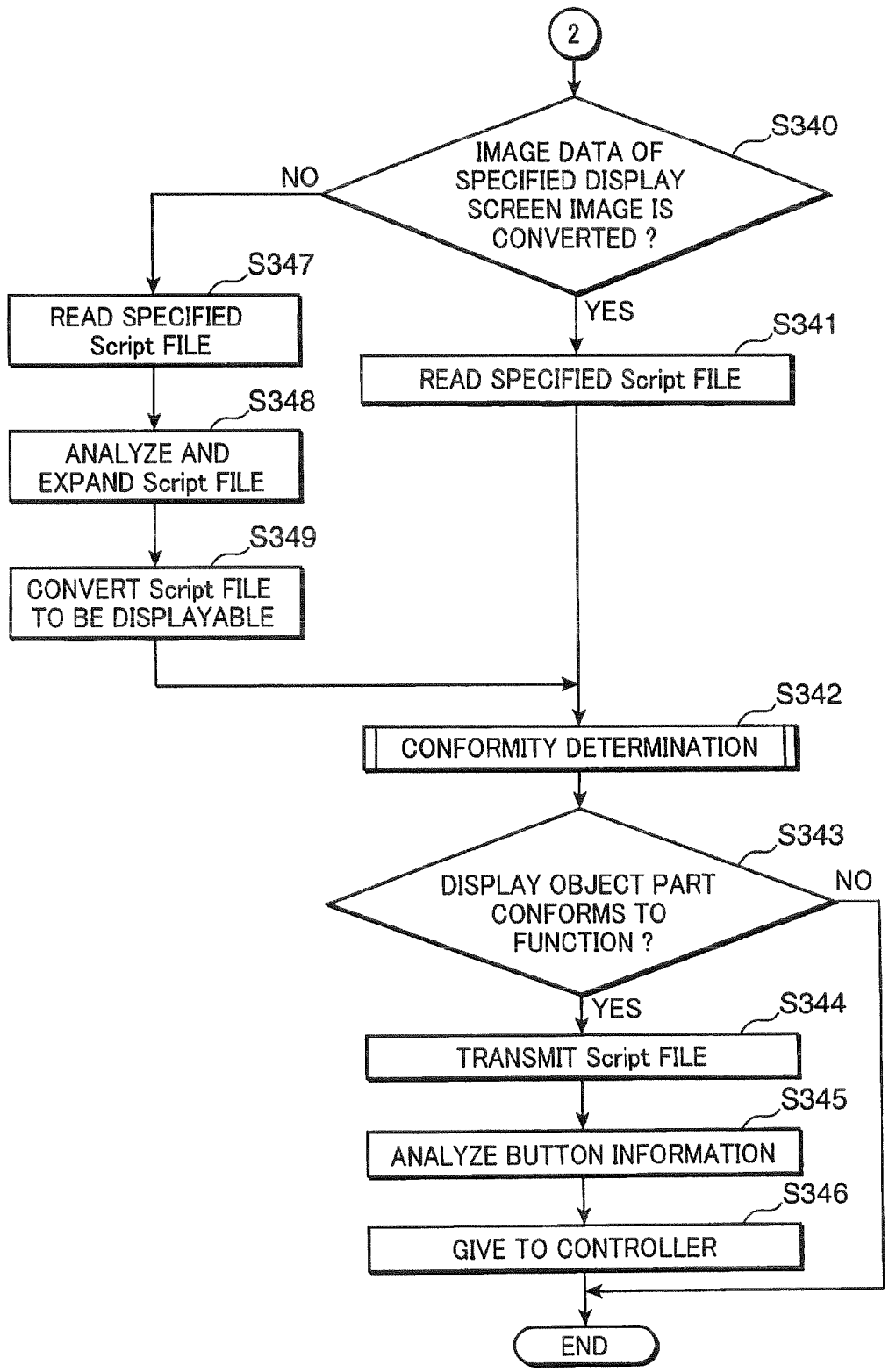
FIG. 35 is a flowchart showing a third example of the display processing for allowing the display section to display the display screen image created in the PC and the receiving processing for receiving an operation execution instruction from a user in the image forming system.

Next, a third example of the display control processing for controlling the display section 50 to display the display screen image created by the PC 31 and the receiving processing for receiving an operation execution instruction from a user in the image forming system 10 will be described. FIGS. 34 and 35 shows a flowchart showing the third example of the display control processing for controlling the display section 50 to display the display screen image created by the PC 31 and the receiving processing for receiving an operation execution instruction from a user in the image forming system 10. Regarding description as to the processing of the server computer SV2, the processing which is the same as the first or second example will be omitted. Also, depiction and description as to the processing of the PC 31 and the complex machine 1 will be omitted.

In the third example, in addition to the processing executed in the second example, as to the display screen image data constituted by the Script file stored in the server computer SV2, the Script Interpreter 23 allows the function information obtaining section 231 and the determination section 232 to determine whether the display object part included in the display screen image indicated by the Script file conforms to the function of the complex machine 1 (S342).

Here, if the determination section 232 determines that the display object part included in the display screen image does not conform to the function of the complex machine 1 (NO in S343), the processing is terminated. In other words, the display screen image indicated by the Script file is not displayed by the display section 50.

On the other hand, if the determination section 232 determines that the display object part included in the display screen image conforms to the function of the complex machine 1 (YES in S343), similarly to the second example, the Business Logic 24 and the communication section 21 outputs the display screen image data of the display screen image to the complex machine 1 (S344). After that, the display section 50 displays the display screen image in the complex machine 1.

In the third example, the processing of S342 and S343 are executed in addition to the processing of the second example. However, the executing the processing of S342 and S343 in addition to the processing of the first example may be a fourth example.

Figure 36:
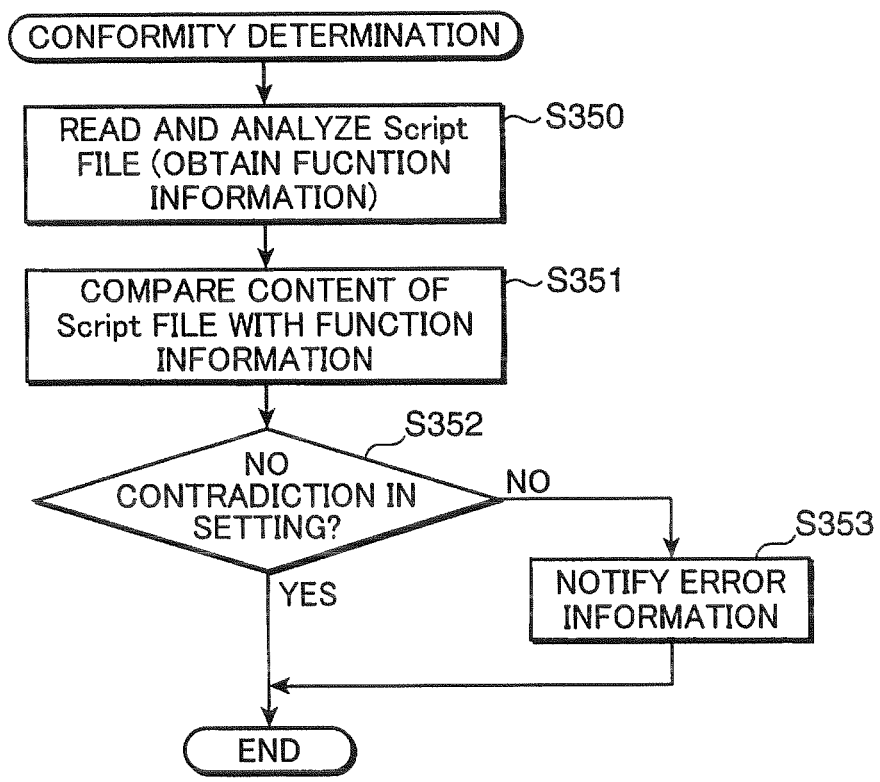
FIG. 36 is a flowchart showing a first example of the conformity determination processing executed by the Script Interpreter with respect to a display object part included in a display screen image.

Next, in the server computer SV2 of the image forming system 10, a first example of the conformity determination processing executed by the Script Interpreter 23 with respect to the display object part of the display screen image will be described. FIG. 36 is a flowchart showing the first example of the conformity determination processing executed by the Script Interpreter 23 with respect to the display object part of the display screen image.

In the case of executing the aforementioned conformity determination processing, the Script Interpreter 23 of the server computer SV2 analyzes a Script file stored in the storage section 22 to specify the display object part included in the display screen image, and the function information obtaining section 231 obtains function information indicating the function which can be executed by the complex machine 1 from the controller 11 (S350).

Next, the determination section 232 compares the contents of the analyzed Script file with the function information obtained by the function information obtaining section 231. In other words, the determination section 232 determines whether the configuration of the display object part included in the display screen image indicated by the Script file conforms to the function indicated by the function information obtained by the function information obtaining section 231 (S351). For example, the function information obtaining section 231 obtains function information of the complex machine 1 from the controller 11, and the determination section 232 determines whether the complex machine 1 has a function for executing an action set for the display object part arranged in the display screen image in accordance with the obtained function information.

If the determination section 232 determines that the complex machine 1 does not have the function for executing the action set for the display object part arranged in the display screen image, in other words, the configuration of the display object part of the display screen image contradicts the function of the complex machine 1 (NO in S352), the notification controller 233 executes a control of notifying the contents of non-conformity (for example, notifying that a "facsimile start button" for receiving an execution instruction of a facsimile function is arranged in the display screen image even though the designated complex machine 1 does not have a facsimile function) by means of the display section 50 of the complex machine or by means of sound from an unillustrated speaker of the complex machine 1 through the Business Logic 24 and the browser 16 (S353). Accordingly, a user is encouraged to edit or change the display screen image again.

Further, if the determination section 232 determines that the configuration of the display object part of the display screen image does not contradict the function of the complex machine 1 (YES in S352), the conformity determination processing is terminated.

Figure 37:
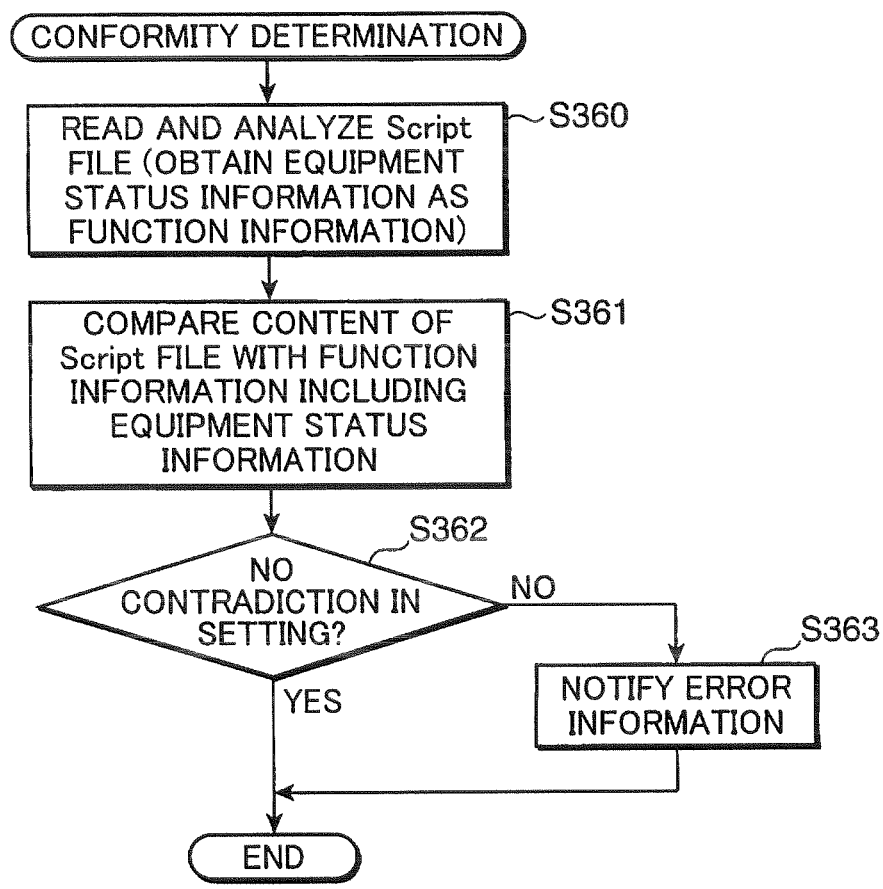
FIG. 37 is a flowchart showing a second example of the conformity determination processing executed by the Script Interpreter with respect to a display object part included in a display screen image.

Next, a second example of the conformity determination processing executed by the Script Interpreter 23 with respect to the display object part included in the display screen image will be described. FIG. 37 is a flowchart showing the second example of the conformity determination processing executed by the Script Interpreter 23 with respect to the display object part included in the display screen image. Detailed description as to the processing which is the same as the first example will be omitted.

In the second example, at the time of analyzing the Script file in the conformity determination processing, when the function information obtaining section 231 obtains function information of the complex machine 1 from the controller 11, the function information obtaining section 231 obtains function information indicating the function which can be executed by the complex machine 1, and also obtains equipment status information indicating specification set for the complex machine 1 at this point of time from the controller 11 of the complex machine by communication of the communication section 21 with the complex machine 1 (S360). For example, for example, the function information obtaining section 231 obtains from the controller 1 the equipment status information indicating specification of the complex machine 1 at the time of the communication, such as information as to the number of sheet-feeding cassettes provided in the complex machine 1, presence of a post-processing mechanism for performing sheet post-processing, and the like. In the complex machine 1, for example, the equipment status information is stored in a memory area of the controller 11, and the controller 11 outputs the equipment status information to the function information obtaining section 231.

Then, the determination section 232 determines whether the configuration of the display object part included in the display screen image indicated by the Script file contradicts content of the function and setting of the complex machine 1 indicated by the function information including the equipment status information (S361).

If the determination section 232 determines that the complex machine 1 does not have the function and setting for executing the action set for the display object part arranged in the display screen image, in other words, the function and setting of the complex machine 1 contradicts the configuration of the display object part of the display screen image (NO in S362), similarly to the first example, a control of pointing out the display object part contradicting the contents of setting is executed by means of the display on the display section 50 of the complex machine through the Business Logic 24 and the browser 16 or by means of the sound of an unillustrated speaker of the complex machine 1 (S363).

The present invention includes a computer-readable recording medium storing a display screen image creating program, a display screen image analyzing program, and a display control program.

The present invention can be modified in various ways, not limited to the configuration of the embodiments. For example, in the embodiments, the display screen image created by the panel creator section 312 and the panel simulator section 313 of the PC 31 is displayed by the complex machine 1. However, the created display screen image is not limited to be displayed by the complex machine 1, and it can be applied for display in other electric equipment.

Further, the scope of the present invention is not limited to the aforementioned embodiments, and it can be modified in various manners within the range of not departing from the gist of the invention. In the embodiments, the configurations of the respective embodiments of the present invention are shown in FIGS. 1-36. However, the configurations and processing are mere examples of the embodiments of the present invention.

In summary, according to an aspect of the present invention, a display screen image creating apparatus includes: a part designation receiving section which receives from a user a designation of a display object part to be displayed in a display screen image on a display section of an electric equipment; a layout instruction receiving section which receives from a user a layout instruction for instructing arrangement of the designated display object part in the display screen image; an action setting section which associates the designated display object part with an action corresponding to the display object part; and a creating section which creates screen image data of the display screen image in accordance with contents set by the display object part designation, the layout instruction, and the action setting.

Further, according to an aspect of the present invention, the display screen image creating apparatus further includes: an output section which outputs the screen image data of the display screen image created by the creating section to the electric equipment.

According to these aspects of the invention, the creating section creates the screen image data of the display screen image displayed on the display section of the electric equipment or the image forming apparatus in accordance with contents set by the display object part designated at the part designation receiving section, the layout instruction received by the layout instruction receiving section, and the action set by the action setting section, display object parts desired by a user, for example, a display screen image in which operation buttons for receiving operation instructions are arranged can be created, so that convenience for a user can be enhanced. Further, at the time of creating the display screen image, the output section outputs the screen image data of the created display screen image to the electric equipment or the image forming apparatus. Therefore, the screen image data of the display screen image outputted from the display screen image creating apparatus can be taken on the side of the electric equipment or the side of the image forming apparatus as display data for the display section.

Further, according to an aspect of the present invention, the display screen image creating apparatus further includes: a determination section which determines whether a configuration of the display object part to be displayed in the created display screen image conforms to a function of the electric equipment.

According to this aspects of the invention, the creating section creates the screen image data of the display screen image displayed on the display section of the electric equipment or the image forming apparatus in accordance with contents set by the display object part designated at the part designation receiving section, the layout instruction received by the layout instruction receiving section, and the action set by the action setting section, display object parts desired by a user, for example, a display screen image in which operation buttons for receiving operation instructions are arranged can be created, so that convenience for a user can be enhanced. Further, at the time when the creating section creates the display screen image, the determination section determines whether the configuration of the display object part to be displayed in the display screen image conforms to the function of the electric equipment or the image forming apparatus provided with the display section which displays the display screen image. Therefore, using the determination result, a display screen image having only display object parts conforming to functions of the electric equipment or the image forming apparatus can be created, and a display screen image whose display object parts conforming to the functions is displayed, and it can be notified to a user that display object parts not conforming to functions of the electric equipment or the image forming apparatus are designated.

Further, according to an aspect of the present invention, the display screen image creating apparatus further includes: an equipment designation receiving section which receives a designation of an electric equipment whose display section displays the display screen image indicated by the created screen image data from a user; and a storage section which stores function information, which corresponds to each electric equipment capable of displaying on a respective display section the display screen image indicated by the created screen image data, for each electric equipment, wherein the determination section determines whether the function information stored in the storage section for an electric equipment, a designation for which is received by the equipment designation receiving section, conforms to a configuration of the display object part to be displayed in the created display screen image.

According to this invention, in accordance with functions of each electric equipment to which the created display screen image is applied, the determination section can accurately determine whether configuration of display object parts of the display screen image conforms to the functions of the electric equipment.

Further, according to an aspect of the present invention, the display screen image creating apparatus further includes: a function information obtaining section which obtains function information of a function which can be executed by the electric equipment from the electric equipment, wherein the determination section determines whether a configuration of the display object part to be displayed in the created screen image conforms to the function of the function information obtained by the function information obtaining section.

According to this aspect of the invention, obtains function information of a function which can be executed by the electric equipment from the electric equipment, and the determination section determines whether a configuration of the display object part to be displayed in the generated screen image conforms to the function of the function information obtained by the function information obtaining section. Accordingly, with respect to an electric equipment which is actually connected to the computer and has a display section displays the created screen image, it can be accurately determined whether the configuration of the display object part of the display screen image conforms to the function of the electric equipment.

According to another aspect of the present invention, An image forming system includes: a display screen image creating apparatus which creates screen image data of a display screen image in accordance with an instruction from a user; and an image forming apparatus which displays the display screen image constituted by the generated screen image data. The display screen image creating apparatus includes: a part designation receiving section which receives a designation of a display object part to be displayed in a display screen image on a display section of an electric equipment from a user; a layout instruction receiving section which receives a layout instruction for instructing arrangement of the designated display object part in the display screen image from a user; an action setting section which associates the designated display object part with an action corresponding to the display object part; a creating section which creates screen image data of the display screen image in accordance with contents set by the display object part designation, the layout instruction, and the action setting; and an output section which outputs the screen image data of the display screen image created by the creating section to the electric equipment. The image forming apparatus includes: a display section which displays the screen image data of the display screen image; a registration section which registers the screen image data of the display screen image received from the output section; a data conversion section which reads the screen image data of the display screen image registered in the registration section from the registration section, analyzes the screen image data, and converts the screen image data into a data format which enables the display section to display the screen image data of the display screen image on the display section; a display controller which controls the display section to display the screen image data of the display screen image to which the conversion has been applied by the data conversion section.

Further, according to an aspect of the present invention, in the display screen image creating apparatus, the display screen image creating apparatus further includes: a determination section which determines whether a configuration of the display object part to be displayed in the display screen image conforms to a function of the electric equipment.

Further, according to an aspect of the present invention, in the image forming system, the output section of the display screen image creating apparatus outputs the screen image data of the created display screen image to the image forming apparatus via a network line, and the registration section of the image forming apparatus registers the screen image data of the display screen image received via the network line.

Further, according to an aspect of the present invention, in the image forming system, the output section of the display screen image creating apparatus outputs the screen image data of the created display screen image to the image forming apparatus by means of an electronic mail via an network line, and the registration section of the image forming apparatus registers the screen image data of the display screen image received by means of the electronic mail via the network line.

Further, according to an aspect of the present invention, in the image forming system, the output section of the display screen image creating apparatus outputs the screen image data of the created display screen to the image forming apparatus via a local port, and the registration section of the image forming apparatus registers the screen image data of the display screen image received via the local port local port.

Further, according to an aspect of the present invention, in the image forming system, the output section of the display screen image creating apparatus outputs the screen image data of the created display screen image to the image forming apparatus via a public circuit, and the registration section of the image forming apparatus registers the screen image data of the display screen image received via the public line.

According to these aspects of the invention, the creating section creates the screen image data of the display screen image displayed on the display section of the electric equipment or the image forming apparatus in accordance with contents set by the display object part designated at the part designation receiving section, the layout instruction received by the layout instruction receiving section, and the action set by the action setting section, display object parts desired by a user, for example, a display screen image in which operation buttons for receiving operation instructions are arranged can be created, so that convenience for a user can be enhanced. Further, at the time of creating the display screen image, the output section of the image forming apparatus outputs the screen image data of the created display screen image, and the display screen image data of the display screen image is registered by the registration section of the image forming apparatus as display data for the display section. Therefore, a display screen image in which operation buttons are arranged in a manner desired by a user can be displayed by the display section of the image forming apparatus.

Further, according to an aspect of the present invention, an image forming system, includes: a display screen image creating apparatus; an information processing apparatus; and an image forming apparatus. The display screen image creating apparatus includes: a part designation receiving section which receives a designation of a display object part to be displayed in a display screen image from a user; a layout instruction receiving section which receives a layout instruction for instructing arrangement of the designated display object part in the display screen image; an action setting section which associates the designated part with an action corresponding to the display object part; a creating section which creates screen image data of the display screen image in accordance with contents set by the display object part designation, the layout instruction, and the action setting; and a output section which outputs the screen image data of the display screen image created by the creating section to the information processing apparatus. The information processing apparatus includes: a receiving section which receives the screen image data of the created display screen image from the display screen image creating apparatus; a storage section which stores the screen image data of the display screen image received by the receiving section; a data conversion section which reads, when the display screen image is shifted in the display section of the image forming apparatus, screen image data of a post-shifting display screen image associated with a pre-shifting display screen image, analyzes the screen image data, and converts the screen image data into a data format which enables the display controller to display the screen image data of the display screen image on the display section; and an output section which outputs the screen image data converted by the data conversion section to the image forming apparatus. The image forming apparatus includes: a display section which displays screen image data of the display screen image; a data obtaining section which obtains the screen image data of the display screen image from the information processing apparatus; and a display controller which controls the display section to display the screen image data of the display screen image obtained by the data obtaining section.

Further, according to an aspect of the present invention, in the image forming system, the information processing apparatus further includes a determination section which determines whether a configuration of the display object part to be displayed in the display screen image conforms to a function of the electric equipment.

Further, according to an aspect of the present invention, an image forming system includes: an information processing apparatus; and an image forming apparatus. The information processing apparatus includes: a receiving section which receives screen image data of a display screen image created from a display screen image creating apparatus; a storage section which stores the image data of the display screen image received by the receiving section; a data conversion section which reads, when the display screen image is shifted by a display section of the image forming apparatus, screen image data of a post-shifting display screen image associated with a pre-shifting display screen image from the storage section, analyzes the screen image data, and converts the screen image data into a data format enabling the display controller to control the display section to display; and an output section which outputs the display screen data converted by the data conversion section to the image forming apparatus. The image forming apparatus includes: a display section which displays the screen image data of the display screen image; a data obtaining section which obtains the screen image data of the display screen image from the information processing apparatus; and a display controller which controls the display section to display the screen image data of the display screen image obtained by the data obtaining section.

According to these aspects of the invention, the screen image data of the display screen image created in the information processing apparatus by a user is stored in the storage section, and at the time of shifting the display screen image in the display section, the data conversion section reads the screen image data of the post-shifting screen image from the storage section and analyzes the same, converts the screen image data to be a data format enabling the display controller to display the screen image data on the display section, and the output section outputs the converted screen image data to the image forming apparatus. Therefore, in a case of realizing a display control of controlling the display section of the image forming apparatus to display the display screen image in which operation buttons and the like are customized and arranged in a manner desired by a user, the image forming apparatus does not have to store screen image data of all the display screen image customized by a user. Further, according to the aspect of the invention, in a case where the image forming system includes a plurality of image forming apparatus, if the screen image data of the display screen image customized by a user is stored in the information processing apparatus, the display screen image customized by a user can be displayed by the display sections of the plurality of image forming apparatus without registering the screen image data of the display screen images created by a user to the plurality of image forming apparatuses respectively. Therefore, expandability can be enhanced for the case of executing a display control of controlling the display section of the image forming apparatus to shift a plurality of display screen images.

Further, according to an aspect of the present invention, in the image forming system, the information processing apparatus further includes a display frequency calculating section which calculates a display frequency of the screen image data of the display screen image on the display section, and before the display controller starts display control with respect to the display section, the data conversion section executes the data conversion processing with respect to screen image data of a display screen image having a high display frequency calculated by the display frequency calculating section.

According to an aspect of the present invention, in the image forming system, the information processing apparatus further includes a display frequency calculating section which calculates a display frequency of each display screen image of screen image data displayed by the display section. Before the display controller starts display control with respect to the display section, the data conversion section converts image data of the display screen image having a high display frequency calculated by the display frequency calculating section.

According to these aspects of the invention, as to the screen image data of the display screen image having a high display frequency on the display section, the data conversion section completes the data conversion processing for display before the display control executed by the display controller with respect to the display section is started (for example, at the time of starting up the image forming apparatus). Therefore, even in the case where it requires time for the analyzing and conversion processing with respect to the screen image data of the display screen image, the data analyzing and conversion processing with respect to the screen image data of the display screen image having a high display frequency is terminated in advance, so that the post-shifting display screen image can be outputted to the image forming apparatus immediately and displayed by the display section when the screen shifting processing is required, so that performance can be enhanced.

Further, according to another aspect of the present invention, a display control device includes: a display section which displays a display screen image; a registration section which registers screen image data of a display screen image customized by a user as display screen image data of the display section; an analyzing section which analyzes a display object part included in the customized display screen image registered in the registration section; a function information obtaining section which obtains function information indicating a function which can be executed by an electric equipment to which the display control device is adopted; a determination section which determines whether a configuration of the display part included in the customized display screen image conforms to the function indicated by the function information obtained by the function information obtaining section; and a display controller which controls the display section to display display data which is determined by the determination section that a configuration of the display object part conforms to the function information.

According to this invention, the determination section determines whether the configuration of the display object part included in the display screen image conforms to the function of the electric equipment or the image forming apparatus having the display section for displaying the display screen image. Therefore, using the determination result, a display screen image having only a display object part conforming to the function of the electric equipment or the image forming apparatus can be displayed by the display section.

Further, according to an aspect of the present invention, in the display control device, the registration section obtains the screen image data of the customized display screen image from an information processing apparatus connected to the display control device and registers the obtained screen image data.

According to this aspect of the invention, a display screen image customized and created by a user with a personal computer and having only display object parts conforming to the function of the electric equipment or the image forming apparatus can be displayed on the display section.

Further, according to an aspect of the present invention, the display control device further includes: a notification controller which gives a notification indicating nonconformity in a case where the configuration of the display object part is determined by the determination section as not conforming to the function indicated by the function information.

According to this aspect of the invention, if the determination section determines that a configuration of the display object part of the display screen image customized by a user, the notification controller notifies the contents of non-conformity. Therefore, for example, by allowing the display section to display the display object part not in conformity with the function of the electric equipment or allowing the display section or other notifying mechanism (for example, a speaker) to notify a user that non-conforming display object part is included, a user can understand that a display object part which does not conform to the electric equipment is designated.

Further, according to an aspect of the present invention, in the display control device, the function information obtaining section obtains equipment status information indicating contents of setting of the electric equipment as further function information, and the determination section determines whether the configuration of the display object part included in the customized display screen image conforms to the contents of setting of the electric equipment indicated by the equipment status information obtained by the function information obtaining section.

According to this aspect of the invention, the determination section determines whether the configuration of the display object part of the display screen image conforms to the contents set for the electric equipment (for example, in the case where the electric equipment is an image forming apparatus, equipment status information at the time of communication, such as information as to the number of sheet-feeding cassettes, whether a post-processing mechanism for performing the sheet post-processing is set) and obtained by the function information obtaining section, in accordance with specific abilities of the electric equipment at the time of allowing the display section to display the customized display screen image.

Further, according to another aspect of the present invention, an image forming apparatus includes: a display section which displays a display screen image; a registration section which registers screen image data of a display screen image customized by a user as display screen image data of the display screen image data of the display section; an analyzing section which analyzes a display object part included in the customized display screen image registered in the registration section; a function information obtaining section which obtains function information indicating a function which can be executed by an electric equipment to which the display control device is adopted; a determination section which determines whether a configuration of the display part included in the customized display screen image conforms to the function indicated by the function information obtained by the function information obtaining section; a display controller which controls the display section to display display data which is determined by the determination section that a configuration of the display object part conforms to the function information; and an image forming section which performs image forming with respect to a recording medium.

According to the aspect of the invention, at the time of displaying a display screen image customized in a manner desired by a user, only a display screen image including display parts which conform to functions of an electric equipment such as an image forming to which the display screen image is applied can be displayed.

Further, according to an aspect of the invention, a display control device includes: a display section which displays a display screen image; a display controller which controls the display section to display the display screen image; a registration section which registers screen image data of the display screen image as display data to be displayed by the display section; a data conversion section which analyzes the display screen image data registered by the registration section and converts the display screen image data into a data format which can be displayed by the display section; and a display frequency calculating section which calculates a display frequency on the display section for each display screen image data registered by the registration section. Before the display controller starts display control with respect to the display section, the data conversion section converts display screen image data registered by the registration section and having a high display frequency calculated by the display frequency calculating section into a data format which can be displayed by the display section.

According to this aspect of the invention, the registration section converts display data having a high display frequency on the display section into a data format which can be displayed by the display section before a display control executed by the display controller with respect to the display section is started (for example, at the time of starting up the display control device, the electric equipment, or the image forming apparatus). Therefore, even in a case where it requires time for the reading processing for reading data from the registration section and the data conversion processing as to the display data, when the screen image data of a display screen image having a display frequency is required to be displayed by the display section, the subject display screen image can be displayed immediately by the display section, so that performance can be enhanced.

Further, according to an aspect of the present invention, in the display control device, the registration section obtains the screen image data of the display screen image from an information processing apparatus connected to the display control device.

According to this aspect of the invention, even in a case where the screen image data of the display screen image to be displayed by the display section is obtained by the registration section from the information processing apparatus connected to the electric equipment or the display control device, as to the screen image data of the display screen image having a high display frequency, the display section can display the subject display screen image immediately.

Further, according to an aspect of the present invention, An image forming system, comprising: an information processing apparatus; and an image forming apparatus. The information processing apparatus includes: a part designation receiving section which receives a designation of a display object part to be displayed in a display screen image from a user; a layout instruction receiving section which receives a layout instruction for instructing arrangement of the designated display object part in the display screen image; an action setting section which associates the designated display object part with an action corresponding to the display object part; a creating section which creates screen image data of the display screen image in accordance with contents set by the display object part designation, the layout instruction, and the action setting; and a output section which outputs the screen image data of the display screen image created by the creating section to the image forming apparatus. The image forming apparatus includes: a display section which displays the display screen image; a display controller which controls the display section to display the display screen image; a registration section which obtains the created screen image data of the display screen image from the information processing apparatus and registers the screen image data as display screen image data to be displayed by the display section; a data conversion section which analyzes the display screen image data registered by the registration section and converts the display screen image data into a data format which can be displayed by the display section; and a display frequency calculating section which calculates a display frequency of each display screen image data registered by the registration section on the display section, and before the display controller starts display control with respect to the display section, the data conversion section converts display screen image data registered by the registration section and having a high display frequency calculated by the display frequency calculating section into a data format which can be displayed by the display section.

According to this aspect of the invention, the registration section converts display data having a high display frequency on the display section into a data format which can be displayed by the display section before a display control executed by the display controller with respect to the display section is started (for example, at the time of starting up the display control device, the electric equipment, or the image forming apparatus). Therefore, even in a case where it requires time for the reading processing for reading data from the registration section and the data conversion processing as to the display data, when the screen image data of a display screen image having a display frequency is required to be displayed by the display section, the subject display screen image can be displayed immediately by the display section, so that performance can be enhanced.

Further, according to an aspect of the present invention, a display control device includes: a display section which displays a display screen image; a registration section which registers screen image data of a plurality of display screen images including user identification information as display screen image data to be displayed by the display section; a discriminating section which discriminates, based on user identification information inputted to an electric equipment by a user, display screen image data including the user information from display screen image data registered by the registration section; a data conversion section reads the display screen image data discriminated by the discriminating section from the registration section, analyzes the display screen image data, and converts the display screen image data into a data format which enables the display controller to display on the display section; and a display controller which controls the display section to display the screen image data of the display screen image to which the conversion is executed by the data conversion section.

According to this aspect of the invention, the discriminating section discriminates the display data associated with the user from the registered data in accordance with the user identification information inputted by the user, and the display controller controls the display section to display the display data. Therefore, in the case of allowing the display section to display a plurality of display screen images, a display screen associated with each user can be displayed by the display section adequately.

According to an aspect of the present invention, the display control device further includes: a display frequency calculating section which calculates a display frequency of each display screen image data on the display screen for each user. The discriminating section discriminates display screen image data including the user information and having a high display frequency calculated by the display frequency calculating section, and the display controller controls the display section to display the display screen image data discriminated by the discriminating section and having a high display frequency.

According to this aspect of the invention, the discriminating section discriminates display data including user identification information and having a high display frequency, and the display controller controls the display section to display the discriminated display data. Therefore, even in a case where a plurality of display screen images including the same user identification information are registered, a display screen image having the highest utility value for a respective user is discriminated and displayed, so that convenience for a user can be enhanced.

Further, according to an aspect of the present invention, an image forming system includes: an information processing apparatus; and an image forming apparatus. The information processing apparatus includes: a part designation receiving section which receives a designation of a display object part to be displayed in a display screen image from a user; a layout instruction receiving section which receives a layout instruction for instructing arrangement of the designated display object part in the display screen image; an action setting section which associates the designated display object part with an action corresponding to the display object part; a user identification information setting section which sets user identification information inputted by a user; a creating section which creates screen image data of the display screen image in accordance with contents set by the display object part designation, the layout instruction, the action setting, and contents set by the user information setting section; and a output section which outputs the screen image data of the display screen image created by the creating section to the image forming apparatus. The image forming apparatus includes: a display section which displays the display screen image; a registration section which registers screen image data of a plurality of display screen images including user identification information as display screen image data to be displayed by the display section; a discriminating section which discriminates, based on the user identification information inputted to the image forming apparatus by a user, display screen image data including the user information from display data registered by the registration section; a data conversion section which reads the display screen image data discriminated by the discriminating section, analyzes the display screen image data, and converts the display screen image data into a data format which enables the display controller to display on the display section; and a display controller which controls the display section to display the screen image data of the display screen image to which the conversion is executed by the data conversion section.

According to this aspect of the invention, as to the display screen image data created by the information processing apparatus by operation of a user and obtained from the information processing apparatus and registered, the discriminating section discriminated display data including the user identification information from the registered display data in accordance with the user identification information inputted by the user, and the display controller controls the display section to display the same. Therefore, in the case of controlling the display section to display a plurality of display screen images created by a user in accordance each user, a display screen image corresponding to each user can be displayed by the display section adequately.

Further, according to an aspect of the present invention, in the image forming system, the image forming apparatus further includes: a display frequency calculating section which calculates a display frequency of each display data on the display section for each user, and the discriminating section discriminates display data including the user information and having a high display frequency calculated by the display frequency calculating section, and the display controller controls the display section to display display data having a high display frequency and discriminated by the discriminating section.

According to the invention, as to the screen image data of a display screen image created by a user by means of the information processing apparatus and obtained from the information processing apparatus and registered, the discriminating section discriminates display data including user identification information and having a high display frequency, and the display controller controls the display section to display the discriminated display data. Therefore, even in a case where a plurality of display screen images including the same user identification information are registered, a display screen image having the highest utility value for a respective user is discriminated and displayed, so that convenience for a user can be enhanced.

This application is based on Japanese Patent application serial Nos. 2008-155272, 2008-155273, 2008-155274, 2008-155275, 2008-155276 and 2008-155277 filed in Japan Patent Office on Jun. 13, 2008, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image forming system, comprising:
a personal computer; and
an image forming apparatus that includes a display control device and network-connects with the personal computer;
the personal computer including a panel creator section that creates image data of a customized second display screen image to display at the image forming apparatus by operation of a user;
the display control device, comprising:
a display section that can display a first display screen image whose next layer is the second display screen image;
a storage section that stores screen image data of the second display screen image created by the panel creator section in advance as display screen image data of the display section, the screen image data of the second display screen image created by the panel creator section in advance as display screen image data of the display section being stored before the first display screen image is displayed on the display section;
a registration section that obtains the screen image data of the second display screen image from the personal computer and causes the storage section to store the obtained screen image data;
an analyzing section that analyzes a display object part included in the second customized display screen image stored in the storage section;
a function information obtaining section that obtains function information indicating a function that can be executed by the image forming apparatus;
a reading section that reads screen image data of the second display screen image from the storage section when a user inputs a first instruction of shifting from the first display screen image to the second display screen image in a next layer in a state of the first display screen image being displayed on the display section; and
a determination section that performs a first determination of whether a configuration of the display part included in the second display screen image conforms to the function indicated by the function information obtained by the function information obtaining section, using screen image data of the second display screen image read from the storage section by the user, with the screen image data of the second display screen image being the screen image data that is stored in the storage section before the first display screen image is displayed on the display section;
wherein the determination section performs the first determination when the first instruction is input,
the display control device further comprising:
a display controller that (a) controls the display section to display the second display screen image using screen image data of the second display screen image read from the storage section when the determination section determines that a configuration of the display object part conforms to the function information, and (b) controls the display section not to display the second display screen image when the determination section determines that a configuration of the display object part does not conform to the function information.

2. The display control device according to claim 1, further comprising:
a notification controller which gives a notification indicating nonconformity in a case where the configuration of the display object part is determined by the determination section as not conforming to the function indicated by the function information.

3. The display control device according to claim 1, wherein the function information obtaining section obtains equipment status information indicating contents of setting of the electric equipment as further function information, and
the determination section determines whether the configuration of the display object part included in the customized second display screen image conforms to the contents of setting of the electric equipment indicated by the equipment status information obtained by the function information obtaining section.

\* \* \* \* \*